US012651339B2

(12) United States Patent
Joskowicz et al.

(10) Patent No.: US 12,651,339 B2
(45) Date of Patent: Jun. 9, 2026

(54) MACHINE LEARNING CLASSIFICATION OF RETINAL ATROPHY IN OCT SCANS

(71) Applicants: Leo Joskowicz, Jerusalem (IL); Jaime Levy, Bet Shemesh (IL); Or Shmueli, Holon (IL)

(72) Inventors: Leo Joskowicz, Jerusalem (IL); Adi Szeskin, Jerusalem (IL); Roei Yehuda, Jerusalem (IL); Jaime Levy, Bet Shemesh (IL); Or Shmueli, Holon (IL)

( * ) Notice: Subject to any disclaimer, the term of this patent is extended or adjusted under 35 U.S.C. 154(b) by 201 days.

(21) Appl. No.: 18/564,093

(22) PCT Filed: May 25, 2022

(86) PCT No.: PCT/IL2022/050557
§ 371 (c)(1),
(2) Date: Nov. 26, 2023

(87) PCT Pub. No.: WO2022/249184
PCT Pub. Date: Dec. 1, 2022

(65) Prior Publication Data
US 2024/0296555 A1    Sep. 5, 2024

Related U.S. Application Data

(60) Provisional application No. 63/260,200, filed on Aug. 12, 2021, provisional application No. 63/193,350, filed on May 26, 2021.

(51) Int. Cl.
*G06T 7/00* (2017.01)

(52) U.S. Cl.
CPC .. *G06T 7/0012* (2013.01); *G06T 2207/10101* (2013.01); *G06T 2207/20081* (2013.01); *G06T 2207/30041* (2013.01)

(58) Field of Classification Search
CPC ......... G06T 7/0012; G06T 2207/10101; G06T 2207/20081; G06T 2207/30041; G06T 2207/20084
See application file for complete search history.

(56) References Cited

U.S. PATENT DOCUMENTS 12,062,251 B2 *  8/2024  Park ...................... H04N 23/90
2006/0274075 A1 * 12/2006  Yamazaki ............ H04N 19/587
375/E7.145

(Continued)

FOREIGN PATENT DOCUMENTS

WO        2020/210891 A1    10/2020

OTHER PUBLICATIONS

Zexuan Ji et al, "Beyond Retinal Layers: A Deep Voting Model for Automated Geographic Atrophy Segmentation in SD-OCT Images"; Translational Vision Science & Technology, vol. 7, No. 1, Jan. 2, 2018, p. 1-p. 5; DOI: 10.1167/tvst.7.1.1.

(Continued)

*Primary Examiner* — Van D Huynh
(74) *Attorney, Agent, or Firm* — The Roy Gross Law Firm, LLC; Roy D. Gross

(57) ABSTRACT

A method comprising: receiving (i) a first OCT scan, and (ii) a second, subsequent, OCT scan, each comprising one or more two-dimensional (2D) scan images of an eye of a subject; receiving a first and second retinal images of the eye of the subject, associated with the first and second OCT scans; matching corresponding first and second pixel column patches, each comprising one or more pixel columns, associated respectively with the scan images of the first and second OCT scans, based, at least in part, on performing image registration between the scan images of the first and second OCT scans; and using the matched corresponding first and second pixel column patches as input for a trained machine learning model, wherein an output of the trained (Continued)

1500

1502
RECEIVE A PAIR OF FIRST AND SUBSEQUENT OCT SCANS AND ASSOCIATED IR IMAGES OF A SUBJECT

1504
REGISTERING PIXELS BETWEEN THE PAIR OF OCT SCANS, BASED ON A SPATIAL RELATION BETWEEN EACH OCT SCAN AND ITS ASSOCIATED IR IMAGE, AND REGISTRATION OF THE IR IMAGES

1506
PRE-PROCESS THE OCT SLICES TO PERFORM COLUMN PATCH SELECTION

1508
APPLY TRAINED MACHINE LEARNING MODEL TO CLASSIFY ATROPHY IN COLUMNS

1510
CALCULATE ATROPHY SEGMENTS BASED ON THE CLASSIFIED COLUMNS

1512
IDENTIFY AND SEGMENT LESIONS IN THE IR IMAGE. MEASURE LESIONS AREAS AND THEIR DISTANCE TO THE FOVEA machine learning model classifies the second pixel column patches as representing retinal atrophy or not representing retinal atrophy.

17 Claims, 42 Drawing Sheets

(56) References Cited

U.S. PATENT DOCUMENTS

| | | | | |
|---|---|---|---|---|
| 2018/0047159 | A1* | 2/2018 | Schlegl | G06T 7/0012 |
| 2018/0132725 | A1* | 5/2018 | Vogl | A61B 5/0066 |
| 2019/0380574 | A1* | 12/2019 | Chen | G01B 9/02091 |
| 2021/0369195 | A1* | 12/2021 | Russakoff | G06N 3/09 |
| 2022/0084210 | A1* | 3/2022 | Manivannan | G06V 40/193 |
| 2022/0351373 | A1* | 11/2022 | Lad | G06T 7/0012 |
| 2023/0036134 | A1* | 2/2023 | Solanki | G06T 5/94 |
| 2023/0045859 | A1* | 2/2023 | Halperin | A61B 5/0066 |
| 2023/0140881 | A1* | 5/2023 | De Sisternes | A61B 3/102 |
| | | | | 382/130 |

OTHER PUBLICATIONS

Adi Szeskin et al, "A column-based deep learning method for the detection and quantification of atrophy associated with AMD in OCT scans"; Medical Image Analysis, vol. 72, Jun. 12, 2021. DOI: 10.1016/J.MEDIA.2021.102130.

Ursula Schmidt-Erfurth et al, "Artificial intelligence in retina"; Progress in Retinal and Eye Research; vol. 67, pp. 1-29, Nov. 2018. https://doi.org/10.1016/j.preteyeres.2018.07.004.

Rongbin Xu et al, "Automated geographic atrophy segmentation for SD-OCT images based on two-stage learning model"; Computers in Biology and Medicine; vol. 105, pp. 102-111, Feb. 2019. 105:102-111. doi: 10.1016/j.compbiomed.2018.12.013. Epub Dec. 28, 2018. PMID: 30605812.

Thomas Kurmann et al, "Expert-level Automated Biomarker Identification in Optical Coherence Tomography Scans"; Scientific Reports; vol. 9(1): pp. 1-9, Sep. 2019, https://doi.org/10.1038/s41598-019-49740-7.

Imon Banerjee et al, "A Deep-learning Approach for Prognosis of Age-Related Macular Degeneration Disease using SD-OCT Imaging Biomarkers"; Online at: https://arxiv.org/abs/1902.10700, Feb. 27, 2019.

Adi Szeskin et al, "Simultaneous column-based deep learning progression analysis of atrophy associated with AMD in longitudinal OCT studies"; Online at: https://arxiv.org/abs/2307.16559, Jul. 31, 2023.

Philippe M Burlina et al, "Automated Grading of Age-Related Macular Degeneration From Color Fundus Images Using Deep Convolutional Neural Networks"; JAMA Ophthalmology; vol. 135(11), pp. 1170-1176, Nov. 1, 2017. doi: 10.1001/jamaophthalmol.2017.3782. PMID: 28973096; PMCID: PMC5710387.

Stephanie J. Chiu et al, "Validated Automatic Segmentation of AMD Pathology Including Drusen and Geographic Atrophy in SD-OCT Images"; Investigative Ophthalmology & Visual Science; vol. 53, pp. 53-61, Jan. 2012. doi: 10.1167/iovs.11-7640. PMID: 22039246.

Jeffrey De Fauw et al, "Clinically applicable deep learning for diagnosis and referral in retinal disease"; Nature Medicine; vol. 24, pp. 1342-1350, Sep. 2018. https://doi.org/10.1038/s41591-018-0107-6.

Leyuan Fang et al., "Automatic segmentation of nine retinal layer boundaries in OCT images of non-exudative AMD patients using deep learning and graph search"; Biomedical Optics Express; vol. 8(5), pp. 2732-2744, Apr. 27, 2017. doi: 10.1364/BOE.8.002732. PMID: 28663902; PMCID: PMC5480509.

Florence Coscas et al, "Optical coherence tomography angiography in exudative age-related macular degeneration: a predictive model for treatment decisions"; British J. of Ophthalmology; vol. 103(9), pp. 1342-1346, Sep. 2019. doi: 10.1136/bjophthalmol-2018-313065. Epub Nov. 22, 2018. PMID: 30467129; PMCID: PMC6709766.

Hrvoje Bogunovic et al, "Machine Learning of the Progression of Intermediate Age-Related Macular Degeneration Based on OCT Imaging"; Investigative Ophthalmology & Visual Science; vol. 58(6), BIO141-BIO150, May 1, 2017. doi: 10.1167/iovs.17-21789. PMID: 28658477.

Maximilian W M Wintergerst et al, "Algorithms for the Automated Analysis of Age-Related Macular Degeneration Biomarkers on Optical Coherence Tomography: A Systematic Review"; Transactions on Vision Science Technology; vol. 6(4), p. 10, Jul. 18, 2017, doi: 10.1167/tvst.6.4.10. PMID: 28729948; PMCID: PMC5516568.

Cecilia S. Lee et al, "Deep-learning based, automated segmentation of macular edema in optical coherence tomography"; Biomedical Optics Express; vol. 8(7), pp. 3440-3448, Jul. 1, 2017. doi: 10.1364/BOE.8.003440. PMID: 28717579; PMCID: PMC5508840.

Cecilia S Lee et al, "Deep learning is effective for the classification normal versus Age-related Macular Degeneration OCT Images"; Ophthalmol Retina; vol. 1(4), pp. 322-327, Jul.-Aug. 2017. doi: 10.1016/j.oret.2016.12.009. Epub Feb. 13, 2017. PMID: 30693348; PMCID: PMC6347658.

Bart Liefers et al, "Automatic detection of the foveal center in optical coherence tomography"; Biomedical Optics Express; vol. 8(11), pp. 5160-5178, Nov. 1, 2017. doi: 10.1364/BOE.8.005160. PMID: 29188111; PMCID: PMC5695961.

Sijie Niu et al, "Automated geographic atrophy segmentation for SD-OCT images using region-based C—V model via local similarity factor"; Biomed Opt Express; vol. 7(2), pp. 581-600, Feb. 1, 2016.

Sijie Niu et al, "Automated detection of foveal center in SD-OCT images using the saliency of retinal thickness maps"; Medical Physics; vol. 44(12), pp. 6390-6403, Dec. 2017. doi: 10.1002/mp.12614. Epub Nov. 3, 2017. PMID: 28976639.

Jorge Oliveira et al, "Multi-surface segmentation of OCT images with AMD using sparse high order potentials"; Biomedical Optics Express; vol. 8, Issue 1, pp. 281-297, 2017. doi: 10.1364/BOE.8.000281. PMID: 28101418; PMCID: PMC5231299.

Zvia Burgansky-Eliash et al, "Optical Coherence Tomography Machine Learning Classifiers for Glaucoma Detection: A Preliminary Study"; Investigative Ophthalmology & Visual Science; vol. 46(11), pp. 4147-4152, Nov. 2005. doi: 10.1167/iovs.05-0366. PMID: 16249492; PMCID: PMC1941765.

Abhay Shah et al, "Multiple surface segmentation using convolution neural nets: application to retinal layer segmentation in OCT images"; Biomedical Optics Express; vol. 9(9), pp. 4509-4526, Sep. 1, 2018. doi: 10.1364/BOE.9.004509. PMID: 30615698; PMCID: PMC6157759.

Maximilian Treder et al, "Deep learning-based detection and classification of geographic atrophy using a deep convolutional neural network classifier"; Graefe's Archive for Clinical and Experimental Ophthalmology; vol. 256(11), pp. 2053-2060, Nov. 2018. doi: 10.1007/s00417-018-4098-2. Epub Aug. 8, 2018. PMID: 30091055.

Frangi et al., "Multiscale vessel enhancement filtering", Lecture Notes in Computer Science, LNCS vol. 1496, 130-137, Springer-Verlag. Germany. Available online: [https://www.researchgate.net/publication/2388170_Multiscale_Vessel_Enhancement_Filtering], (1998).

E. Rublee, V. Rabaud, K. Konolige and G. Bradski, "ORB: An efficient alternative to SIFT or SURF," 2011 International Conference on Computer Vision, Barcelona, Spain, 2011, pp. 2564-2571, doi: 10.1109/ICCV.2011.6126544.

PCT International Search Report for International Application No. PCT/IL2022/050557, mailed Sep. 26, 2022, 4pp.

PCT Written Opinion for International Application No. PCT/IL2022/050557, mailed Sep. 26, 2022, 9pp.

* cited by examiner

300

302
RECEIVE AN OCT SCAN AND AN IR IMAGE OF A SUBJECT

304
PRE-PROCESS THE OCT SLICES TO PERFORM COLUMN PATCH SELECTION

306
APPLY TRAINED MACHINE LEARNING MODEL TO CLASSIFY ATROPHY IN COLUMNS

308
CALCULATE ATROPHY SEGMENTS BASED ON THE CLASSIFIED COLUMNS

310
IDENTIFY AND SEGMENT LESIONS IN THE IR IMAGE

312
MEASURE LESIONS AREAS AND THEIR DISTANCE TO THE FOVEA

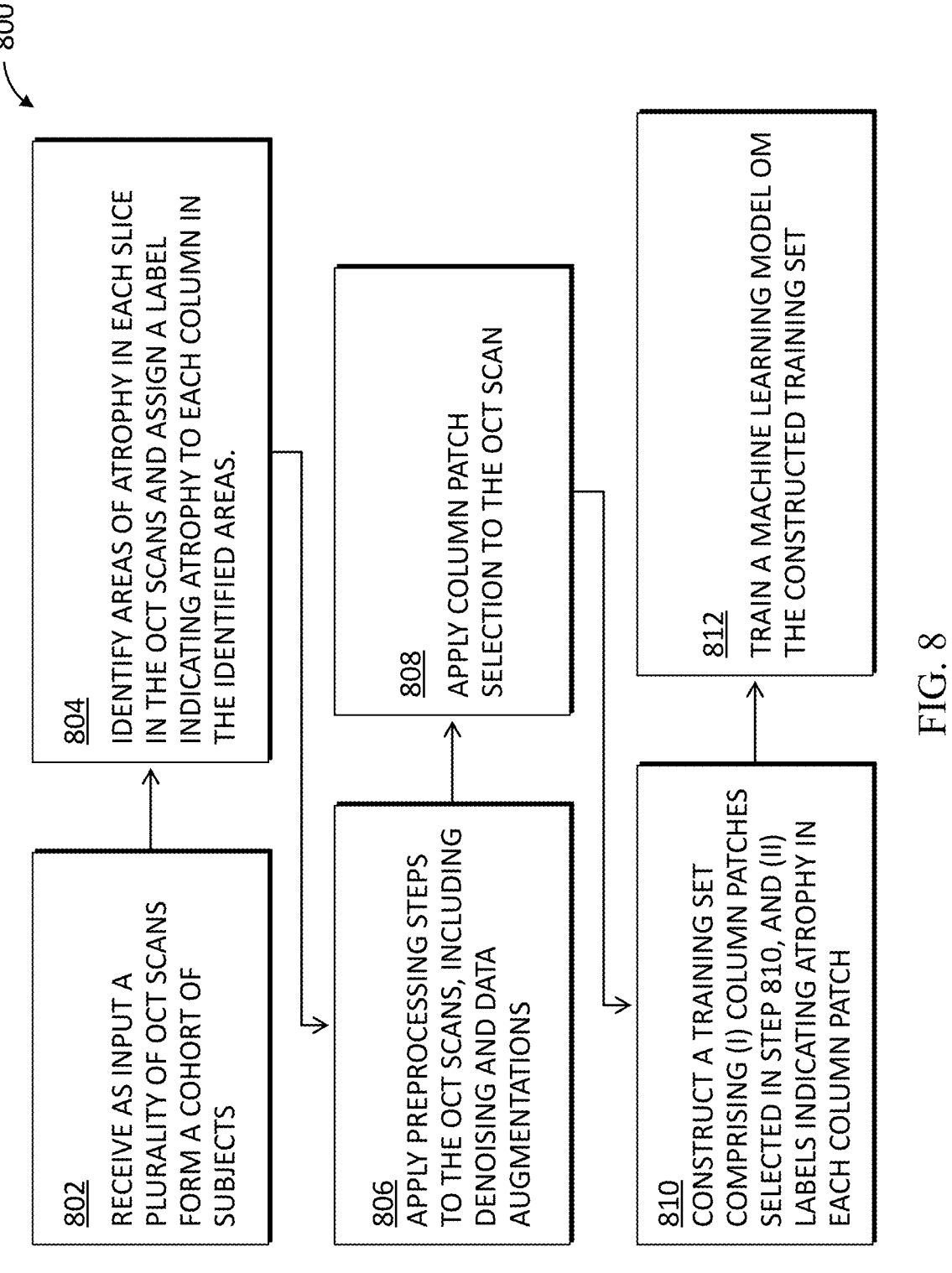

800

802
RECEIVE AS INPUT A PLURALITY OF OCT SCANS FORM A COHORT OF SUBJECTS

804
IDENTIFY AREAS OF ATROPHY IN EACH SLICE IN THE OCT SCANS AND ASSIGN A LABEL INDICATING ATROPHY TO EACH COLUMN IN THE IDENTIFIED AREAS.

806
APPLY PREPROCESSING STEPS TO THE OCT SCANS, INCLUDING DENOISING AND DATA AUGMENTATIONS

808
APPLY COLUMN PATCH SELECTION TO THE OCT SCAN

810
CONSTRUCT A TRAINING SET COMPRISING (I) COLUMN PATCHES SELECTED IN STEP 810, AND (II) LABELS INDICATING ATROPHY IN EACH COLUMN PATCH

812
TRAIN A MACHINE LEARNING MODEL OM THE CONSTRUCTED TRAINING SET

FIG. 8

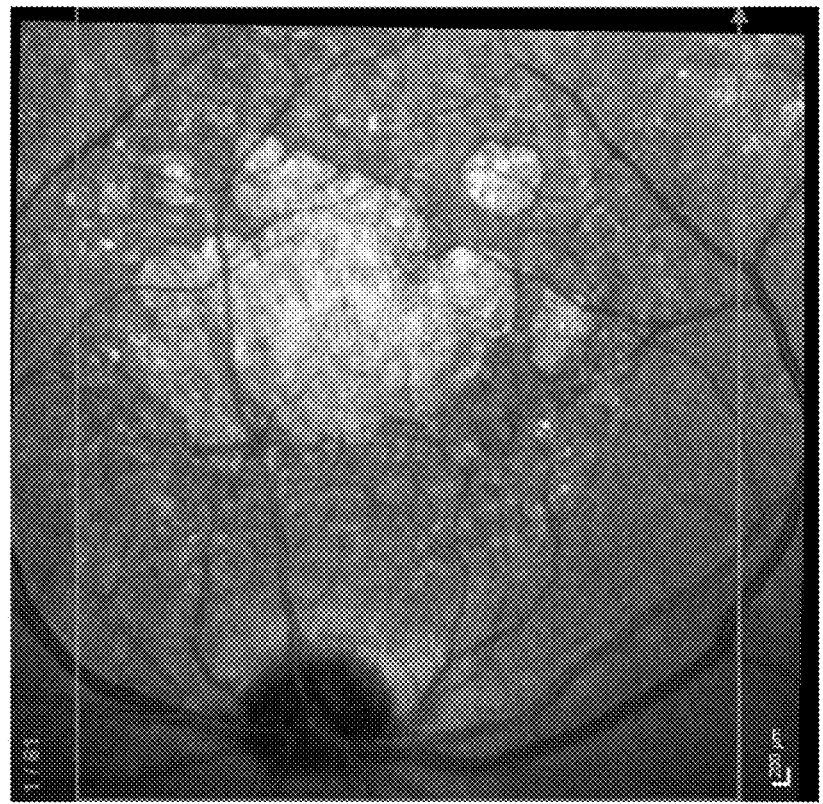
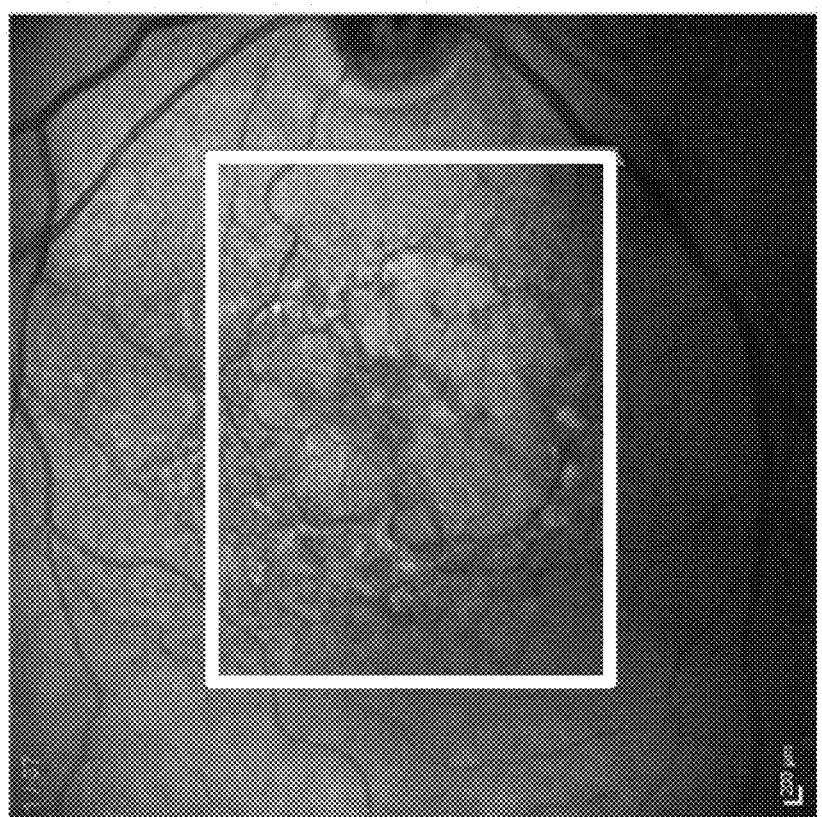
FIG. 14A

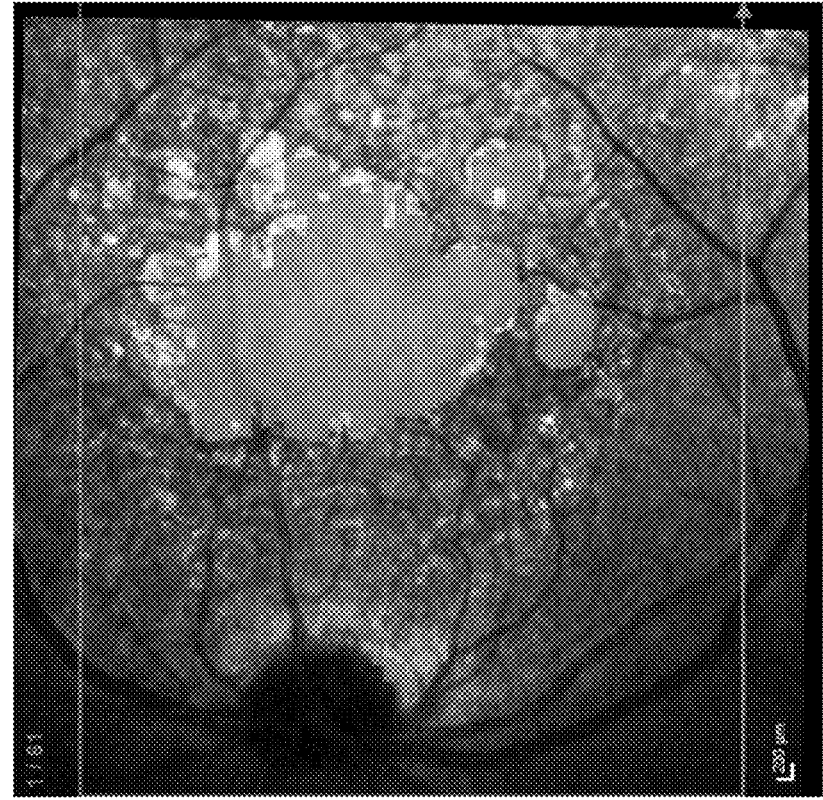
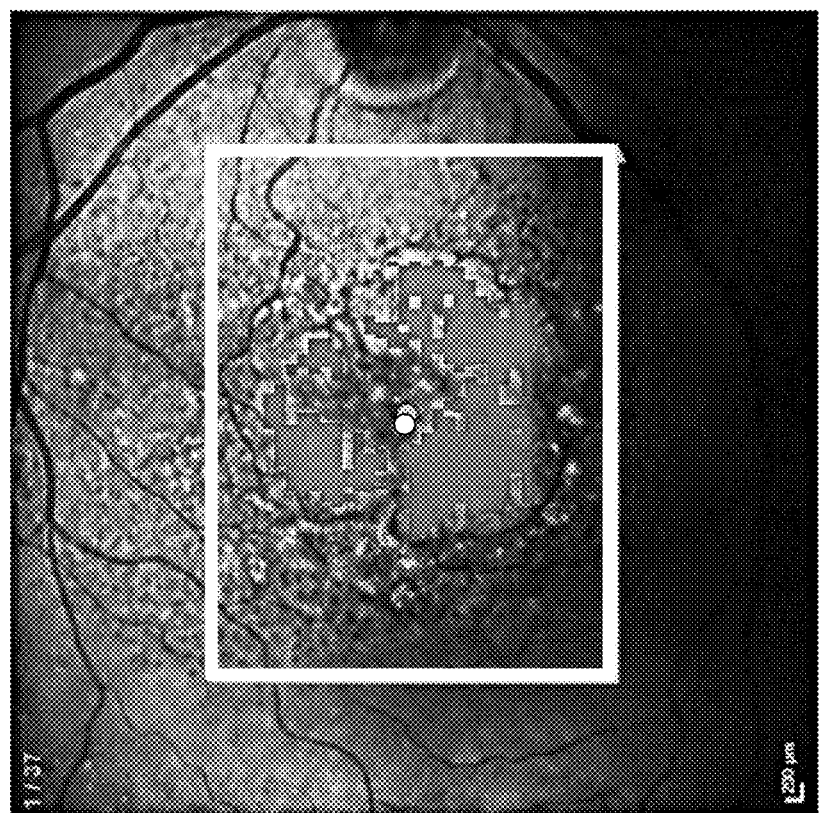
FIG. 14B

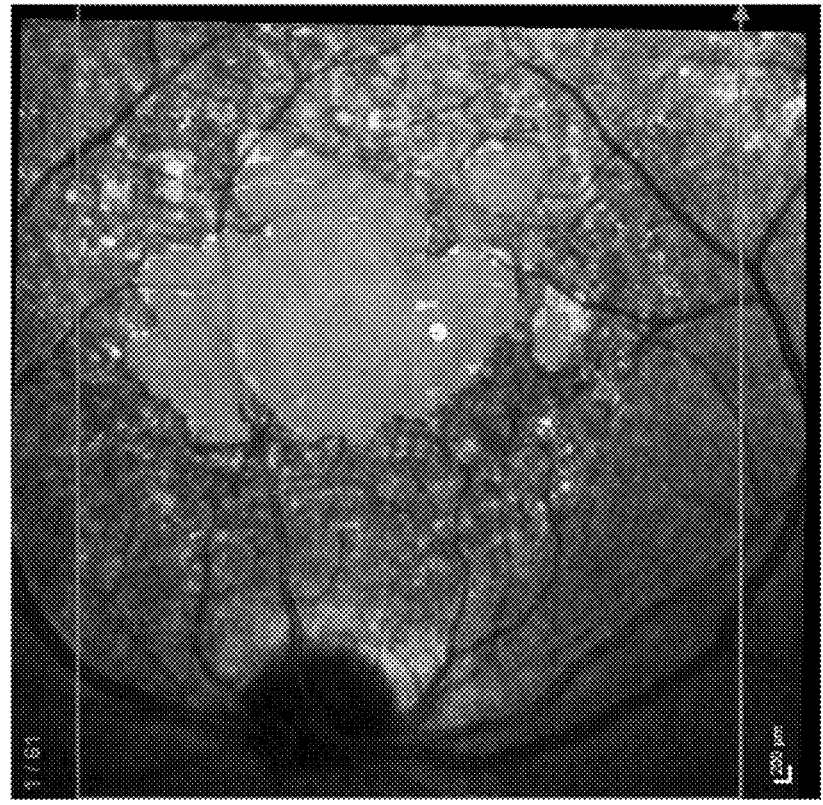
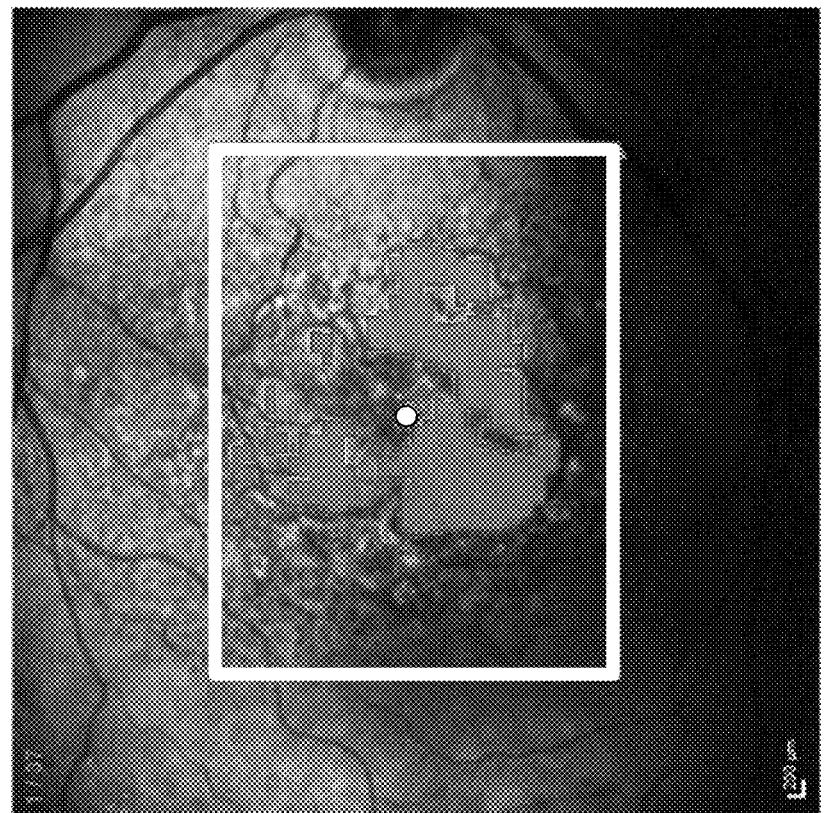
FIG. 14C

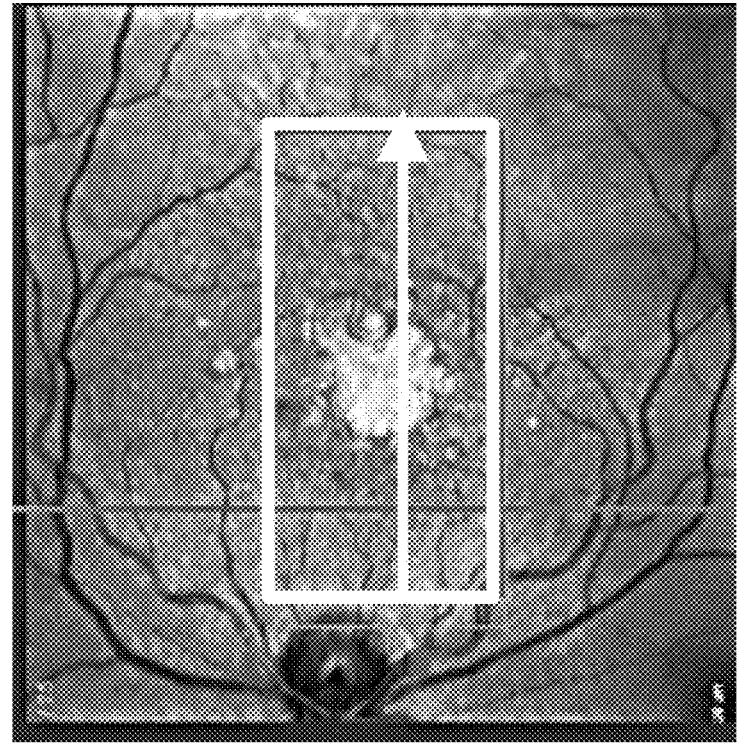
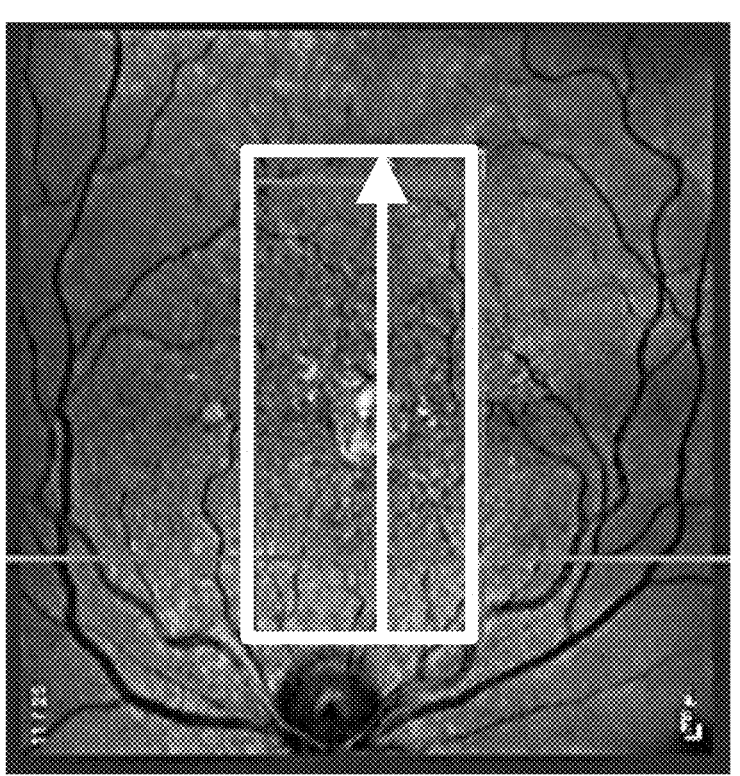
B
A
FIG. 16A

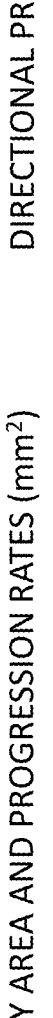
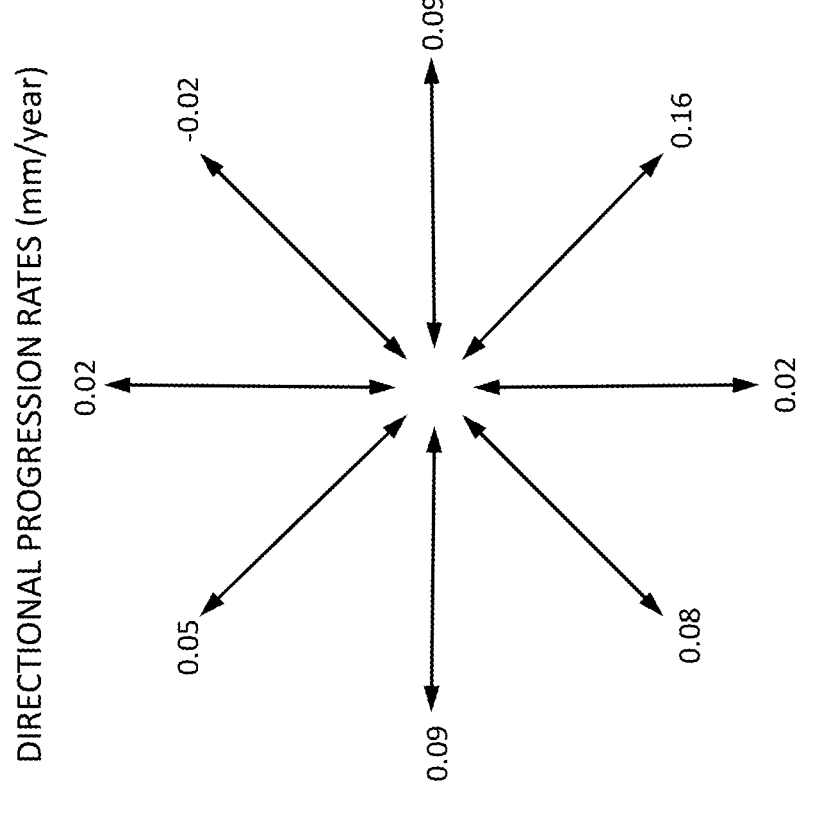
DIRECTIONAL PROGRESSION RATES (mm/year)
FIG. 19C
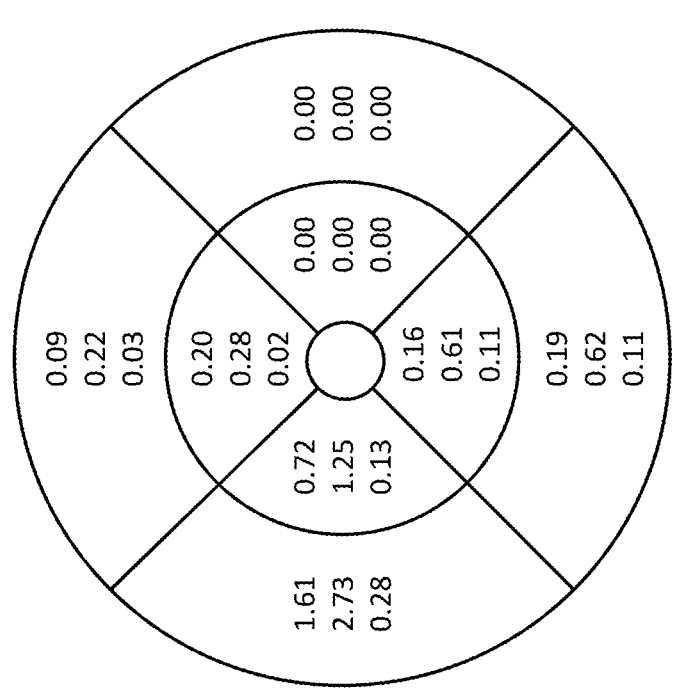
ATROPHY AREA AND PROGRESSION RATES (mm²)
FIG. 19B

MACHINE LEARNING CLASSIFICATION OF RETINAL ATROPHY IN OCT SCANS

CROSS-REFERENCE TO RELATED APPLICATIONS

This application is a National Phase of PCT Patent Application No. PCT/IL2022/050557 having an International filing date of May 25, 2022, which claims the benefit of priority from U.S. Provisional Patent Application 63/193, 350, filed Aug. 12, 2021, the contents of both of which are hereby incorporated herein in their entirety by reference.

BACKGROUND

This invention relates to the field of machine learning.

Geographic atrophy (GA) is a chronic progressive degeneration of the macula, as part of age-related macular degeneration (AMD). The disease is characterized by localized atrophy of outer retinal tissue, retinal pigment epithelium and choriocapillaris. AMD is the leading cause of blindness in people over 65 years of age in western countries, and affects about 1 in 4 adults over the age of 75. The quantification of retinal atrophy associated with AMD is crucial for clinical diagnosis, follow-up, treatment efficacy evaluation, and clinical research.

Several imaging technologies enable the quantitative morphological assessment of macular atrophy: color fundus photography (CFP), fundus autofluorescence (FAF), infrared imaging (IR), and volumetric spectral domain optical coherence tomography (SD-OCT, or simply OCT). The most accurate and early diagnosis is provided by OCT imaging. OCT scans provide repeatable anatomic landmarks for objective measurements, as opposed to FAF and IR which may display more variability, because of the significant variability in the image intensities due to illumination differences and the unknown cornea curvature. Thus, OCT has become an essential imaging technology to evaluate the macula.

However, manual analysis of OCT scans for accurate diagnosis is a non-standardized, subjective process with significant inter-observer variability. The image data volume generated by OCT scanning is high, with between 40-60 or more slices (B-Scans) per examination. Consequently, the unaided manual analysis of OCT scans is tedious, time consuming, and impractical in a clinical setup.

The foregoing examples of the related art and limitations related therewith are intended to be illustrative and not exclusive. Other limitations of the related art will become apparent to those of skill in the art upon a reading of the specification and a study of the figures.

SUMMARY OF THE INVENTION

The following embodiments and aspects thereof are described and illustrated in conjunction with systems, tools and methods which are meant to be exemplary and illustrative, not limiting in scope.

There is provided, in an embodiment, a system comprising at least one hardware processor; and a non-transitory computer-readable storage medium having stored thereon program instruction, the program instructions executable by the at least one hardware processor to: receive (i) a first OCT scan, and (ii) a second OCT scan taken subsequent to the first OCT scan, each comprising one or more two-dimensional (2D) scan images of an eye of a subject, receive a first retinal image of the eye of the subject associated with the first OCT scan, and a second retinal image of the eye of the subject associated with the second OCT scan, match corresponding first and second pixel column patches, each comprising one or more pixel columns, associated respectively with the scan images of the first and second OCT scans, based, at least in part, on performing image registration between the scan images of the first and second OCT scans, and use the matched corresponding first and second pixel column patches as input for a trained machine learning model, wherein an output of the trained machine learning model classifies the second pixel column patches as representing retinal atrophy or not representing retinal atrophy.

There is also provided, in an embodiment, a computer-implemented method comprising: receiving (i) a first OCT scan, and (ii) a second OCT scan taken subsequent to the first OCT scan, each comprising one or more two-dimensional (2D) scan images of an eye of a subject; receiving a first retinal image of the eye of the subject associated with the first OCT scan, and a second retinal image of the eye of the subject associated with the second OCT scan; matching corresponding first and second pixel column patches, each comprising one or more pixel columns, associated respectively with the scan images of the first and second OCT scans, based, at least in part, on performing image registration between the scan images of the first and second OCT scans; and using the matched corresponding first and second pixel column patches as input for a trained machine learning model, wherein an output of the trained machine learning model classifies the second pixel column patches as representing retinal atrophy or not representing retinal atrophy.

There is further provided, in an embodiment, a computer program product comprising a non-transitory computer-readable storage medium having program instructions embodied therewith, the program instructions executable by at least one hardware processor to: receive (i) a first OCT scan, and (ii) a second OCT scan taken subsequent to the first OCT scan, each comprising one or more two-dimensional (2D) scan images of an eye of a subject; receive a first retinal image of the eye of the subject associated with the first OCT scan, and a second retinal image of the eye of the subject associated with the second OCT scan; match corresponding first and second pixel column patches, each comprising one or more pixel columns, associated respectively with the scan images of the first and second OCT scans, based, at least in part, on performing image registration between the scan images of the first and second OCT scans; and use the matched corresponding first and second pixel column patches as input for a trained machine learning model, wherein an output of the trained machine learning model classifies the second pixel column patches as representing retinal atrophy or not representing retinal atrophy.

In some embodiments, the program instructions are further executable to project, and the method further comprises projecting, the classified second pixel column patches onto the second retinal image, based, at least in part, on identifying a field-of-view of the second OCT scan within the second retinal image, to indicate segments in the second retinal image that are corresponding to the classified second pixel column patches representing retinal atrophy. In some embodiments, the program instructions are further executable to calculate, and the method further comprises calculating, at least one atrophy parameter, based, at least in part, on the indicated segments in the retinal image.

In some embodiments, each of the indicated segments in the retinal image represents an atrophy lesion.

In some embodiments, the machine learning model is trained on a training dataset comprising: a plurality of matched pairs of pixel column patches associated with scan images from a plurality of pairs of first and second OCT scans obtained from a cohort of subjects; and labels associated with the presence of retinal atrophy lesions in each of the matched pairs of pixel column patches.

In some embodiments, the pixel column patches are two-dimensional and comprise two or more pixel columns from a single one of the scan images.

In some embodiments, the pixel column patches are three-dimensional and comprise two or more pixel-columns from two or more consecutive ones of the scan images.

In some embodiments, the image registration is based, at least in part, on a known spatial relation between the first OCT scan and the first retinal image, and the second OCT scan and the second retinal image.

In some embodiments, the classifying by the trained machine learning model is based on features representing light scattering patterns in each of the pixel column patches.

In some embodiments, the features represent the light scattering patterns across all retinal layers and below the RPE layer of the eye of the subject.

In some embodiments, the at least one atrophy parameter is selected from the group consisting of: a number of detected atrophy lesions, an area of each of the detected atrophy lesions, a total area of all of the detected atrophy lesions, and a distance from the fovea of each of the detected atrophy lesions.

In some embodiments, the retinal image is obtained using infrared imaging.

There is further provided, in an embodiment, a computer-implemented method comprising: receiving a series of consecutive OCT scans, each comprising one or more two-dimensional (2D) scan images of an eye of a subject; receiving a series of consecutive retinal images, each corresponding to one of the series of consecutive OCT scans; with respect to each consecutive pair comprising a first and second OCT scans in the series of consecutive OCT scan, matching corresponding first and second pixel column patches, each comprising one or more pixel columns, associated respectively with the scan images of the first and second OCT scans, based, at least in part, on performing image registration between the scan images of the first and second OCT scans; and using the matched corresponding first and second pixel column patches as input for a trained machine learning model, wherein an output of the trained machine learning model classifies the second pixel column patches as representing retinal atrophy or not representing retinal atrophy.

In some embodiments, the method further comprises: (i) projecting, with respect to each of the consecutive pairs comprising a first and second OCT scans, the classified second pixel column patches onto the retinal image corresponding to the second OCT scan in the pair, to indicate segments in the retinal image corresponding to the second OCT scan in the pair that are corresponding to the classified second pixel column patches representing retinal atrophy; and (ii) calculating at least one atrophy parameter, based, at least in part, on the indicated segments in the retinal image.

In some embodiments, the method further comprises calculating at least one atrophy parameter, based, at least in part, on all of the indicated segments with respect to all of the consecutive pairs of OCT scans.

There is further provided, in an embodiment, a system comprising at least one hardware processor; and a non-transitory computer-readable storage medium having stored thereon program instruction, the program instructions executable by the at least one hardware processor to: receive an OCT scan of an eye of a subject, wherein the OCT scan comprises one or more two-dimensional (2D) scan images, receive a retinal image of the eye of the subject associated with the OCT scan, divide the one or more scan images into pixel column patches, each comprising one or more pixel columns, and use the pixel column patches as input to a trained machine learning model, to classify each of the pixel column patches as representing retinal atrophy or not representing retinal atrophy.

There is further provided, in an embodiment, a computer-implemented method comprising: receiving an OCT scan of an eye of a subject, wherein the OCT scan comprises one or more two-dimensional (2D) scan images; receiving a retinal image of the eye of the subject associated with the OCT scan; dividing the one or more scan images into pixel column patches, each comprising one or more pixel columns; and using the pixel column patches as input to a trained machine learning model, to classify each of the pixel column patches as representing retinal atrophy or not representing retinal atrophy.

There is further provided, in an embodiment, a computer program product comprising a non-transitory computer-readable storage medium having program instructions embodied therewith, the program instructions executable by at least one hardware processor to: receive an OCT scan of an eye of a subject, wherein the OCT scan comprises one or more two-dimensional (2D) scan images; receive a retinal image of the eye of the subject associated with the OCT scan; divide the one or more scan images into pixel column patches, each comprising one or more pixel columns; and use the pixel column patches as input to a trained machine learning model, to classify each of the pixel column patches as representing retinal atrophy or not representing retinal atrophy.

In some embodiments, the program instructions are further executable to project, and the method further comprises projecting, the classified one or more pixel column patches onto the retinal image, based, at least in part, on identifying a field-of-view of the OCT scan within the retinal image, to indicate segments in the retinal image that are corresponding to the pixel column patches representing retinal atrophy. In some embodiments, the program instructions are further executable to calculate, and the method further comprises calculating, at least one atrophy parameter based, at least in part, on the indicated segments in the retinal image.

In some embodiments, the indicated segments in the retinal image represent atrophy lesions.

In some embodiments, the machine learning model is trained on a training dataset comprising: (i) a plurality of pixel column patches associated with scan images from a plurality of retinal OCT scans obtained from a cohort of subjects; and (ii) labels associated with the presence of retinal atrophy lesions in each of the pixel column patches.

In some embodiments, the pixel column patches are two-dimensional and comprise two or more pixel columns from a single one of the scan images.

In some embodiments, the pixel column patches are three-dimensional and comprise two or more pixel-columns from two or more consecutive ones of the scan images.

In some embodiments, the classifying by the trained machine learning model is based on features representing light scattering patterns in each of the pixel column patches.

In some embodiments, the features represent the light scattering patterns across all retinal layers and below the RPE layer of the eye of the subject.

In some embodiments, the at least one atrophy parameter is selected from the group consisting of: a number of detected atrophy lesions, an area of each of the detected atrophy lesions, a total area of all of the detected atrophy lesions, and a distance from the fovea of each of the detected atrophy lesions.

In some embodiments, the retinal image is obtained using infrared imaging.

In addition to the exemplary aspects and embodiments described above, further aspects and embodiments will become apparent by reference to the figures and by study of the following detailed description.

BRIEF DESCRIPTION OF THE FIGURES

The present invention will be understood and appreciated more comprehensively from the following detailed description taken in conjunction with the appended drawings in which:

FIG. 8 is a flowchart illustrating the functional steps in a method for training a machine learning model to perform classification of columns patches in OCT scans, which indicates the presence or absence of atrophy in the classified column patch, in accordance with some embodiments of the present invention;

FIGS. 14A-14C show examples of the results of the fovea location and cRORA atrophy lesion computation, according to some embodiments of the present technique;

FIGS. 16A-16B show an example of registered first and subsequent pair of OCT studies of a patient with dry AMD, in accordance with some embodiments of the present invention;

FIGS. 19A-19C show an exemplary atrophy report comprising segmented atrophy regions, and area-based and directional disease progression report, in accordance with some embodiments of the present invention;

DETAILED DESCRIPTION

Figure 1A:
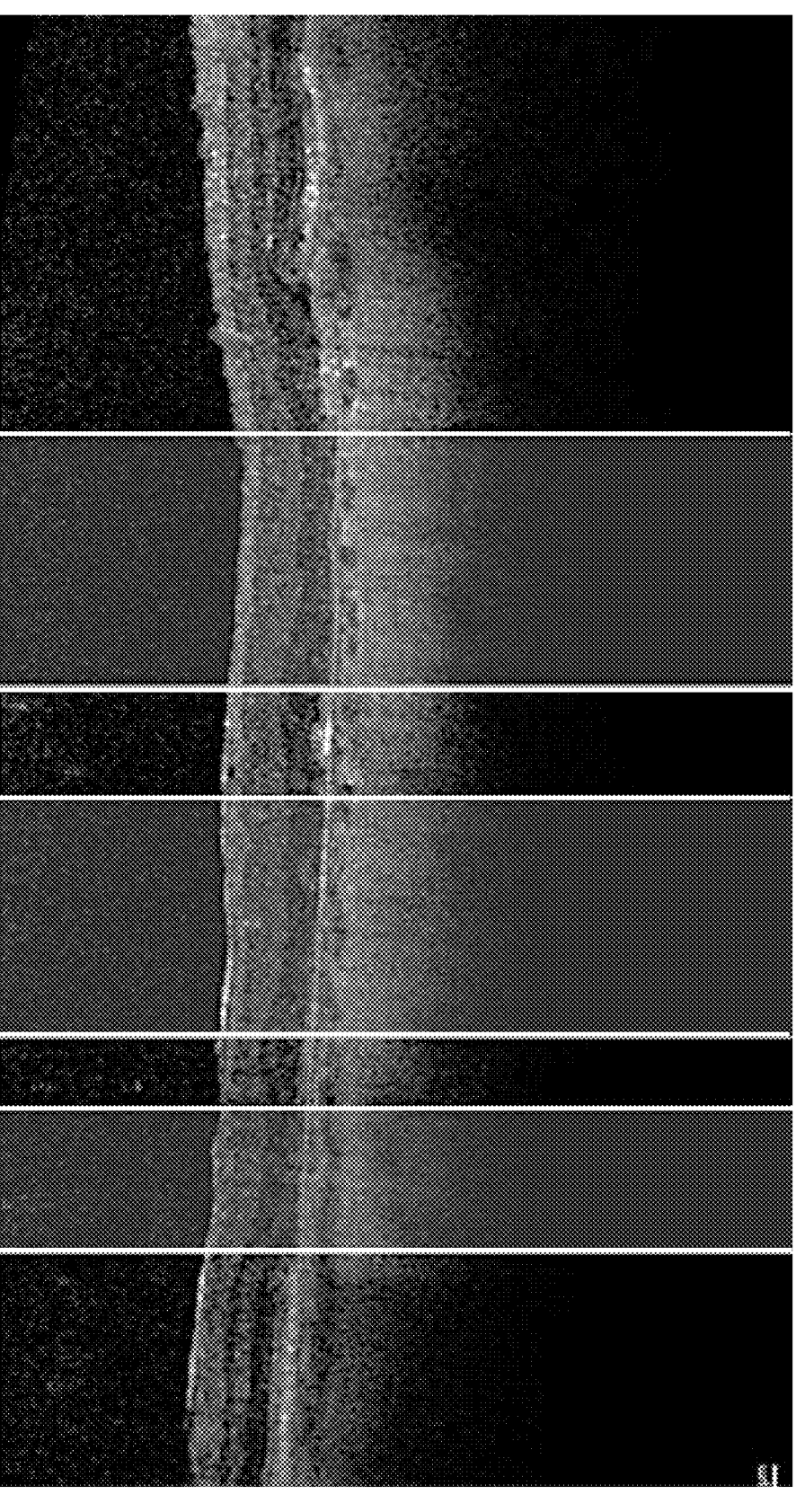
FIGS. 1A-1B illustrate an example of an OCT study of a patient with macular atrophy, according to some embodiments of the present invention.

Disclosed herein is a technique, embodied in a system, method, and computer program product, for automated detection and quantification of atrophy in a subject, based on volumetric scans obtained by optical coherence tomography (OCT) imaging. In some embodiments, the present technique provides for the automated objective quantification of retinal atrophy associated with age-related macular degeneration (AMD). In some embodiments, the present technique further provides for a visualization of the atrophy quantification results in corresponding infrared imaging (IR).

As used herein, 'atrophy' means any lesion of dry AMD at some stage, and may be generally interchangeably referred to as 'geographic atrophy' (GA), 'retinal atrophy,' 'macular atrophy,' or simply 'atrophy.'

As atrophy progresses, there may be profound effects on visual function, especially when it involves the macula. The pathogenic macular atrophy mechanisms are still unclear and there is currently no available treatment to repair damaged retinal pigment epithelium (RPE) or photoreceptor cells to help restore lost vision in eyes with advanced atrophy.

A consensus paper by specialists in the field (see, Sadda, S. R., et al. Consensus definition for atrophy associated with age-related macular degeneration on OCT: classification of atrophy report 3. Ophthalmology 125:537-548.) adopted a four-class classification system of retinal atrophy associated with AMD:

Complete RPE and outer retinal atrophy (cRORA),
incomplete RPE and outer retinal atrophy (iRORA),
complete outer retinal atrophy (cORA), and
incomplete outer retinal atrophy (iORA).

The present technique is based on a key observation by the present inventors that macular atrophy appears in OCT slices as horizontal segments in B-scans. By analyzing the outer retinal degeneration and the light transmission in the choroid layer beneath the retina of columns in each OCT slice, the extent of atrophy can be determined and the atrophy segments can be identified and quantified.

In some embodiments, the present technique provides for automated analysis of imaging studies of patients with advanced dry AMD. In some embodiments, the present technique is based on the classification of light scattering patterns in vertical pixel-wide columns (A-scans) in OCT slices (B-scans) in which atrophy appears, using a trained machine learning model. The machine learning model classifies individual columns with 3D column patches formed by adjacent neighboring columns from the volumetric OCT scan. Individual atrophy columns form atrophy segments which are then projected onto a corresponding IR image and are used to identify and segment atrophy lesions in the IR image and to measure their areas and distances from the fovea.

In some embodiments, the present technique further provides for identification and quantification of both cRORA and non-cRORA atrophies in OCT scans. By way of background, cRORA, the most severe form of AMD-related atrophy, is clearly defined as a zone of homogenous choroidal hyper transmission and absence of the RPE layer measuring 250 μm or more with overlying outer retinal thinning and loss of photoreceptors. In contrast, non-cRORA forms of AMD-related atrophy (i.e., non-complete macular atrophy, such as iRORA, cORA, iORA) may have subtle differences among them and thus may be challenging to sub-classify manually, even by a trained grader.

In some embodiments, the present technique is particularly effective in the automated identification and quantification of dry AMD atrophy. In some embodiments, the present technique provides for the identification and quantification of retinal atrophy in OCT scans of, e.g., retinal pigment epithelium and outer retinal atrophy (RORA); complete retinal pigment epithelium and outer retinal atrophy (cRORA); outer retinal atrophy of other etiologies, e.g., retinal dystrophies, vascular atrophy, toxic and inflammatory conditions; the segmentation of the atrophy segments and lesions; their visualization in the corresponding infrared (IR) image; and the measurement of the atrophy lesions area and their distance from the fovea.

Figure 1B:
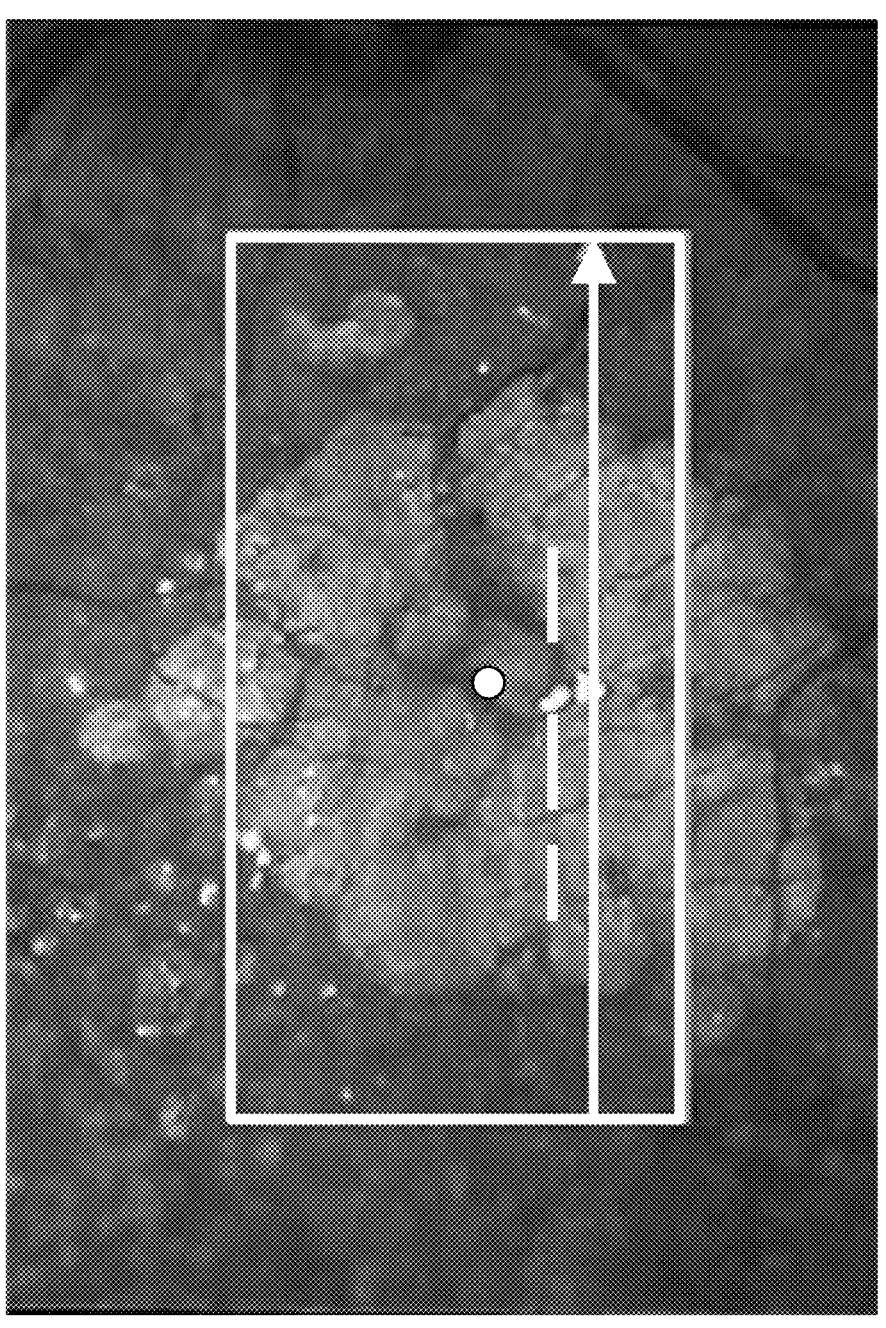

FIGS. 1A-1B illustrate an example of an OCT study of a patient with macular atrophy according to the present technique. FIG. 1A shows an OCT scan overlaid with vertical lines demarcating the boundaries of cRORA atrophy segments. FIG. 1B shows the corresponding IR image overlaid with the OCT scan field of view (FOV) represented as a rectangle, and the OCT slice position (represented by an arrow line). Overlaid on the IR image are the atrophy segments (marked by black horizontal lines) corresponding to the atrophy segments and their boundary columns on the OCT slice. The location of the fovea is marked by a black dot. As can be seen, the RPE layer inside the atrophy segments in the OCT slice shows degeneration, and the scattering pattern inside and adjacent to the atrophy segments is pronounced.

As used herein, 'volumetric imaging' or 'volumetric scans' may refer broadly to techniques and processes for creating visual representations of internal anatomical structures throughout the human body, including organs, bones, blood vessels, vertebrae, as well as unhealthy structures (tumors, injuries, lesions, and the like). Volumetric imaging techniques include, among others, optical computed tomography (OCT), computed tomography (CT), magnetic resonance imaging (MRI), positron emission tomography (PET), and single photon emission tomography. Volumetric imaging techniques typically produce an image dataset comprising a series of two-dimensional (2D) cross-sectional 'slice' images acquired through the scanned volume. A three-dimensional (3D) volume can then be constructed from the image dataset.

As used herein, 'OCT' refers to optical coherence tomography imaging, which uses low-coherence light to capture micrometer-resolution, two- and three-dimensional images from within optical scattering media (e.g., biological tissue). Optical coherence tomography is based on low-coherence interferometry, typically employing near-infrared light. The use of relatively long wavelength light allows it to penetrate into the scattering medium. OCT may be employed in ophthalmology and optometry, where it can be used to obtain detailed images from within the retina.

With reference to OCT scans, the term 'A-scan' (or axial scan) refers to a pixel-wide column sampled throughout the depth dimension of an object. A 'B-scan' is a two-dimensional frame composed of a series of A-scans of the object acquired along an axis at regular intervals. A 'C-scan' is an array of parallel B-scans which provide a volumetric study of the object.

As used herein, 'image segmentation' refers to the process of partitioning an image into different semantically meaningful segments, which may correspond to different tissue classes, organs, pathologies, and/or other biologically-relevant structures, for example through a binary classification of pixels or voxels in an image.

The main challenges of retinal atrophy identification and segmentation in OCT slices are the subtle differences between healthy, incomplete, and complete atrophy segments, and the indistinct boundaries between them. Existing methods rely on the identification and segmentation of the individual retinal layers, on the quantification of their thickness, and on the identification of the presence or absence of retinal atrophy. These are challenging tasks, as there are ten retinal layers whose appearances and boundaries have significant variations. Machine learning and deep learning methods require creating annotated OCT slices datasets in which some of the retinal layers have been manually delineated by an expert—a very time-consuming and tedious task. Moreover, the axis-aligned patches used for convolutional neural network (CNN) classification include only a few retinal layers.

Accordingly, in some embodiments, the present technique provides for retinal atrophy identification and segmentation in OCT slices based on a scattering pattern within pixel-(2D) and/or voxel-(3D) wide vertical depth-dimension columns that traverse and include all retinal layers, and extending below the RPE layer. In some embodiments, this is based on the observation is that macular atrophy appears in OCT slices as segments in which the retinal layers have degenerated or disappeared. This usually results in a scattering effect that yields additional bright dense intensity values beneath the retina layers (as can be seen in the demarcated segments in FIG. 1A).

By way of background, in OCT scanning, the scan light comes from the top and traverses the horizontal stack of retinal layers. As the light traverses the retinal layers, it is scattered in patterns which depend on the tissue properties and on the thickness of each layer. This results in different scattering patterns that appear in the OCT slices. In each OCT slice, each column (i.e., a pixel- or voxel-wide vertical vector) is a cross-section of the layers. In healthy regions, all layers are present, and thus the scattering is minimal with nearly no light below the retinal layers. In contrast, in the presence of atrophy, the RPE layers are thinner or missing altogether (RPE attenuation), which results in more significant scattering (e.g., hyper transmission), as a greater amount of light penetrates through the retinal layers. Thus, atrophy regions can be identified in OCT slices by analyzing the scattering pattern of each column, and quantifying the severity of dry AMD. By taking into account the neighboring OCT slices, a 3D column incorporates the spatial characteristics of the light scattering pattern.

In some embodiments, the present technique is based on the classification of light scattering patterns associated in columns of vertical pixel-wide vectors (A-scans) in OCT slices (B-scans), using a trained machine learning model.

In some embodiments, the present technique provides for training a machine learning model for detection and/or classification of retinal atrophy in volumetric scan slices, e.g., OCT scans, by classification of features representing light scattering patterns as captured in the volumetric scan slices. In some embodiments, features representing light scattering patterns within vertical columns of volumetric scan slices are classified by the trained machine learning model in order to detect the presence of retinal atrophy within retinal layers represented within the pixels of the vertical columns. The advantages of the column approach over the existing retinal layer/retinal patch approaches is that the column approach produces features which represent light scattering across all retinal layers, as well as the scattering pattern below the last RPE layer. It obviates the need for retinal layer segmentation, by representing locally the entire retinal layer structure at once.

In some embodiments, the trained machine learning model of the present technique may be applied to slices from an OCT of a subject, to classify each column in each OCT slice as either showing dry AMD atrophy or not. The classification of each column is performed on a column patch formed by adjacent neighboring columns to the left and right of a central column. Successive atrophy columns form atrophy segments, wherein there may be more than one atrophy segment per OCT slice. These atrophy segments are projected onto a binary atrophy segments matrix that is then used to identify and segment atrophy lesions in the IR image and to perform measurements.

A potential advantage of the present technique is, therefore, in that it provides for an automated, accurate and reliable radiomics-based analysis of retinal OCT imaging scans of patients with advanced macular degeneration, atrophy associated with AMD, and addresses a current unmet clinical need. In some embodiments, the present technique provides a computerized tool that may help to alleviate one of the main problems in ophthalmology, i.e., the high number of patients and the associated retinal images that have to be reviewed by ophthalmologists in every visit, which is currently performed manually. The reduction of time, the detection of subtle changes, and the reduction of observer bias and intra-observer variability can be of great help to improve everyday ophthalmic examinations. The present technique may also provide a useful tool for further research and for clinical applications. These include the quantitative longitudinal evaluation of disease progression, the evaluation of the potential efficacy of new treatments, and the development of disease progression prognosis.

In some embodiments, the present technique can be directly applied to dry AMD of various categories of atrophy (iORA, cORA, IRORA), and the only changes required are the generation of corresponding ground truth labeling.

In some embodiments, the present technique provides for accurate classification and segmentation of healthy, incomplete and complete retinal dry AMD atrophy in OCT scan slices based on light scattering patters in column patches; quantification of the atrophy lesions area, the number of atrophy lesions, and the distance of each atrophy lesion from the fovea; and a visual display of the atrophy lesions computed from the OCT scan onto IR image.

In some embodiments, the present technique is fully automated; relies on easy-to-acquire training data; requires significantly fewer manual annotations than existing methods; provides a user-friendly GUI viewer and editor for the visualization, delineation, and correction of AMD-related retinal atrophy in OCT scans and IR images; and provides clinically relevant measures for the evaluation of dry AMD retinal atrophy.

Figure 2:
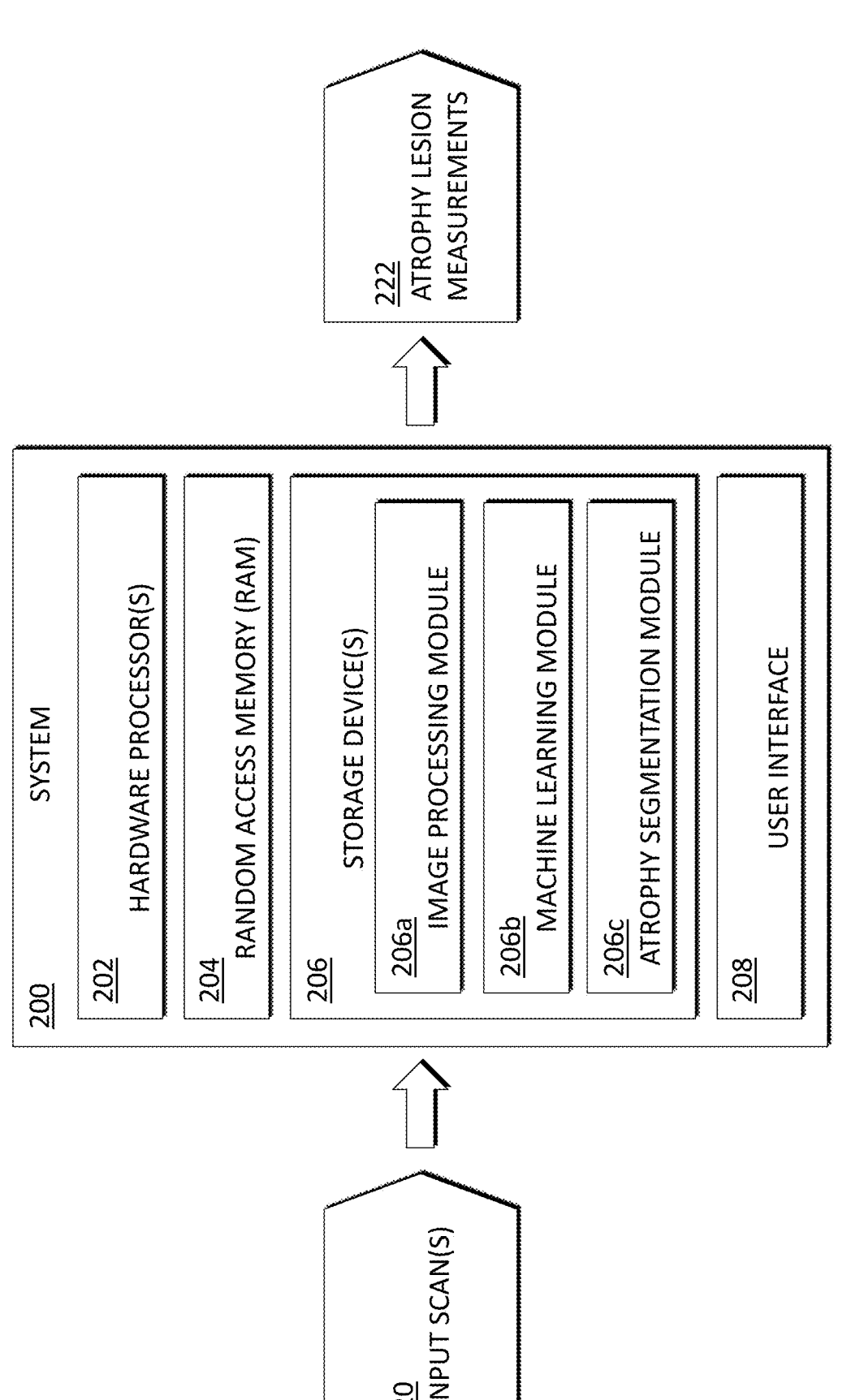
FIG. 2 is a block diagram of an exemplary atrophy detection and quantification system for automated detection and quantification of macular atrophy, based on volumetric scans obtained by optical coherence tomography (OCT) imaging, in accordance with some embodiments of the present invention.

FIG. 2 is a block diagram of an exemplary atrophy detection and quantification system 200 for automated detection and quantification of macular atrophy in a subject, based on volumetric scans obtained by optical coherence tomography (OCT) imaging, in accordance with some embodiments of the present invention.

In some embodiments, system 200 may comprise a hardware processor 202, and a random-access memory (RAM) 204, and/or one or more non-transitory computer-readable storage device 206. In some embodiments, system 200 may store in storage device 206 software instructions or components configured to operate a processing unit (also 'hardware processor,' 'CPU,' 'quantum computer processor,' or simply 'processor'), such as hardware processor 202. In some embodiments, the software components may include an operating system, including various software components and/or drivers for controlling and managing general system tasks (e.g., memory management, storage device control, power management, etc.) and facilitating communication between various hardware and software components. Components of system 200 may be co-located or distributed, or the system may be configured to run as one or more cloud computing 'instances,' 'containers,' 'virtual machines,' or other types of encapsulated software applications, as known in the art.

The software instructions and/or components operating hardware processor 202 may include instructions for receiving and analyzing multiple scan slices captured by any suitable volumetric imaging system. For example, hardware processor 202 may comprise image processing module 206a, a machine learning module 206b, and an atrophy segmentation module 206c, comprising one or more neural networks. Image processing module 202 receives as input volumetric scan 220 and applies one or more image processing algorithms thereto. In some embodiments, image processing module 206a comprises one or more algorithms configured to perform object detection, classification, segmentation, and/or any other similar operation, using any suitable image processing, algorithm technique, and/or feature extraction process. The input scan 220 may come from various imaging devices having varying settings, configuration and/or scan acquisition parameters. Depending on the embodiment, the image processing module 206a can route scans through various processing functions, or to an output circuit that sends the processed scans for presentation, e.g., on a display, to a recording system, across a network, or to another logical destination. The image processing module 206a may apply scan processing algorithms alone or in combination. Image processing module 206a may also facilitate logging or recording operations with respect to an input scan 220.

Machine learning module 206b may comprise any one or more neural networks (i.e., which include one or more neural network layers), and can be implemented to embody any appropriate neural network architecture, e.g., U-Net, Mask R-CNN, DeepLab, and the like. In a particular example, machine learning module 206*b* may include an input layer followed by a sequence of shared convolutional neural network layers. The output of the final shared convolutional neural network layer may be provided to a sequence of one or more additional neural network layers that are configured to generate the object detection data. However, other appropriate neural network processes may also be used, however. The output of the final shared convolutional neural network layers may be provided to a different sequence of one or more additional neural network layers.

In some embodiments, system 200 may further comprise a user interface 208 comprising, e.g., a display monitor for displaying images, a control panel for controlling system 200, and a speaker for providing audio feedback.

System 200 as described herein is only an exemplary embodiment of the present invention, and in practice may be implemented in hardware only, software only, or a combination of both hardware and software. System 200 may have more or fewer components and modules than shown, may combine two or more of the components, or may have a different configuration or arrangement of the components. System 200 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 200 may be co-located or distributed, or the system may be configured to run as one or more cloud computing 'instances,' 'containers,' 'virtual machines,' or other types of encapsulated software applications, as known in the art.

Figure 3:
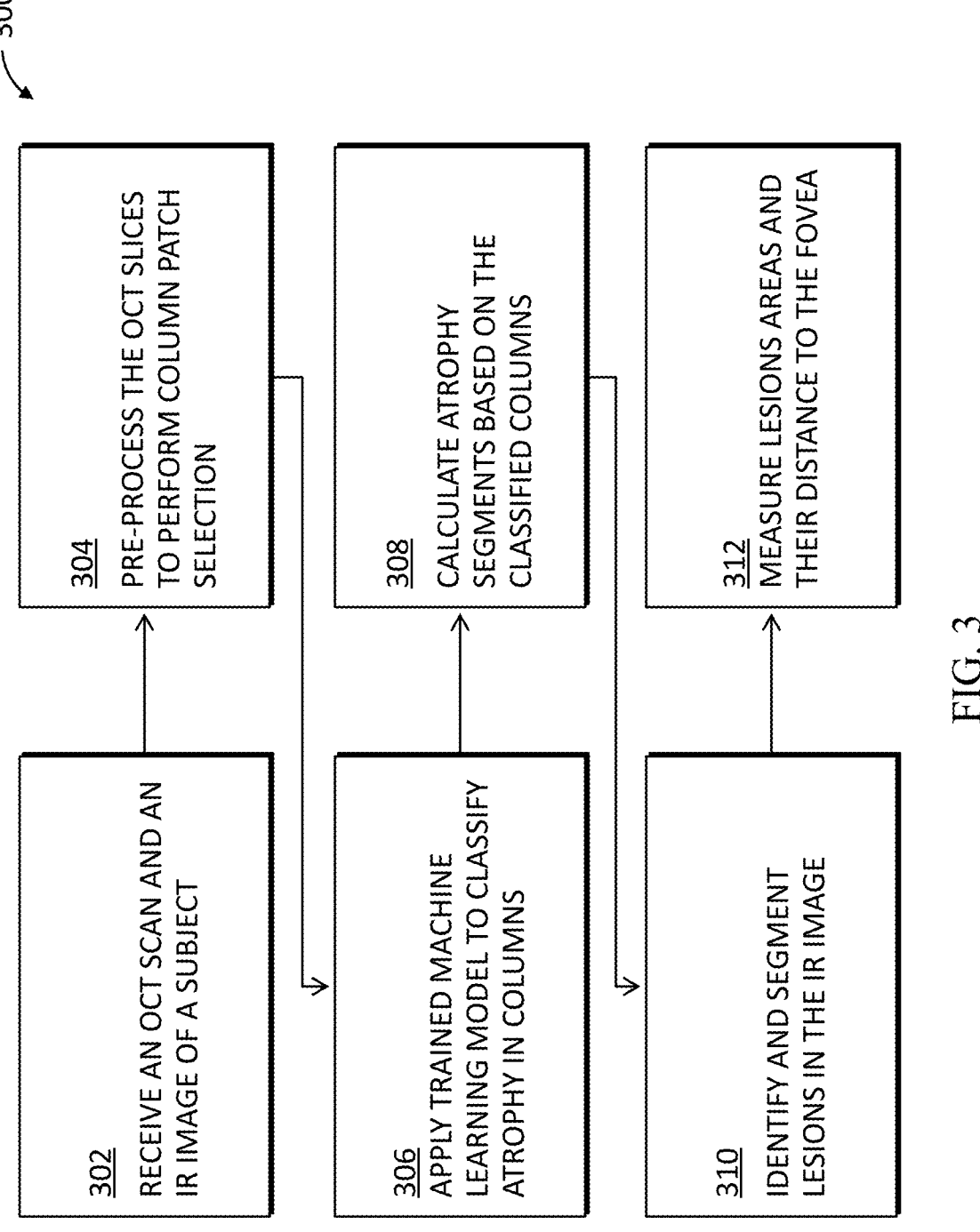
FIG. 3 is a flowchart illustrating the functional steps in a method for automated detection and quantification of macular atrophy, based on volumetric scans obtained by optical coherence tomography (OCT) imaging, in accordance with some embodiments of the present invention.

The instructions of system 200 will now be discussed with reference to the flowchart of FIG. 3 which illustrates the functional steps in a method 300 for automated detection and quantification of macular atrophy in a subject, based on volumetric scans obtained by optical coherence tomography (OCT) imaging, in accordance with some embodiments of the present invention. The various steps of method 300 will be described with continuous reference to exemplary system 200 shown in FIG. 2. The various steps of method 300 may either be performed in the order they are presented or in a different order (or even in parallel), as long as the order allows for a necessary input to a certain step to be obtained from an output of an earlier step. In addition, the steps of method 300 may be performed automatically (e.g., by system 200 of FIG. 2), unless specifically stated otherwise. In addition, the steps of method 300 are set forth for exemplary purposes, and it is expected that modification to the flow chart is normally required to accommodate various network configurations and network carrier business policies.

By way of overview, method 300 comprises the following broad steps:

(i) Receiving as input of an OCT scan and a corresponding IR image of a subject.

(ii) Pre-processing of the OCT slices to perform column patch selection.

(iii) Detection of atrophy columns in the OCT slices by applying a trained machine learning model of the present technique.

(iv) Delineation of atrophy segments based on the detection of atrophy columns.

(v) Segmentation of lesions in the corresponding IR image.

(vi) Measurement of atrophy lesions areas and their distances from the fovea.

Method 300 begins at step 302, wherein system 200 may receive an input OCT scan 220 comprising one or more consecutive B-scan slices, and a corresponding IR image, of an eye of a subject.

In some embodiments, in step 304, the instructions of image processing module 206*a* may cause system 200 to perform a pre-processing step, wherein each OCT B-scan slice undergoes a denoising and column patch preparation. Denoising may be necessary because the OCT scanning process produces both vertical and lateral light scattering that affects neighboring pixels. Accordingly, image denoising may be performed by local average smoothing by convolution with a normalized 5×5 box filter.

Then, for each OCT slice of height $h_{OCT}$ and width $w_{OCT}$, the present technique provides for creating m column patches of size $h_{OCT} \times w_{column}$, where the number of column patches in the m slice is equal to $$\left\lfloor \frac{w_{OCT}}{s} \right\rfloor,$$

and where $s < w_{column}$, and denotes the overlap stride between the column patches. In some embodiments, columns at the right and left edges of the OCT scan that do not fit into a column patch are ignored.

In some embodiments, column patches of the present technique may have a width dimension of 1 or more pixels. In some embodiments, column patches of the present technique are configured to include at least a cross-section of all retinal layers as well as the light scattering pattern below the RPE in the height dimension. In some embodiments, column patches of the present technique may include a single pixel-wide vertical pixel column taken from an A-scan or a B-scan. In some embodiments, column patches of the present technique may be two-dimensional (2D), that is, include two or more vertical pixel-wide columns from a single slice (B-scan). In some embodiments, column patches of the present technique may be three-dimensional (3D), that is, include one or more vertical pixel-wide columns from two or more slices (C-scan).

Figure 4A:
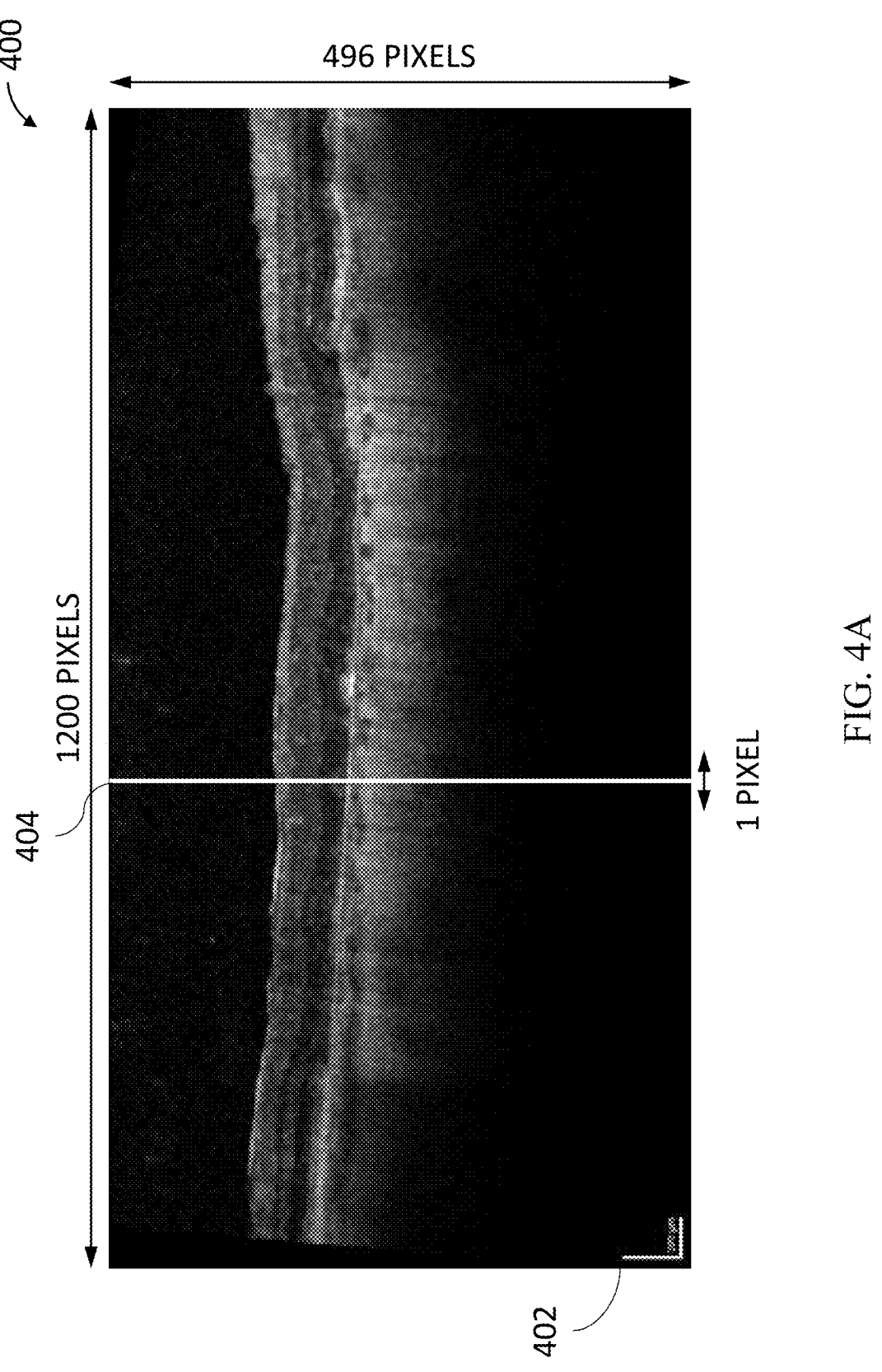
FIGS. 4A-4C illustrate exemplary pixel-wide, 2D, and 3D column patches of the present technique, in accordance with some embodiments of the present invention.

FIG. 4A illustrates an exemplary pixel-wide column of the present technique. OCT B-scan 400 comprises a slice 402, which has a height $h_{OCT}$ dimension of 496 pixels and a width $w_{OCT}$ dimension of 1200 pixels. Slice 402 may be partitioned into multiple pixel-wide vertical column patches, such as exemplary column 404 (marked by a vertical line) having a height $h_{column}$ dimension of 496 pixels and a width $w_{column}$ of 1 pixel, for a total size of 496×1 pixels. The vertical dimension of column patch 404 includes at least a cross-section of all retinal layers as well as the light scattering pattern below the RPE.

Figure 4B:
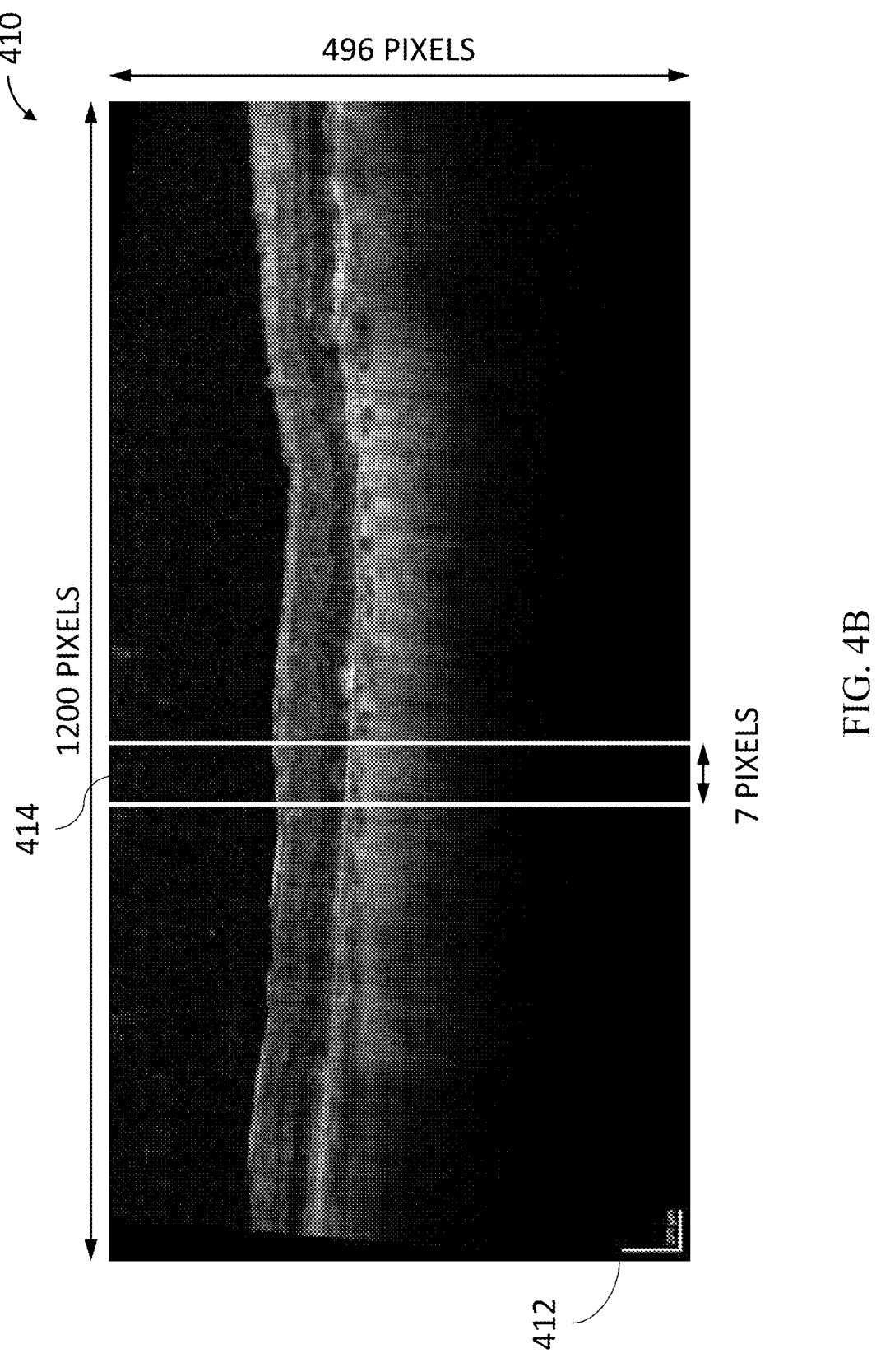

FIG. 4B illustrates an exemplary 2D column patch of the present technique. OCT B-scan 410 comprises a slice 412, which has a height $h_{OCT}$ dimension of 496 pixels and a width $w_{OCT}$ dimension of 1200 pixels. Slice 412 may be partitioned into multiple vertical column patches, such as exemplary column patch 414 (marked by two vertical boundary lines) having a height $h_{column}$ dimension of 496 pixels and a width $w_{column}$ of at least 2 pixels, for example as shown, 7 pixels, for a total size of 496×7 pixels. The vertical dimension of column patch 406 includes at least a cross-section of all retinal layers as well as the light scattering pattern below the RPE.

Figure 4C:
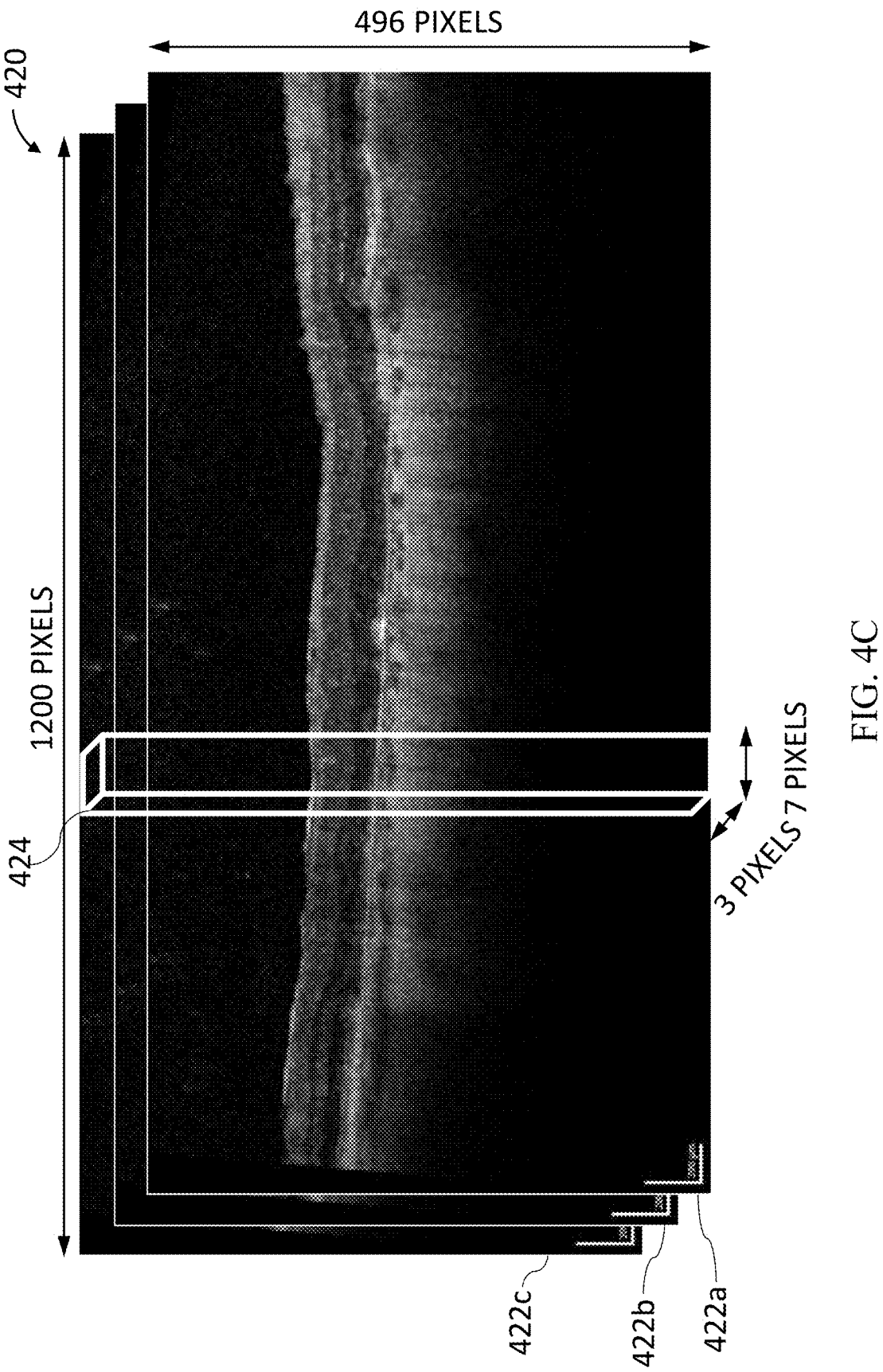

FIG. 4C shows an exemplary 3D column patch of the present technique, where the column patch size is $h_{OCT} \times w_{column} \times s_{neighbors}$, and where $w_{column}$ is the predefined column width, centered at the column of interest, and $s_{neighbors}$ is the number of OCT slices including the current one. In the example of FIG. 4C, OCT C-scan 420 comprises 3 slices 422a, 422b, 422c, each having a height $h_{OCT}$ dimension of 496 pixels and a width $w_{OCT}$ dimension of 1200 pixels. 3D column patch 424 (marked by a rectangular box) has a height $h_{column}$ dimension of 496 pixels, a width $w_{column}$ of, for example, 7 pixels, and a depth $s_{neighbors}$ of 3 pixels, for a total size of 496×7×3 pixels, consistent with the number of slices 42a, 42b, 42c in OCT scan 402. The vertical dimension of column patch 424 includes at least a cross-section of all retinal layers as well as the light scattering pattern below the RPE.

In some embodiments, in step 306, the instructions of machine learning module 206b may cause system 200 to apply a trained machine learning model of the present technique to the OCT scan slice columns created in step 306, to classify each column.

In some embodiments, the input to the trained machine learning model is an OCT slice column patch of size $h_{OCT} \times w_{column}$ for the 2D case, and $h_{OCT} \times w_{column} \times s_{neighbors}$ for the 3D case, where $w_{column}$ is the predefined column width, centered at the column of interest, and $s_{neighbors}$ is the number of OCT slices including the current one. In some embodiments, the input to the trained machine learning model is a set of features extracted from an OCT slice column patch of size $h_{OCT} \times w_{column}$ for the 2D case, and $h_{OCT} \times w_{column} \times s_{neighbors}$ for the 3D case, where $w_{column}$ is the predefined column width, centered at the column of interest, and $s_{neighbors}$ is the number of OCT slices including the current one. In some embodiments, the output is a bit (e.g., a binary output of [0,1]) indicating the presence or absence of dry AMD atrophy in the classified column patch.

In some embodiments, in step 308, the instructions of atrophy segmentation module 206c may cause system 200 to calculate atrophy segments in each OCT slice, by applying morphological operations to the output of the machine learning model classification in step 306. Initially, the center column of each column patch may be assigned a bit value of [0,1], according to the binary prediction of the machine learning model for that column patch, wherein, for each column patch, [0] indicates the absence of atrophy, and [1] indicate the presence of atrophy. Because a stride of s>1 was taken between neighboring column patches, there is a gap of s−1 pixels between neighboring center columns. These gaps are filled by applying morphological dilation with a horizontal structure element of size $$\left\lceil \frac{s}{2} \right\rceil.$$

Next, an atrophy segments matrix of size $n \times w_{OCT}$ (where n is the number of OCT slices) is computed by projecting each atrophy segment of each slice onto the corresponding row and column of the matrix. Finally, to avoid segments fragmentation, i.e., many small segments with narrow gaps between them, two additional morphological operations are applied to the atrophy segments matrix. The first is morphological closing with a horizontal structure element of size $$w_{frag}^{1D};$$

the second is a 2D morphological closing operation with a structure element of connectivity 1 in diameter $$w_{frag}^{2D}.$$

The values of both constants are determined experimentally. The output of step 308 is a 2D binary atrophy segments matrix of size $n \times w_{OCT}$.

In some embodiments, in step 310, the instructions of atrophy segmentation module 206c may cause system 200 to perform atrophy lesion identification and segmentation in the corresponding input IR image. The atrophy lesions are identified and segmented in the IR image based on the atrophy segments computed in each OCT slice in step 308. The computation consists of three parts
(i) Finding the OCT scan FOV in the IR image,
(ii) projecting the atrophy segments in the OCT slices onto the IR image, and
(iii) identifying and segmenting the atrophy lesions.

Figure 5A:
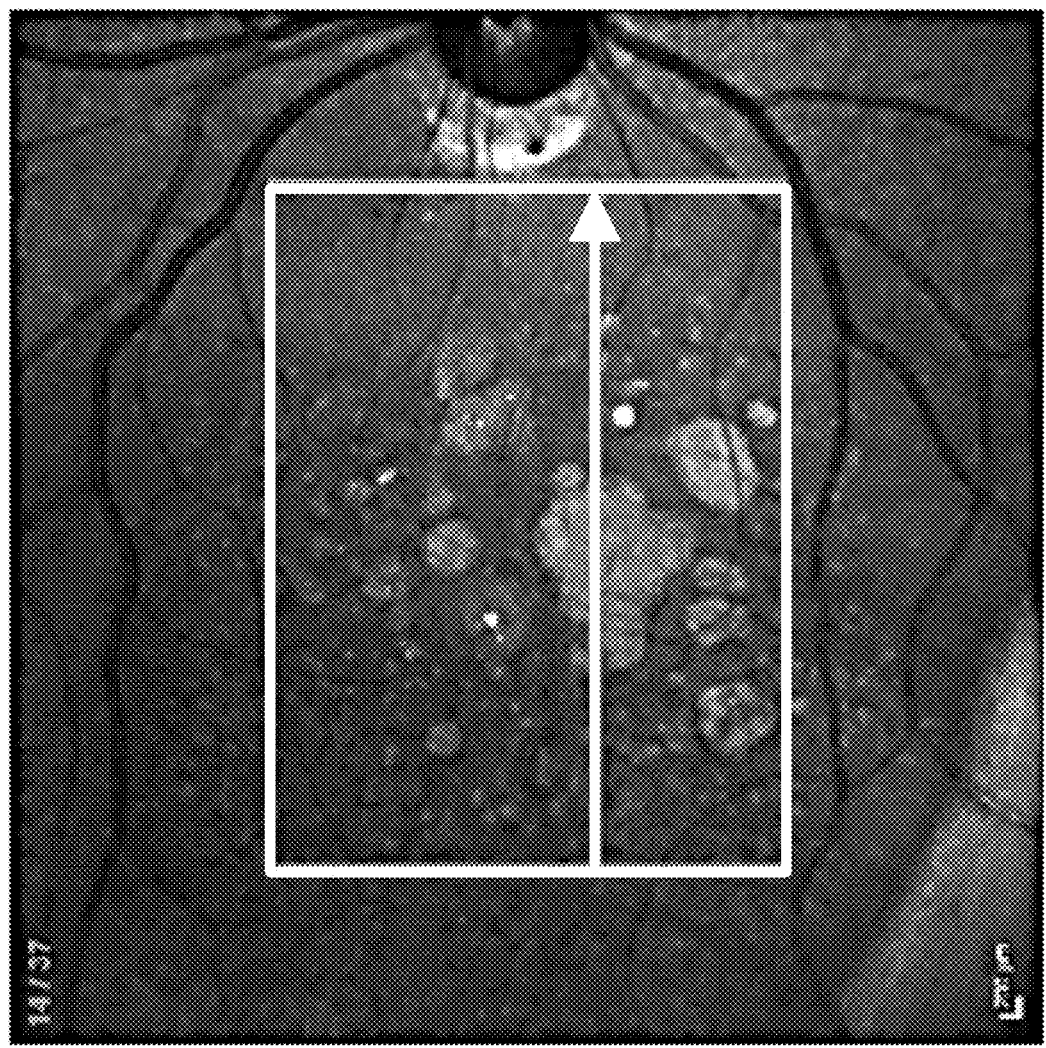
FIGS. 5A-5C illustrate a process for visualization of cRORA atrophy using a trained machine learning model, in accordance with some embodiments of the present invention.
Figure 5B:
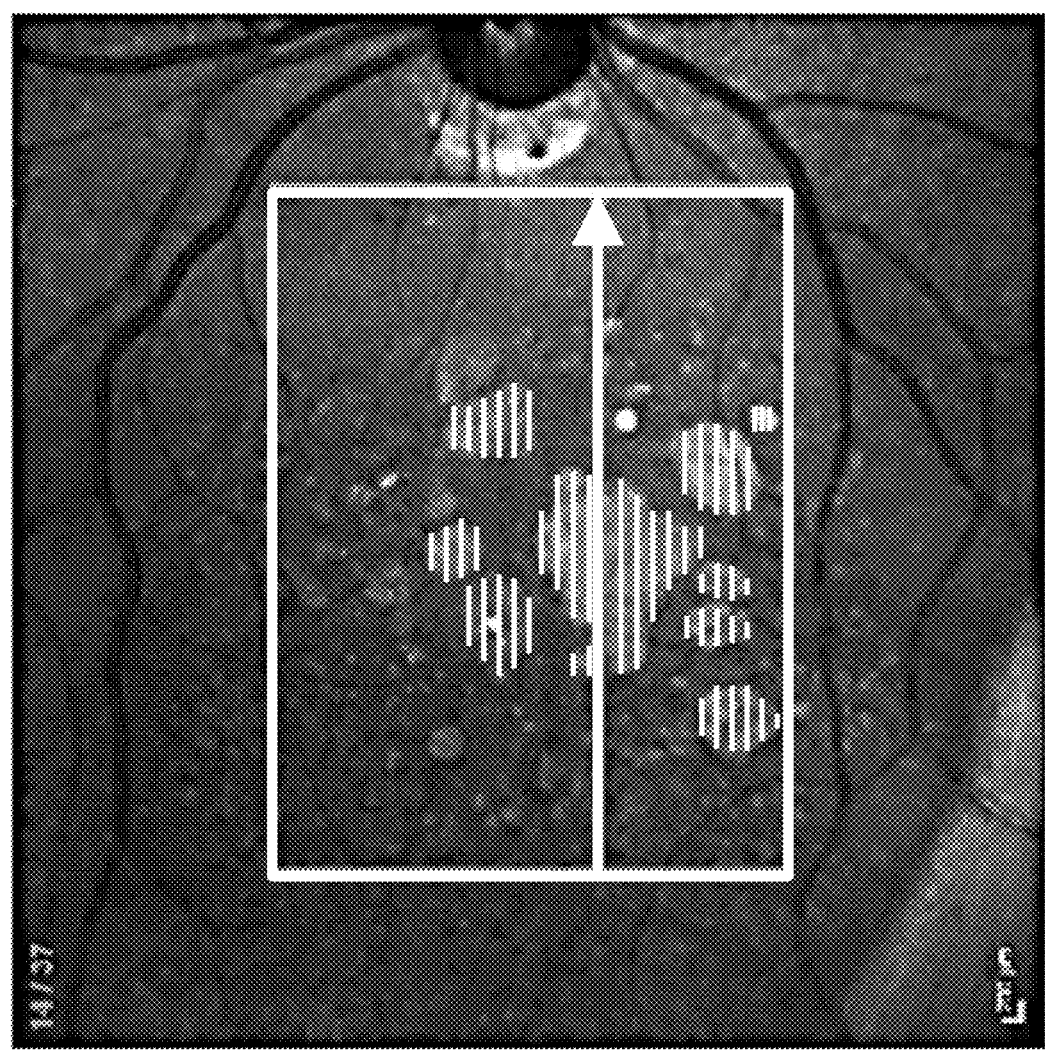
Figure 5C:
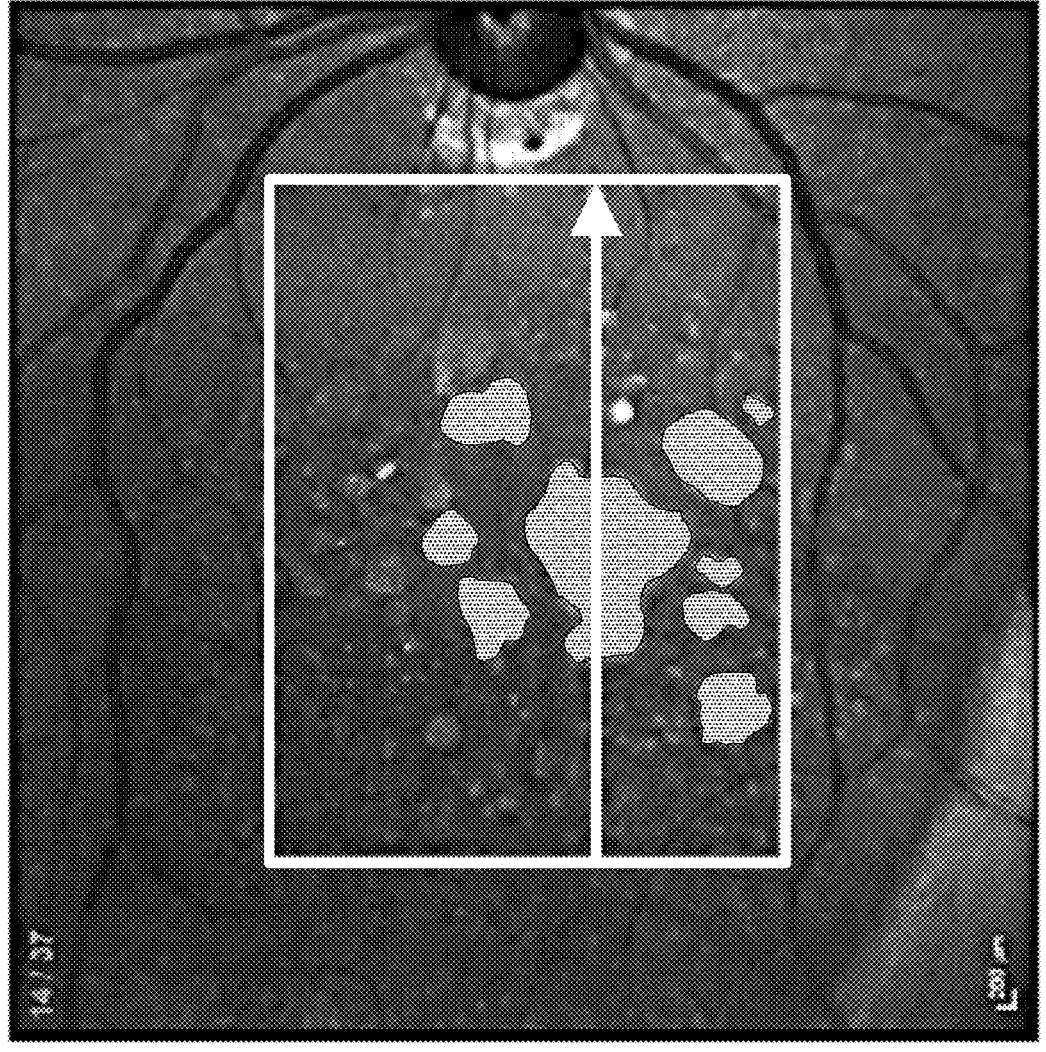

FIGS. 5A-5C illustrate this process with respect to the computation and visualization of cRORA atrophy, using a trained machine learning model of the present technique. FIG. 5A shows an IR image with an overlaid OCT scan FOV (white rectangle) and the OCT slice position (represented by an arrow line). FIG. 5B shows the IR image with overlaid atrophy segments identified in the OCT slices (marked as white horizontal lines consistent with the slice position in the stack). FIG. 5C shows the IR image with overlaid atrophy lesions segmentations outlined over the IR image.

The OCT scan FOV is an axis-aligned rectangle of height $h_{IR_{FOV}}$ and width $w_{IR_{FOV}}$ which is automatically watermarked by the OCT scanner at scan acquisition time as a rectangle on the IR image (FIG. 5A). The OCT scan FOV rectangle is directly computed by finding the lowest, highest, leftmost, and rightmost rectangle pixel locations along the vertical and horizontal axes, respectively. The gap between adjacent OCT slices is $$d = \left\lceil \frac{h_{IR_{FOV}}}{n-1} \right\rceil$$

step 308 may be subsequently subsampled to be of size of $n \times w_{IR_{FOV}}$, to match the size of the IR image, and each row is projected to its corresponding row in the IR image (FIG. 5B). Finally, to fill in the gaps between the atrophy segments of adjacent slices, morphological dilation with a vertical structure element of size $$\left\lceil \frac{d}{2} \right\rceil$$

may be performed. Each connected component corresponds to an atrophy lesion whose segmentation is the union of all pixels in the component within a delineated outline (FIG. 5C).

In some embodiments, in step 312, the instructions of atrophy segmentation module 206c may cause system 200 perform and output atrophy lesions measurements 222. Two important clinical measures for the evaluation of dry AMD atrophy are the total area of the atrophy lesions and their distance to the fovea. Total atrophy lesions area indicates the severity of the atrophy. The fovea plays a key role in visual acuity, as it is responsible for sharp central vision. The fovea is formed by high-density cones and is located at the center of the macula. The distance of the atrophy lesions from the fovea center is a meaningful measure of visual acuity: the closer an atrophy lesion is to the fovea, the larger is the decrease in visual acuity.

The total atrophy lesions area is computed by summing up the number of pixels in each atrophy lesion segment (as shown in FIG. 5C), and multiplying it by the pixel size. The pixel size of the IR image may be determined by extracting the scale watermark in the bottom left corner of the IR image. The location of the fovea in the OCT slices may be computed with the method described below and is then projected onto the IR image (FIG. 5C). The distance of each atrophy lesion from the fovea is the smallest distance between the atrophy lesion contour and the fovea location.

Figure 6A:
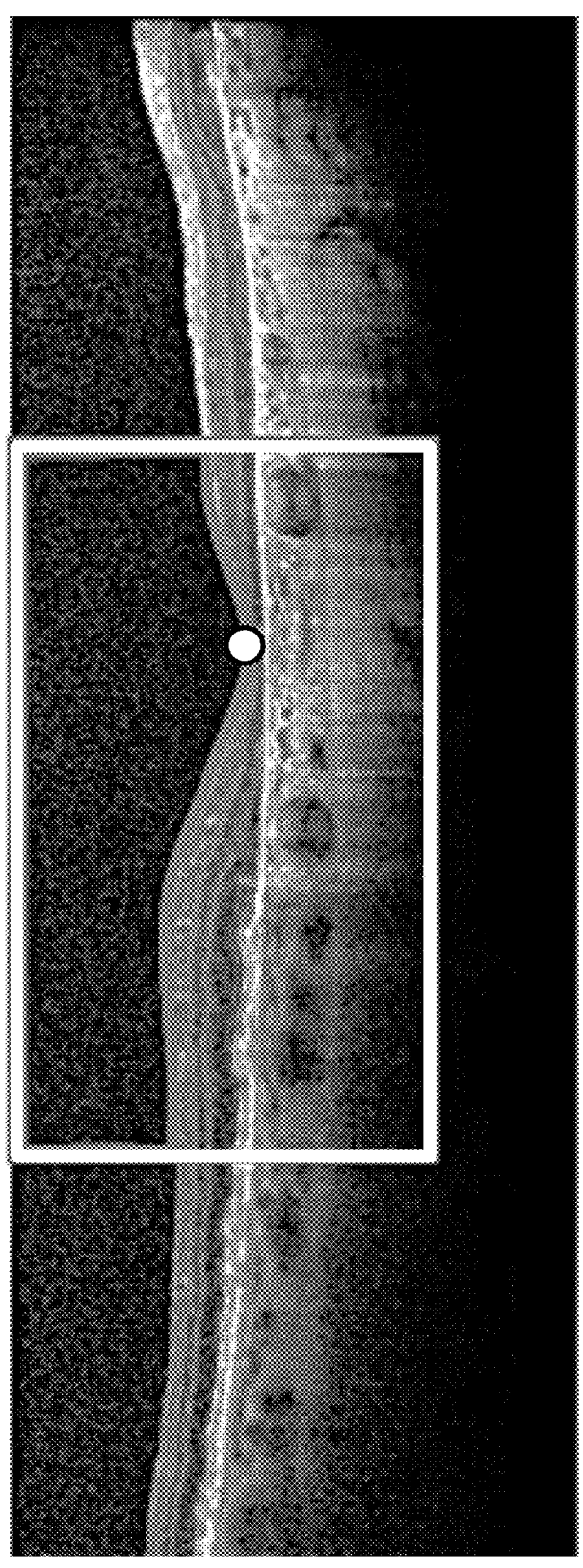
FIGS. 6A-6B illustrate a fovea location computation, according to some embodiments of the present invention.
Figure 6B:
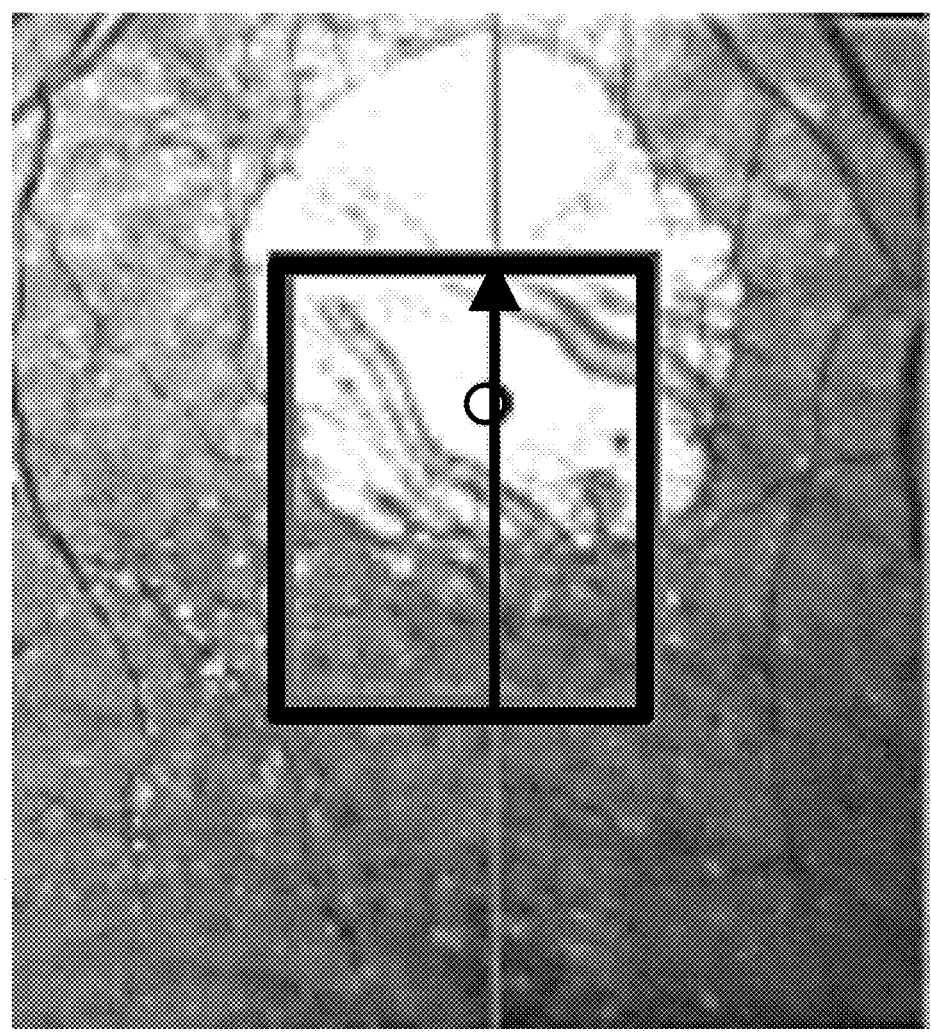

FIGS. 6A-6B illustrate the fovea location computation. FIG. 6A shows an OCT slice with the fovea (marked by a circle), the fovea ROI (white rectangle), and the segmentation mask contour. Panel B shows an IR image with the OCT scan FOV (marked by a rectangle), the fovea (marked by a circle) and Oct slice position in the stack (marked by arrow).

In some embodiments, the location of the fovea may be computed using the following steps:

OCT slices are stored in a 3D OCT scan matrix of size $h_{OCT} \times w_{OCT} \times n$, where n is number of slices.

the 3D OCT scan matrix size is isotropically reduced by a factor of $f_{sh}$ by smoothing and subsampling.

the fovea ROI axis aligned is computed: $f_{ROI_{xz}}$ is the width and depth centered at the image around its center in each respective axis, and $f_{ROI_y}$ is the upper height of the image.

a segmentation mask of the dark space above the retinal layers is computed by thresholding in the $[0, \tau]$ range and by morphological opening along all three scan axes with a spherical kernel of diameter k, where the values of $\tau$, k are pre-set empirically.

the fovea location is set to the lowest voxel in the segmentation mask

All of the above-mentioned constants may be predefined experimentally to be $f_{sh}=0.2$, $f_{ROI_{xz}}=0.2$, $f_{ROI_y}=0.75$, $\tau=20$, and $k=3$.

Figure 7:
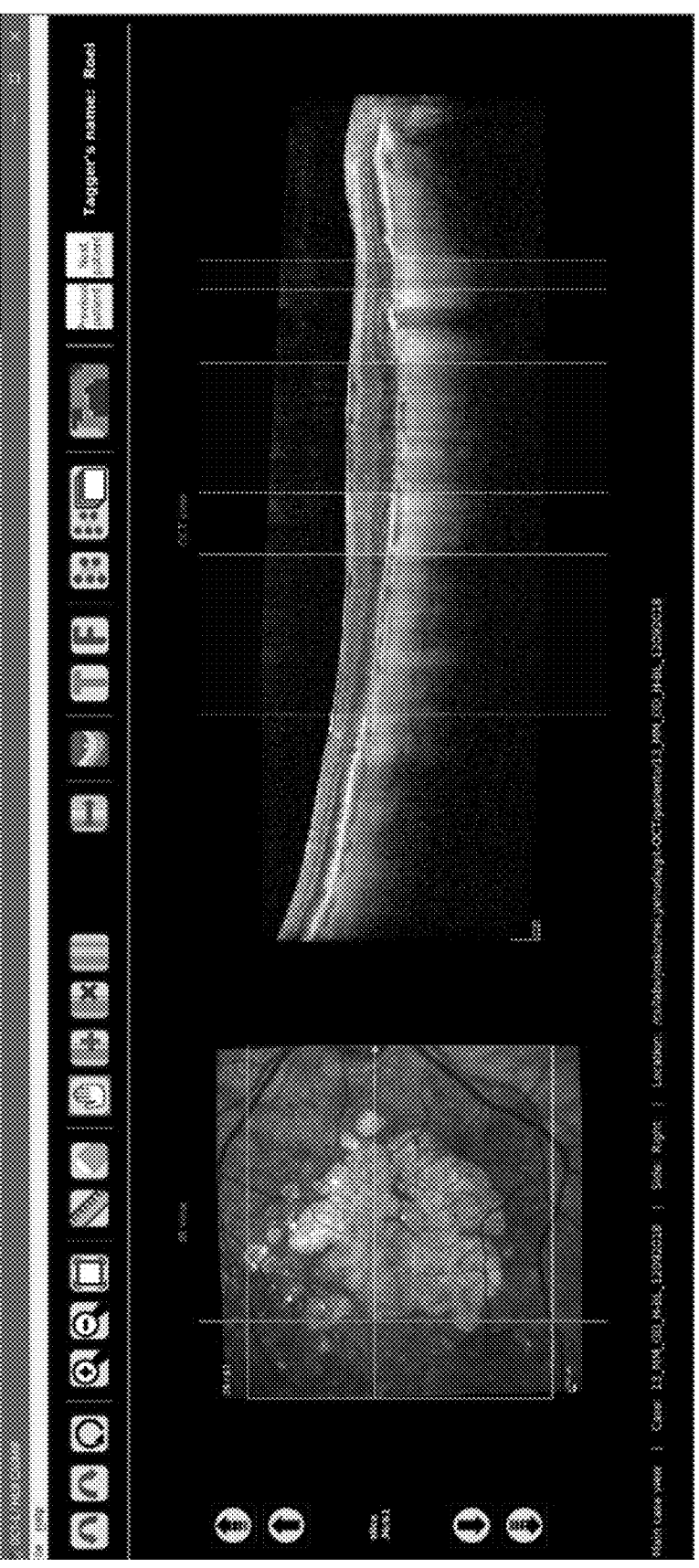
FIG. 7 shows a graphical user interface of the present technique, according to some embodiments of the present invention.

In some embodiments, the outputted data may be employed by a user of the system, for example, via a graphical user interface (GUI) implemented, e.g., in user interface 208 of system 200. An exemplary embodiment of such a GUI is seen in FIG. 7. The GUI comprises a main window and a summary window. The main window includes two image panels: an IR image viewer and an OCT slice viewer and annotator. The IR image serves as a reference for the OCT scan: it shows the OCT scan field of view, the location of the OCT slice that is displayed in the OCT slice annotator, and the current vertical position of the cursor in the OCT slice. The OCT slice annotator allows the user to add, delete and edit atrophy segments. The summary window displays the atrophy lesions on the IR image, the total atrophy lesions area and minimal distance of the lesions from the fovea. A detailed report of the individual and overall atrophy lesions measurements may be exported to an Excel file. The exemplary embodiment supports standard operations, i.e., loading a directory of IR and OCT scan slices, loading an OCT scan in video file format (.avi), loading and saving atrophy segment annotations, image manipulation operations, i.e., zoom, translation, image contrast, overlay hide/show and opacity operations, and removal of all atrophy lesions whose diameter is smaller than a pre-set threshold, e.g., <250.

Further instructions of system 200 will now be discussed with reference to the flowchart of FIG. 8 which illustrates the functional steps in a method 800 for training a machine learning model to perform classification of columns patches in OCT scans, which indicates the presence or absence of atrophy in the classified column patch, in accordance with some embodiments of the present invention.

The various steps of method 800 will be described with continuous reference to exemplary system 200 shown in FIG. 2. The various steps of method 800 may either be performed in the order they are presented or in a different order (or even in parallel), as long as the order allows for a necessary input to a certain step to be obtained from an output of an earlier step. In addition, the steps of method 800 may be performed automatically (e.g., by system 200 of FIG. 2), unless specifically stated otherwise. In addition, the steps of FIG. 8 are set forth for exemplary purposes, and it is expected that modification to the flow chart is normally required to accommodate various network configurations and network carrier business policies.

Method 800 begins in step 802, comprising receiving a plurality of OCT studies, each comprising one or more consecutive 2D scan slices, obtained from a cohort of healthy subjects as well as subjects having various types and/or stages of retinal atrophy. In some embodiments, the cohort includes subjects having retinal atrophy associated with only one type or category of atrophy. In some embodiments, the cohort includes subjects having retinal atrophy associated with two or more specified types or categories of atrophy. For example, the cohort may include subjects having retinal atrophy associated with only one, or with two or more, of the following atrophy categories:

complete RPE and outer retinal atrophy (cRORA), incomplete RPE and outer retinal atrophy (iRORA), complete outer retinal atrophy (cORA), and incomplete outer retinal atrophy (iORA).

In some embodiments, step 804, the instructions of machine learning module 206b may cause system 200 to construct one or more specific datasets comprising OCT scans from subjects having retinal atrophy associated two or more of the above-listed categories In some embodiments, each of the OCT slices in the received scans is annotated to identify regions representing atrophy. In some embodiments, annotation comprises outlining left and right edges of atrophy segments as atrophy regions or segments, wherein all pixel columns inside an atrophy region or segment are labeled as atrophied, and those outside to the left and right are labeled as healthy. An example of such left/right boundaries can be seen in FIG. 1A. in some embodiments, the present technique provides for a binary labeling scheme wherein a column may be annotated or labeled as 0/1, yes/no, etc. In some embodiments, atrophy regions include all the vertical columns between the left/right boundary columns, where each of the atrophy columns may be annotated as atrophy columns ((e.g., receive an annotation or label of [1]). All vertical columns outside the outermost columns are labeled as healthy (e.g., receive an annotation or label of [0]).

In step 806, at a preprocessing step, each OCT slice may undergo, e.g., denoising and data augmentation. In some embodiments, denoising is necessary because the OCT scanning process produces both vertical and lateral light scattering that affects neighboring pixels. Accordingly, image denoising may be performed by local average smoothing by convolution with, e.g., a normalized 5×5 box filter.

In some embodiments, an optional data augmentation step may provide for enlarging the training dataset, e.g., to correct imbalances in the healthy columns and atrophy columns. In some embodiments, data augmentations may be performed using, e.g., horizontal mirroring and small rotations, i.e., ±2° in-plane rotation. However, any suitable data augmentations method known in the art may be implemented.

In step 808, In some embodiments, column patch formation and selection procedure is executed on each OCT slice. In some embodiments, columns patches are formed by adjoining adjacent neighboring columns to the left and right of a central column. In some embodiments, for each OCT slice of height $h_{OCT}$ and width $w_{OCT}$, the present technique provides for creating m column patches of size $h_{OCT} \times w_{column}$, where the number of column patches in the m slice is equal to $$\left\lfloor \frac{w_{OCT}}{s} \right\rfloor,$$

and where $s < w_{column}$, and denotes the overlap stride between the column patches. In some embodiments, columns at the right and left edges of the OCT scan that do not fit into a column patch are ignored.

In some embodiments, column patches prepared according to step 810 may include single pixel-wide vertical pixel columns (A-scan). In other cases, column patches prepared according to step 810 may include two-dimensional (2D) column patches which include two or more vertical pixel-wide columns from a single slice (B-scan). In yet other cases, column patches prepared according to step 810 may include three-dimensional (3D) column patches which include one or more vertical pixel-wide columns from two or more slices (C-scan).

In step 810, the instructions of machine learning module 206b may cause system 200 to construct a training dataset of the present technique, comprising the annotated OCT slices comprising atrophy-labeled column patches and healthy regions, and labels associated with the presence or absence of atrophy in each slice region or segment. In some embodiments, step 812 may comprise preparing two or more training datasets. In some embodiments, the instructions of machine learning module 206b may cause system 200 to construct a training dataset of the present technique, comprising sets of features representing light scattering patterns in annotated OCT slices comprising atrophy-labeled column patches and healthy regions, and labels associated with the presence or absence of atrophy in each slice region or segment.

In some embodiments, the instructions of machine learning module 206b may cause system 200 to construct one or more specific datasets, each comprising OCT scans from subjects having retinal atrophy associated with only one type or category of atrophy. In some embodiments, the instructions of machine learning module 206b may cause system 200 to construct one or more specific datasets, each comprising OCT scans from subjects having retinal atrophy associated two or more specified types or categories of atrophy.

For example, the instructions of machine learning module 206b may cause system 200 to construct one or more specific training datasets, each comprising OCT scans from subjects having retinal atrophy associated with only one of the following atrophy categories:

complete RPE and outer retinal atrophy (cRORA), incomplete RPE and outer retinal atrophy (iRORA), complete outer retinal atrophy (cORA), and incomplete outer retinal atrophy (iORA).

In some embodiments, the instructions of machine learning module 206b may cause system 200 to construct one or more specific datasets comprising OCT scans from subjects having retinal atrophy associated two or more of the above-listed categories.

In step 812, the instructions of machine learning module 206b may cause system 200 to train a machine learning model on the training dataset constructed in step 812.

Figure 9:
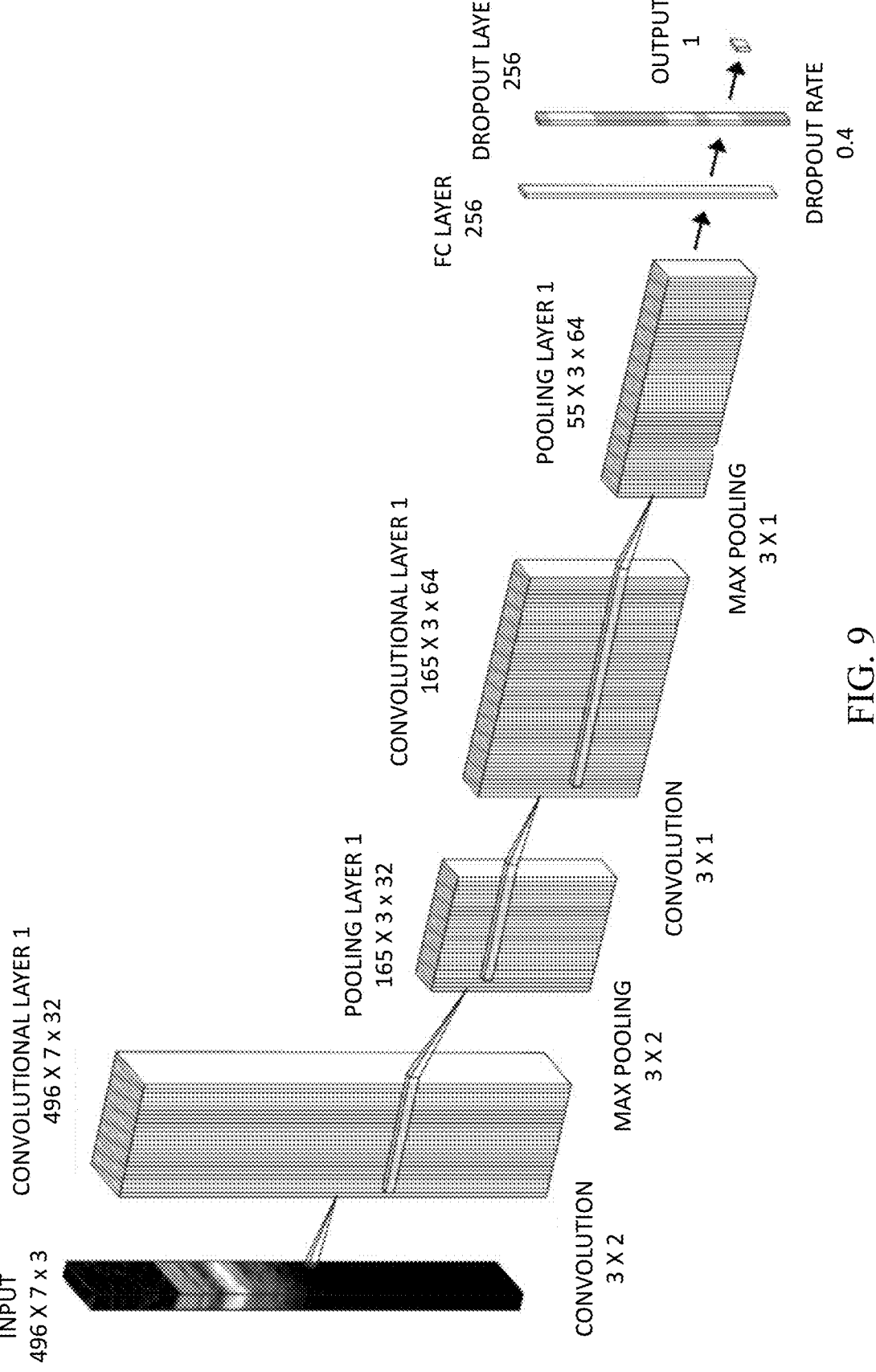
FIG. 9 is a schematic illustration of an exemplary architecture of a neural network of the present technique, according to some embodiments of the present invention.

FIG. 9 is a schematic illustration of an exemplary architecture of a neural network comprising a machine learning model of the present technique. As can be seen in FIG. 9, the convolutional neural network consists of two sequences of a convolutional layer and a max-pooling layer followed by two fully connected (FC) layers with a dropout layer in between. In some embodiments, the convolutional layers and the first FC layer have Rectified Linear Unit (ReLU) activation, and the last FC layer has softmax activation.

In some embodiments, the last layer in the neural network comprising the machine learning model of the present technique may be configured to perform binary thresholding of the continuous prediction value in $[0,1][0,1]$, with a pre-set threshold th that is empirically determined by analyzing the ROC and the Precision-Recall curves of a validation dataset. In some embodiments, the present machine learning model uses an Adam optimization algorithm with a learning rate of 0.001 and a batch size of 100 column patches. In some embodiments, the loss function may be Binary Cross-Entropy (BCE) loss or $F_1$ loss. In some embodiments, a k-fold cross validation training may be performed for 1,000 epochs. In each fold, the weights are adjusted with those of the epoch with the minimal mean $F_1$ score loss on its validation dataset. The final weights are selected from the fold which yields the $F_1$ score closest to the mean $F_1$ on the validation score for all folds, wherein folds that yield $F_1$ scores that deviate from the mean $F_1$ score by more than one standard deviation may be excluded. Typical values are $h_{OCT}=496$ pixels, $w_{column}=7$, $s_{neighbors}=3$, and $k=4$.

Experimental Results

The present inventors conducted experiments of the present technique as further detailed herein below. Datasets for the experiments were acquired by ophthalmologists at the Hadassah University Medical Center (Ein Kerem, Jerusalem, Israel) during routine clinical examination of patients, using a Spectralis OCT scanner (Heidelberg Engineering, Germany). The studies were selected from patients that were diagnosed as having at least some degree of macular atrophy, and consist of a video file (.avi format) that includes an IR image and a series of OCT slices.

The IR image and the OCT slices were extracted from the video file (.png format). The IR image sizes are 496×496, with resolution of 20×20 μm². The OCT scans consist of 40-80 slices of sizes 496×1024 and 496×1536 pixels per slice, and resolution of 4×6 μm². The IR images and the OCT scan slices are co-registered.

Two studies datasets D1 and D2 were obtained for cRORA and macular atrophy as follows. Dataset D1 consists of 106 scans from 18 patients, each with an IR image and an OCT scan, totaling 5,207 OCT slices. Dataset D2 consists of 19 scans from 16 patients, each with an IR image and an OCT scan, totaling 829 OCT slices.

Ground truth cRORA and macular atrophy annotations were obtained by ophthalmology expert annotators, who were instructed to identify light hyper transmission beneath retina, which indicates the thinning of the outer retina, and RPE attenuation, which is evidence of photoreceptor degeneration and includes the loss of the ellipsoid zone, the interdigitation zone and the external limiting membrane. The annotators were asked to annotate atrophy, including lesions whose size is <250 μm in the lateral dimension according to the criteria defined in Sadda et. al., 2018.

For dataset D1, the annotation of cRORA in 106 cases was performed on the OCT slices, as follows. A first set of 57 OCT scans were visualized and manually annotated with an OCT Graphical User Interface (see FIG. 7) by two of the co-inventors, and corrected and validated by another one of the co-inventors. A senior ophthalmologist co-inventor then reviewed 6 slices of each scan (for a total of 342 slices).

The annotated dataset was used to train a machine learning model and produce initial segmentations for the second set of 49 OCT scans. The resulting segmentations were then reviewed and corrected by the present inventors. As a result, a total of 689,256 out of 6,815,232 (10%) cRORA columns corresponding to 5,111 atrophy segments and 1,046 atrophy lesions were identified in all the 5,207 OCT slices of 106 OCT scans. Atrophy appeared in 2,952 slices. On average, there were 48.3 (std=37.5) in the range 0-294 atrophy segments each with 134.6 (std=141.1) in the range 3-886 atrophy columns and 9.9 (std=8.2) in the range 0-39 atrophy lesions per OCT scan.

For dataset D2, the macula regions of macular atrophy with no distinction between iORA, cORA, iRORA and cRORA were visualized and manually delineated on the IR image, based on the evaluation of its appearance in the IR image and the OCT scan slices. The IR atrophy lesion contours were transformed into atrophy segments that were projected onto the corresponding individual OCT slices. The result is a first set of annotated incomplete or incomplete AMD columns in the OCT slices. These atrophy columns were used to train an initial machine learning model classifier. A total of 219,301 out of 1,083,392 (20.2%) macular atrophy columns, corresponding to 786 atrophy segments and 64 atrophy lesions, were identified in all the 829 OCT slices of 19 OCT scans. On average, there were 41.4 (std=15.6) in the range 18-79 atrophy segments, and 3.7 (std=2.6) in the range 1-9 atrophy lesions per OCT scan.

Evaluation Metrics

Five measures were used to quantitatively compare atrophy segment and atrophy lesion segmentations between annotators, and to quantify the performance of our method with respect to manual ground truth annotations.

The first measure is the standard binary classification $F_1$ score used to compare two atrophy lesions segmentations. The comparison is performed on the binary atrophy segments matrix derived from atrophy segments identified manually or automatically in the OCT scan slices. The $F_1$ score is defined as $$F_1 = 2 \cdot \frac{precision \cdot recall}{precision + recall}$$

where $$precision = \frac{true\ positives}{true\ positives + false\ positives}$$

and

-continued $$recall = \frac{true\ positives}{true\ positives + false\ negatives},$$

where one of the segmentations is the ground truth segmentation. This measure is equivalent to the commonly used Dice coefficient—a similarity measure between two sets A and B defined as $$Dice(A, B) = \frac{2|A \cap B|}{|A| + |B|},$$

where $|\cdot|$ denotes the size of the segmentation set. In both cases, the score ranges from 0 (no similarity) to 1 (full similarity).

In addition, the ROC curve (receiver operating characteristic curve) and the AUC (area under the ROC curve) were used to compare the results of the column machine learning model classification with the manually labeled ones in the OCT scan slices. Precision-Recall curves and Confusion Matrices were also used for imbalanced datasets since the number of non-atrophy columns is ×3-10 larger than the atrophy ones.

Experimental Studies

Four additional experimental studies were conducted by the present inventors as follows. Study 1 quantified the observer variability of cRORA atrophy identification and sets the goal of the expected performance of the computerized proposed method. Study 2 quantified the performance of four custom column-based machine learning model classifiers (2D and 3D columns, BCE and $F_1$ loss functions) for cRORA identification. Study 3 quantified the performance of the custom column-based machine learning models for macular atrophy identification. Study 4 quantified the accuracy of the clinical measurements.

Study 1—Manual cRORA segmentation on OCT slices: This study was performed on part of the scans in dataset D1. The inter-observer annotation variability was quantified by having two annotators independently annotate 687 OCT scan slices from 15 scans. The mean difference between the two annotators is +2,779 columns (std=+3,552) in the range −3,988, +8,172, i.e. +3.4% (std=6.6%), and with mean $F_1$ score of 0.78 (std=0.14) in the range 0.47-0.95. When taking the more senior annotator as the reference, the mean (std) precision and recall of atrophy segments detection were 0.7 (0.12) and 0.9 (0.11) respectively, and the mean (std) precision and recall of atrophy lesion detection were 0.58 (0.22) and 0.81 (0.21). The relatively low $F_1$ score and precision values can be attributed to the fuzzy cRORA boundaries, which yield differences in its detection and interpretation.

Study 2—Automatic cRORA segmentation in OCT slices: This study was performed on dataset D1 with the 2D and 3D column machine learning models using the BCE and $F_1$ loss functions. cRORA atrophy segments were computed on the OCT slices with a column machine learning model trained and cross-validated on 93 OCT scans from 16 patients and tested on 12 OCT scans from 2 different patients. The patients in the test dataset were chosen so that their mean number of lesions per case is closest to the mean number of lesions per case for all patients.

Figure 10A:
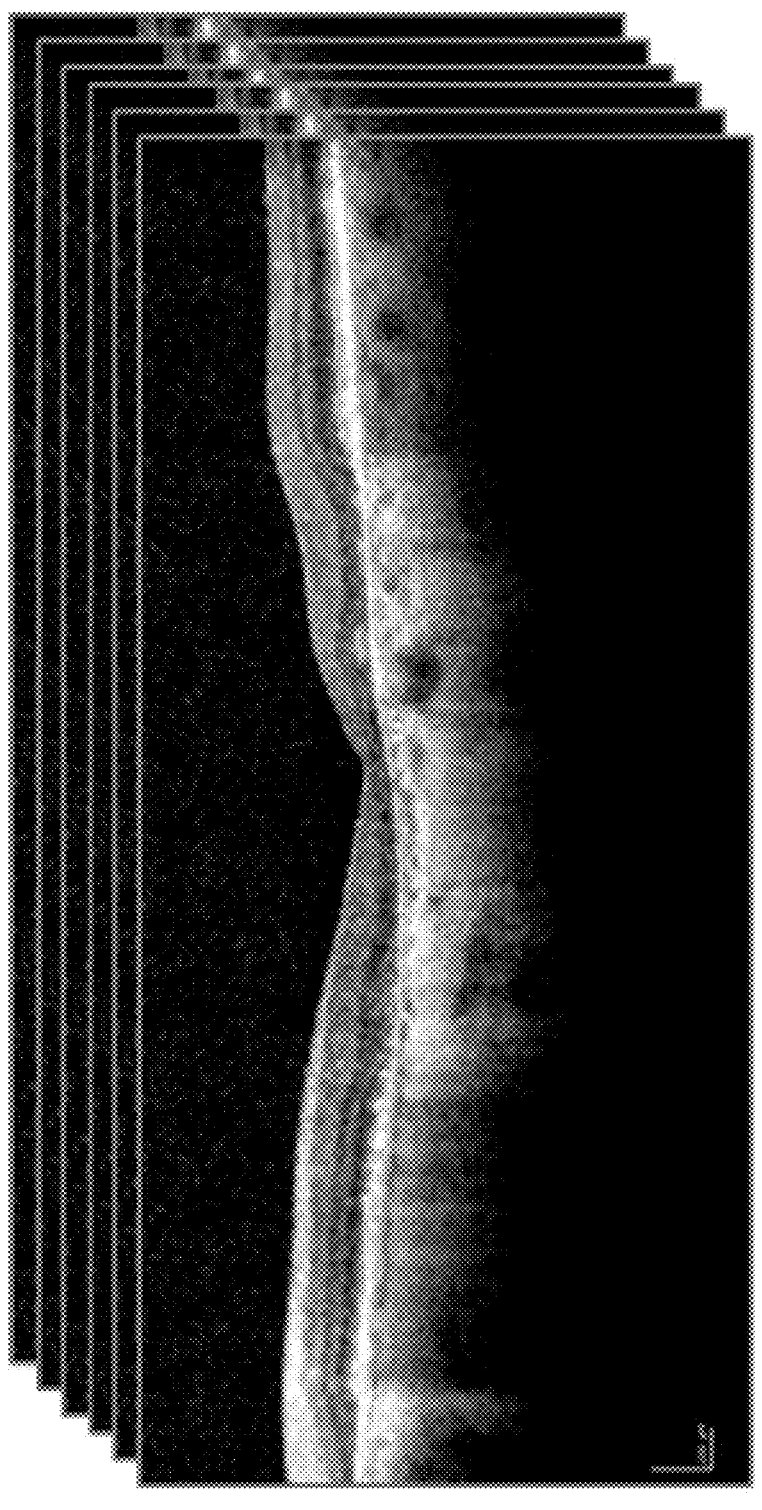
FIGS. 10A-10C show experimental results for a 3D column trained machine learning model using an $F_1$ loss function, according to some embodiments of the present invention.
Figure 10B:
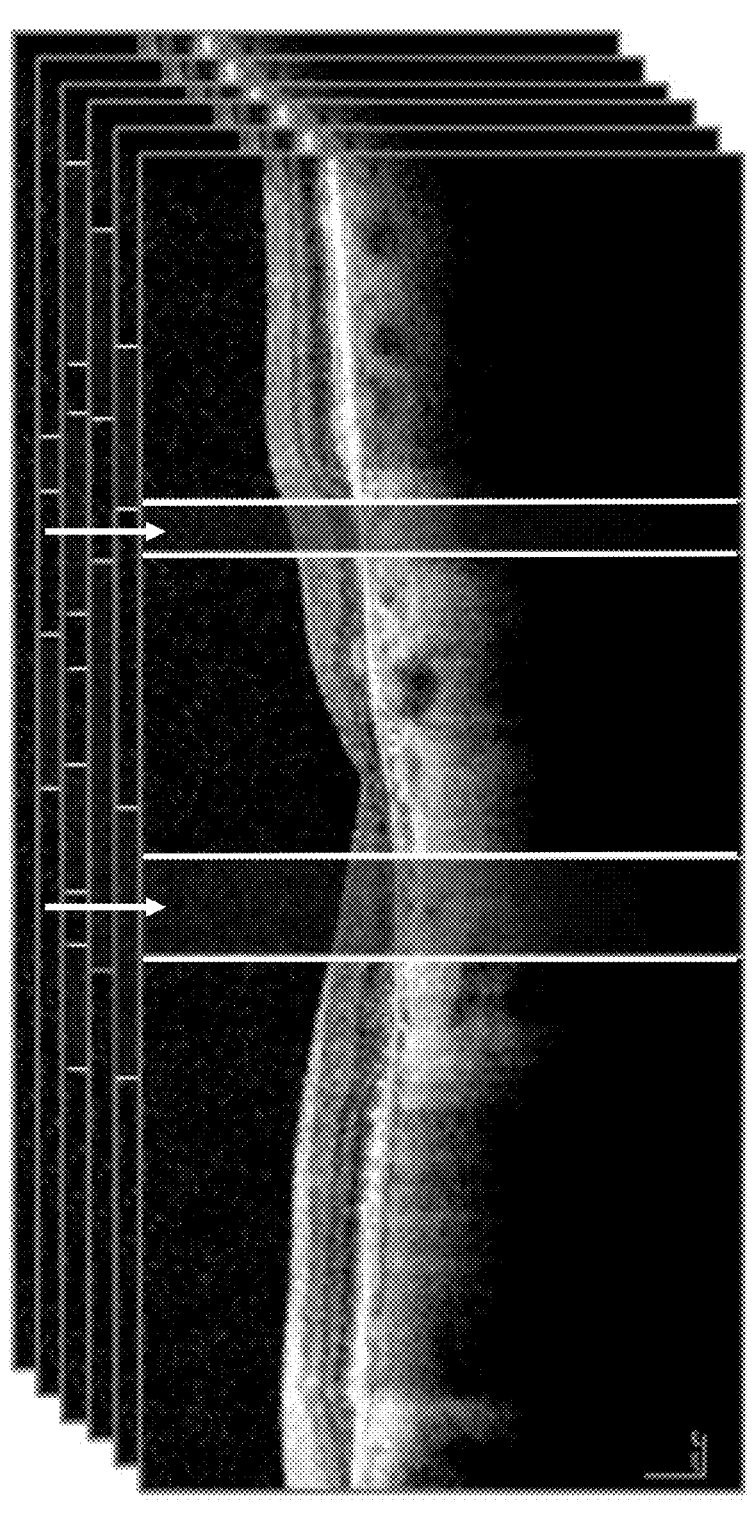
Figure 10C:
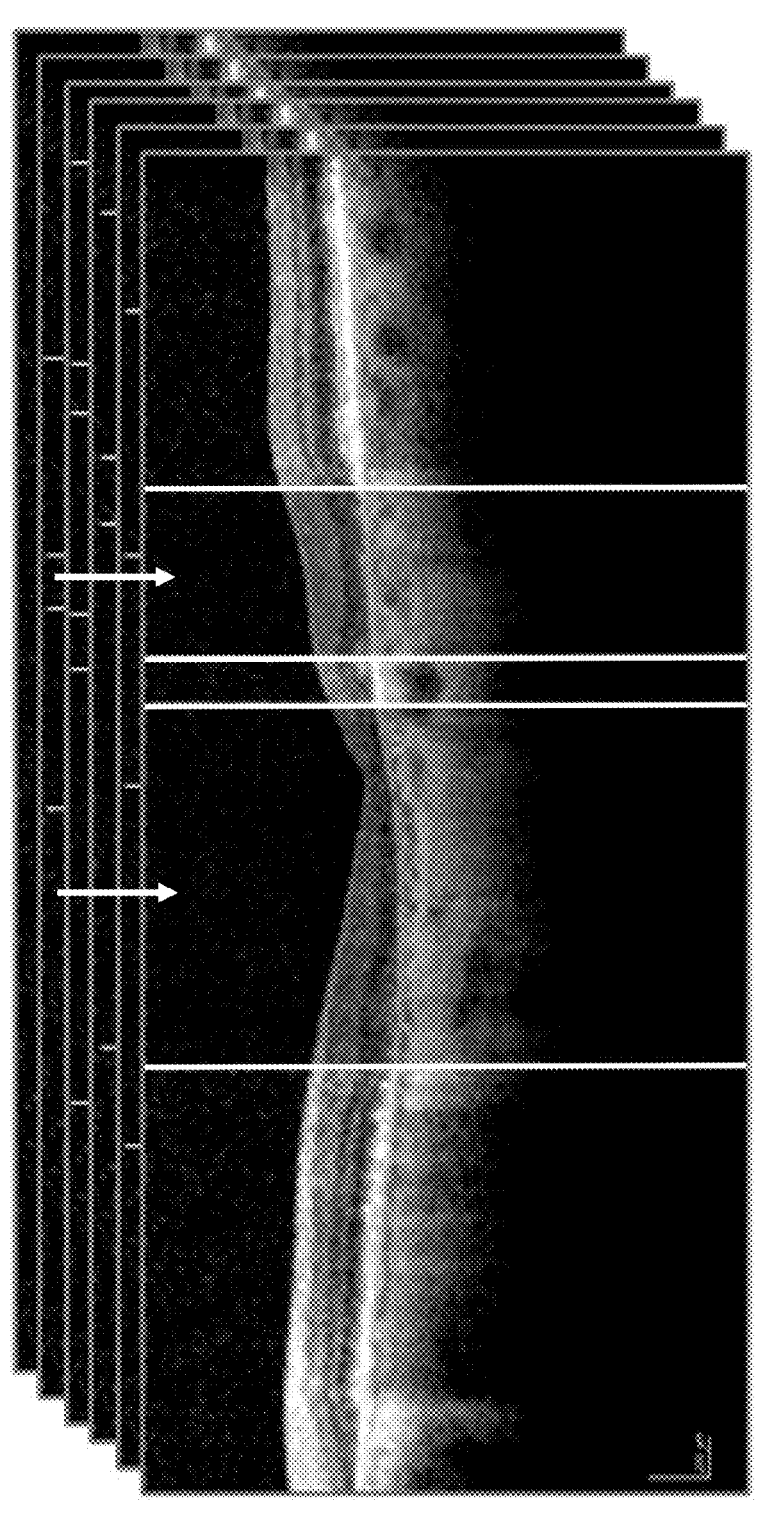

FIGS. 10A-10C show examples of the results for the 3D column machine learning model with the $F_1$ loss function.

FIG. 10A shows an original OCT scan study. FIG. 10B shows cRORA atrophy lesions segments bounded between vertical lines (marked by arrows) (Study 2). FIG. 10C shows macular atrophy lesions segments bounded between vertical lines (marked by arrows) (Study 3). Note that as expected, the cRORA lesions are thinner and fully contained within the macular atrophy lesions.

Four evaluations were performed for each combination of BCE and $F_1$ loss functions and 2D or 3D columns. Tables 1A-1B below summarizes the results. The $F_1$ loss and 3D columns combination yields the best results. For the atrophy extent, the mean difference between the manually annotated reference ground truth cRORA atrophy segmentation and the automatically derived was +25.4% (std=27.6%) in the range −18.8% to +74.8%. The mean $F_1$ score is 0.78 (std=0.06) in the range 0.69-0.88. The atrophy detection mean (std) precision and recall were 0.51 (0.19) and 0.89 (0.07) for atrophy segments and 0.70 (0.18) and 0.67 (0.22) for atrophy lesions. These results meet the inter-observer variability measured in Study 1, which indicates that the automatic column machine learning model classification is as accurate and reliable as the one manually performed by an ophthalmologist.

Tables 1A-1B below show results of the four machine learning models for cRORA in OCT scans. The first column shows the loss function for each machine learning model: BCE (Binary Cross Entropy) and $F_1$ and the column dimension (2D or 3D). Columns 2-6 list the atrophy extent: the number of columns (total, mean, std) in the ground truth and in the computed segmentation and their difference, difference %, and $F_1$ score. Columns 7-10 list the atrophy detection precision and recall, for atrophy segments and atrophy lesions.

TABLE 1A

| MACHINE LEARNING | | ATROPHY EXTENT | | | | |
|---|---|---|---|---|---|---|
| MODEL Loss function Column dimension | Measure | Ground truth columns | Computed columns | Diff columns | Diff % mean (std) | $F_1$ score mean (std) |
| BCE 2D | Total | 115,632 | 172,077 | +56,445 | +56.3 | 0.74 |
| | Mean | 9,636 | 14,340 | +4,704 | (45.4) | (0.10) |
| | (std) | (5,175) | (6,574) | (3,500) | | |
| BCE 3D | Total | 115,632 | 163,255 | +47,623 | +46.5 | 0.77 |
| | Mean | 9,636 | 13,605 | +3,969 | (28.6) | (0.08) |
| | (std) | (5,175) | (6,337) | (2,296) | | |
| $F_1$ 2D | Total | 115,632 | 156,644 | +41,012 | +38.5 | 0.78 |
| | Mean | 9,636 | 13,054 | +3,418 | (29.9) | (0.07) |
| | (std) | (5,175) | (6,841) | (3,336) | | |
| $F_1$ 3D | Total | 115,632 | 145,737 | +30,105 | +25.4 | 0.78 |
| | Mean | 9,636 | 12,145 | +2,509 | (27.6) | (0.06) |
| | (std) | (5,175) | (6975) | (3062) | | |

TABLE 1B

| MACHINE LEARNING | ATROPHY DETECTION | | | |
|---|---|---|---|---|
| MODEL | SEGMENT | | LESION | |
| Loss function Column Dimension | Precision mean (std) | Recall mean (std) | Precision Mean (std) | Recall Mean (std) |
| BCE 2D | 0.64 | 0.91 | 0.56 | 0.76 |
| | (0.17) | (0.07) | (0.22) | (0.18) |
| BCE 3D | 0.60 | 0.93 | 0.67 | 0.82 |
| | (0.19) | (0.06) | (0.21) | (0.17) |
| $F_1$ 2D | 0.51 | 0.93 | 0.43 | 0.81 |

TABLE 1B-continued

| MACHINE LEARNING | ATROPHY DETECTION | | | |
|---|---|---|---|---|
| MODEL | SEGMENT | | LESION | |
| Loss function Column Dimension | Precision mean (std) | Recall mean (std) | Precision Mean (std) | Recall Mean (std) |
| | (0.22) | (0.06) | (0.25) | (0.19) |
| $F_1$ 3D | 0.51 | 0.89 | 0.70 | 0.67 |
| | (0.19) | (0.07) | (0.18) | (0.22) |

Figure 11A:
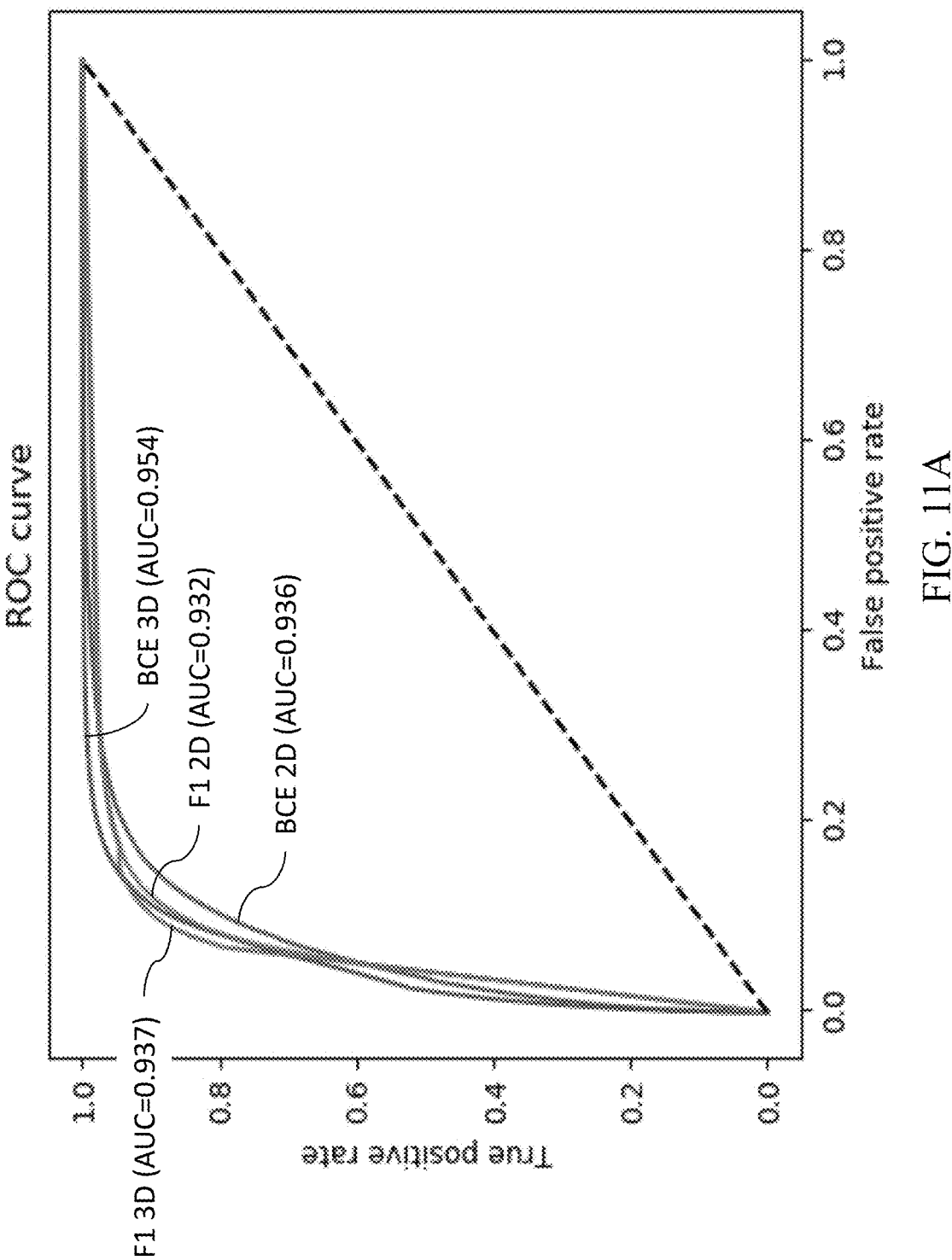
FIGS. 11A-11B show the ROC and precision-recall curves of four trained machine learning models, according to some embodiments of the present invention.
Figure 11B:
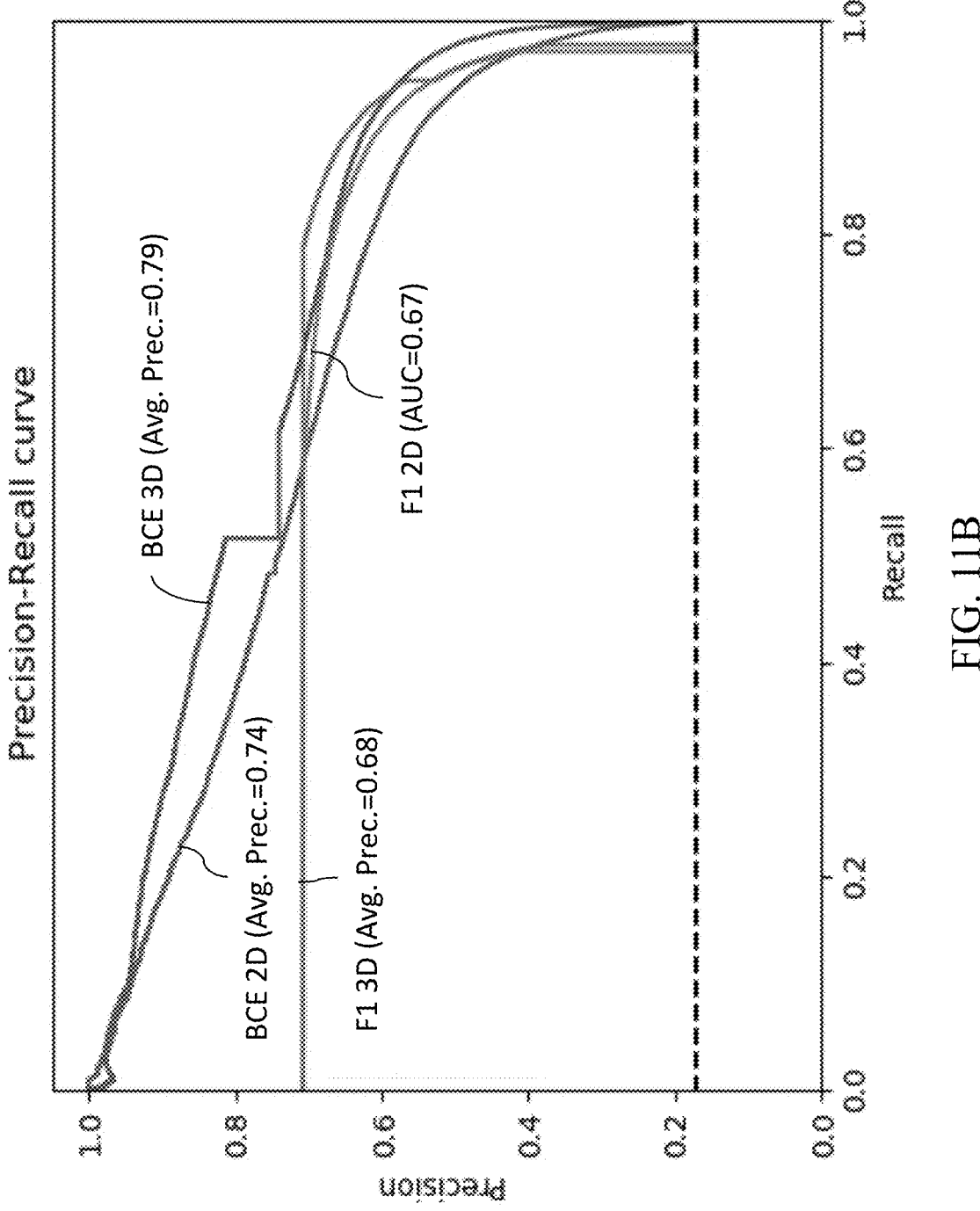

FIGS. 11A-11B show the ROC and Precision-Recall curves of the four machine learning models. The machine learning model with the $F_1$ loss and 3D columns has an AUC of 0.937 and an average precision of 0.68, outperforming the other three. Note the difference between the Precision-Recall curves of the machine learning models with the BCE and the $F_1$ loss function machine learning models. The Precision-Recall ratio of the $F_1$ loss function machine learning models is mostly flat in for up to ~0.7 Precision, with a recall of ~0.7; it then decreases as the recall gets close to 1. This is because the network weights are adjusted with the $F_1$ loss function. In contrast, the machine learning models with the BCE loss function exhibit a standard trade-off behavior.

Figure 12:
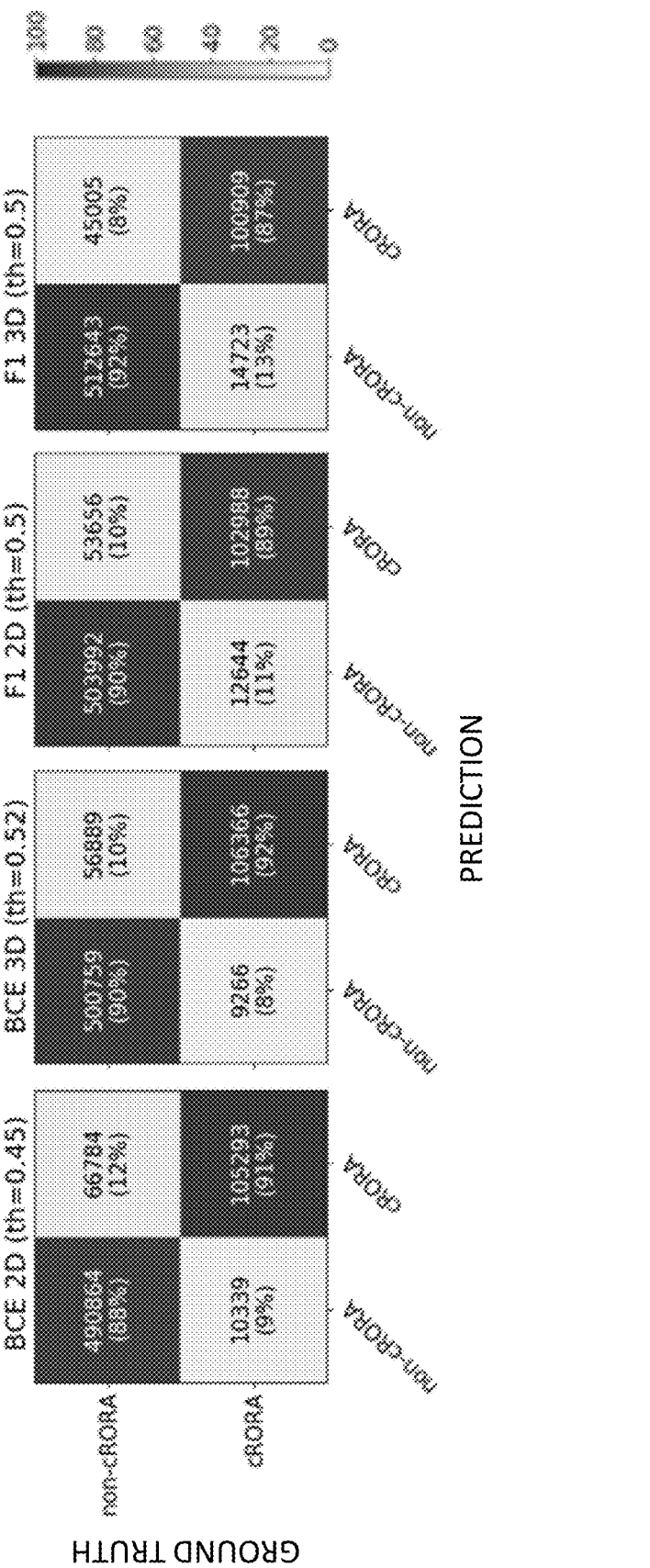
FIG. 12 shows confusion matrices of four trained machine learning models, according to some embodiments of the present invention.

FIG. 12 shows confusion matrices for four column machine learning models of cRORA in OCT scans. Each matrix shows the total number of columns and the % for a threshold value th. For the BCE loss machine learning models, the value of th is empirically determined by analyzing the ROC curve of the validation dataset and finding the threshold that yields a false positive rate of 0.2. For the $F_1$ loss machine learning models, the value of th is automatically set to 0.5. The best results are achieved by the 3D columns machine learning model with the $F_1$ loss function. The results are close to the manual annotation observer variability reported in Study 1, which indicates that the automatic column machine learning model is as accurate and reliable as the one manually performed by an ophthalmologist.

Study 3: Automatic macular atrophy segmentation in OCT slices: This study was performed on dataset D2 with the 3D column machine learning model and the $F_1$ loss function. Macular atrophy segments were computed on the OCT scan slices with a column machine learning model trained and cross-validated on 10 OCT scans from 8 patients and tested on 9 OCT scans from 8 different patients. The scans in the test set were chosen in the same way described earlier in Study 2.

Tables 2A-2B below summarize the results. For the atrophy extent, the mean difference between the manually annotated reference ground truth macular atrophy segmentation and the automatically derived was +20.7% (std 29.2%) in the range between −2.5% to +93.7%. The mean $F_1$ score is 0.89 (std 0.09) in the range 0.67-0.97. The atrophy detection mean (std) precision and recall were 0.84 (0.11) and 0.97 (0.03) for atrophy segments and 0.72 (0.22) and 0.91 (0.18) for atrophy lesions.

TABLE 2A

| | | ATROPHY EXTENT | | | |
|---|---|---|---|---|---|
| Measure | Ground truth columns | Computed columns | Diff columns | Diff % mean (std) | $F_1$ score mean (std) |
| Total | 92,510 | 111,770 | 19,260 | +20.7 | 0.89 (0.09) |
| Mean | 10,279 | 12,419 | 2060 | (29.2) | |
| (std) | (2159) | (3780) | (2873) | | |

TABLE 2B

| | ATROPHY DETECTION | | |
|---|---|---|---|
| SEGMENT | | LESION | |
| Precision mean (std) | Recall mean (std) | Precision mean (std) | Recall mean (std) |
| 0.84 (0.11) | 0.97 (0.03) | 0.72 (0.22) | 0.91 (0.18) |

Table 2A lists the atrophy extent: the number of columns (total, mean and std) in the ground truth and in the computed segmentation and their difference, the difference %, and the $F_1$ score. Table 2B lists the atrophy detection precision and recall for atrophy segments and atrophy lesions.

Figure 13A:
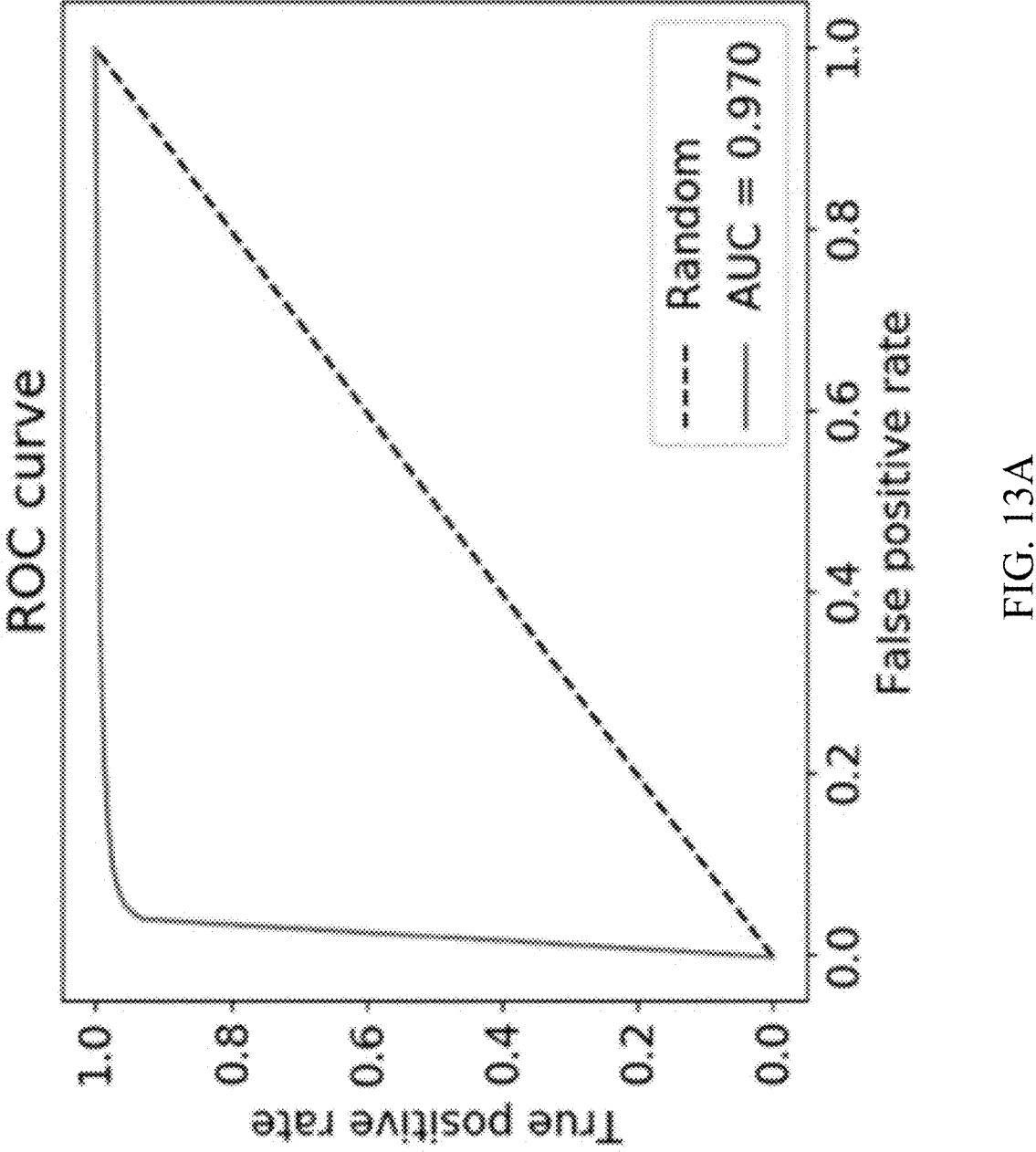
FIGS. 13A-13C show the roc and precision-recall curves and the confusion matrix, according to some embodiments of the present invention.
Figure 13B:
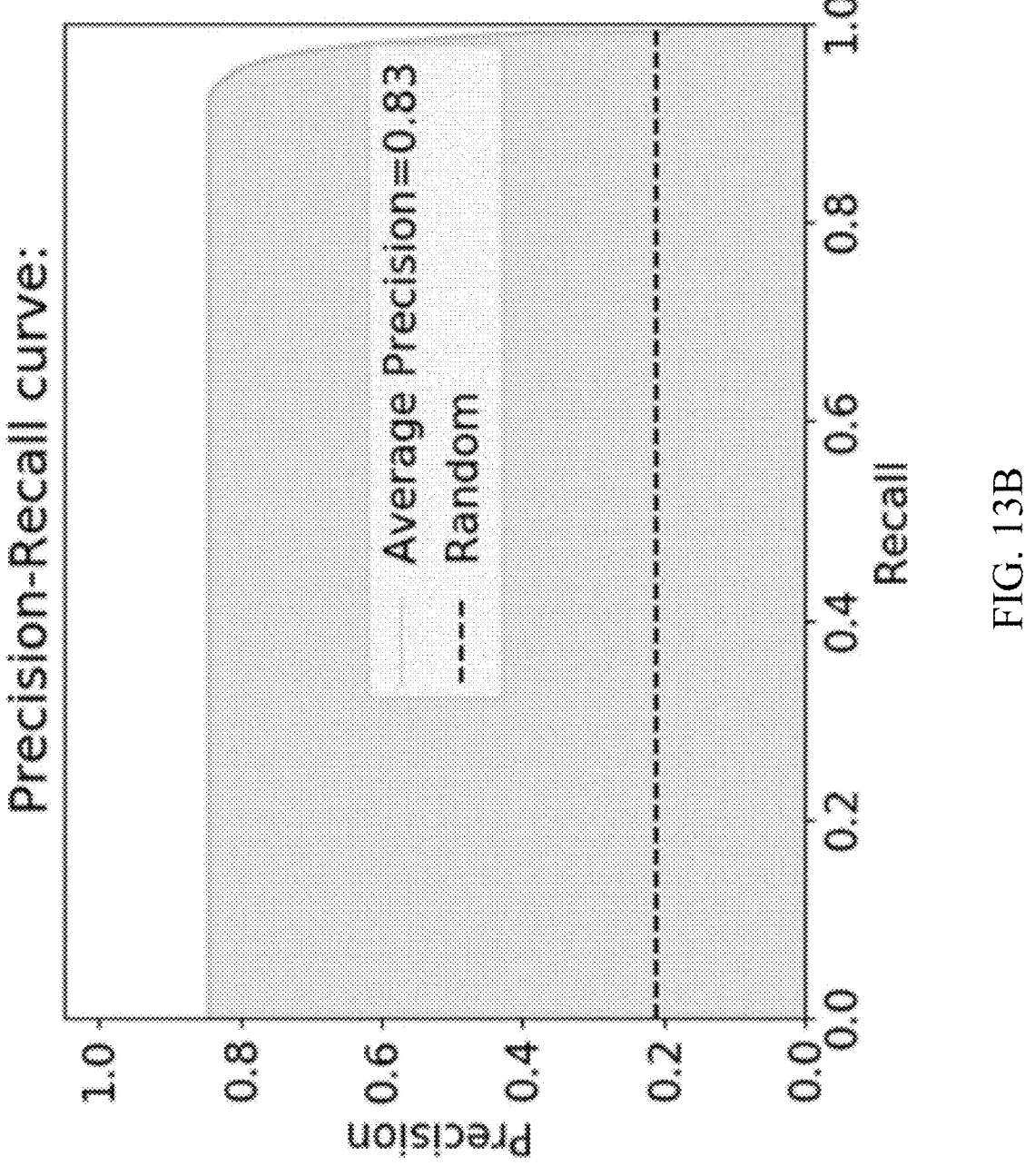
Figure 13C:
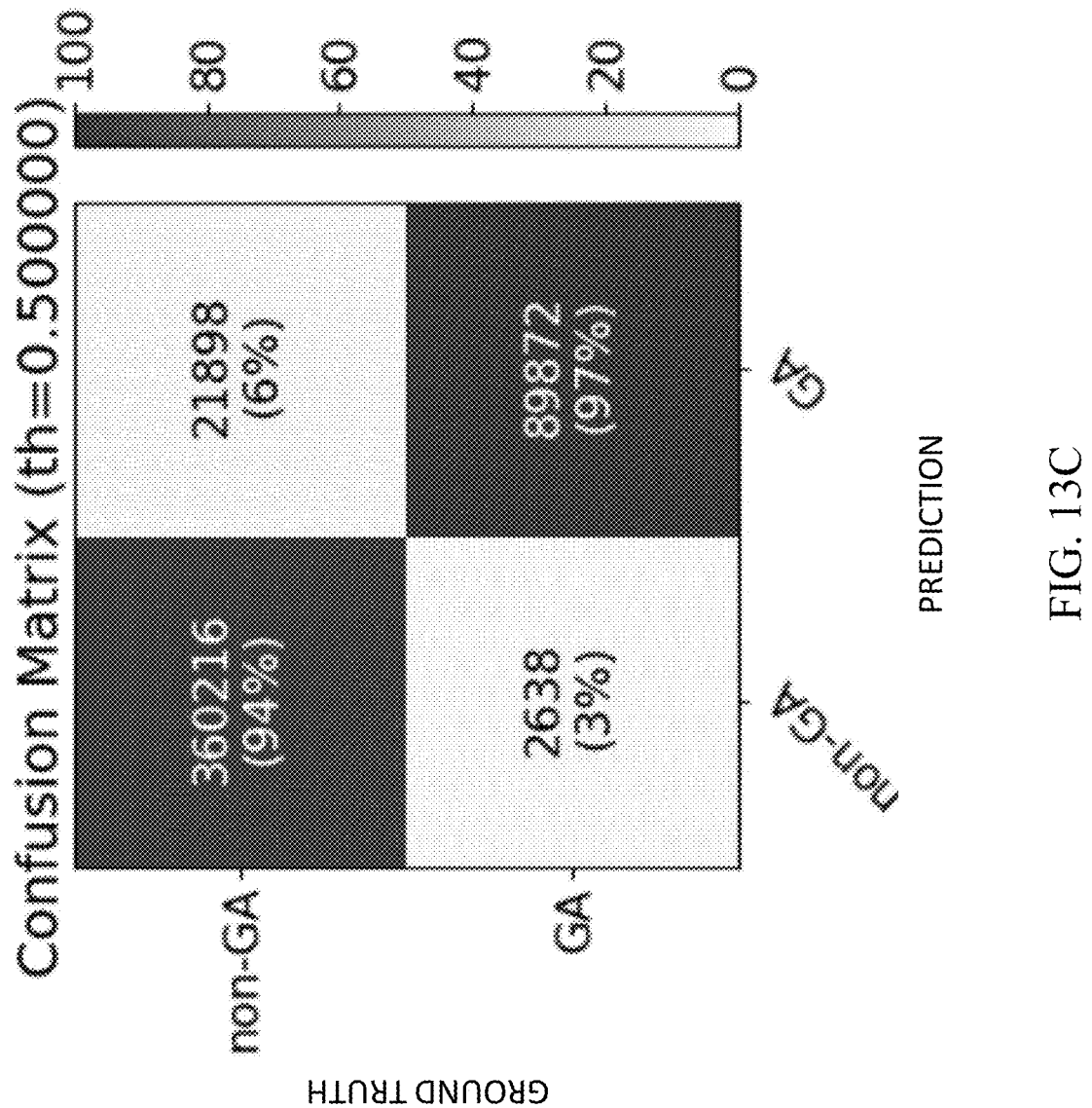

FIGS. 13A-13C show the ROC and Precision-Recall curves and the Confusion matrix. As before, since the $F_1$ loss is used, the value of th is automatically set to 0.5. The AUC is 0.97, the mean precision is 0.83, and the true positive and true negative rates are 97% and 94%, respectively. FIG. 13A shows ROC curve and AUC measure. FIG. 13B shows Precision-Recall and average precision—the dotted line shows the performance of random choice. FIG. 13C shows a confusion matrix.

Study 4: Fovea location, atrophy lesion area, and distance from the fovea: This study was performed on dataset D1. It includes the validation of two clinically relevant measures: (1) the computed fovea center location computed from the OCT scans with respect to the manual location; and (2) the computed atrophy total area and the atrophy lesions and their distance from the fovea.

For the validation of the fovea center location, a total of 50 randomly selected cases in D1 were annotated by a first annotator. The mean (std) distance between the manual ground truth and the automatically computed fovea location is 5.5 (10.5) pixels in the range of 0-44 pixels, which corresponds to 0.1 (0.2) mm in the range of 0-0.8 mm. This distance is well within the typical foveal pit diameter of 0.5 mm. Note that since the bottom of the pit is relatively flat, the manual fovea location annotation is subject to observer variability.

For the cRORA atrophy lesion total area, the mean (std) for the manual ground truth segmentation is 7.33 mm² (3.69 mm²) in the range 3.71-16.33 mm². For the automatically computed segmentation by the 3D columns machine learning model with the $F_1$ loss function, the mean total area is 8.56 mm² (4.83 mm²) in the range of 3.42-19.71 mm². The mean (std) difference in area between the manual ground truth and the automatically computed segmentations is +1.25 mm² (2.27 mm²) in the range between −1.49 mm² and +7.18 mm². FIGS. 14A-14C show two examples of the results. FIG. 14A shows the original IR image with overlay of the OCT scan FOV (white rectangle). FIGS. 14B-14C show the IR image with an overlay of the fovea location (white dot), and the cRORA atrophy lesions segmentation: ground truth (FIG. 14B), and computed by the 3D columns machine learning model with the $F_1$ loss function (FIG. 14C). The atrophy lesion area and the distance from the fovea are shown in the lower right corner.

The present experimental results indicate that the present column-based machine learning segmentation of atrophy segments and lesions in OCT scans achieves near expert performance for cRORA and macular atrophy. The best results are achieved by the 3D column machine learning model using the $F_1$ loss function: the mean $F_1$ score is 0.78 (std 0.06) with an AUC of 0.937—this is the same as the observer variability $F_1$ score of 0.78 (std=0.14) with a lower std. For macular atrophy, the mean $F_1$ score is 0.89 (std 0.09) with an AUC of 0.97. The clinical measurements accuracy of fovea location and atrophy lesion area are within the values reported in the literature for macular atrophy. The mean (std) difference in the atrophy lesion area between the manual ground truth and the automatically computed segmentations is +1.25 mm² (2.27 mm²) in the range between −1.49 mm² and +7.18 mm².

The present technique is unique in that it classifies retinal atrophy based on the light scattering pattern of each OCT column that includes all retinal layers instead of relying on the presence or absence and on the thickness of each individual retinal layer in the OCT scan. The present technique requires only a relatively small set of annotated datasets to achieve expert-level performance. This is in contrast to other deep learning approaches based on retinal boundaries segmentation, which require significantly larger annotated datasets.

Simultaneous Column-Based Classification for Progression Analysis of Atrophy

In some embodiments, the present technique provides for automated detection and quantification of time-related changes in atrophy associated with AMD in a subject, based on analysis of a pair of successive OCT scans of the subject.

In some embodiments, the present technique uses a machine learning model configured to classify light scattering patterns in matched pairs of vertical pixel-wide columns (A-scans) in registered pair of OCT slices (B-scans) in which atrophy appears Disease progression evaluation of AMD using OCT scans requires the analysis and comparison of two or more successive OCT scans of a patient acquired at different time points. Although a longitudinal evaluation can be obtained by performing standalone evaluation of each OCT scan separately, and then comparing the results, this approach has three main drawbacks:

(i) The reported atrophy change is not spatially localized, because the OCT scans are not registered (i.e., aligned) to one another;

(ii) the atrophy changes detection is determined by two separate atrophy classifications in each of the successive OCT scans, rather than by a single classification of the relative change of the atrophy appearance in both OCT scans at once. This distinction may have significant implications with respect to the results; and (iii) the extent and boundaries of the atrophy changes may be imprecise and may only be determined by comparative analysis.

These problems are further exacerbated in the case of successive OCT scans taken at different scanners and/or different resolutions, which is the norm in clinical practice.

Accordingly, in some embodiments, the present technique provides for atrophy lesions changes analysis over pairs of consecutive OCT studies (for example, a prior and a current OCT study). In some embodiments, the present technique can be applied to a series comprising more than two successive OCT studies, wherein each pair in the series may be analyzed in descending sequential order. The result may include the atrophy lesions, their areas and their distances from the fovea in each OCT study, and the atrophy lesion changes in terms of new atrophy lesions, atrophy lesions area changes, and other clinically relevant measures.

A potential advantage of the present technique is, therefore in that it provides for pairwise analysis of atrophy lesion in consecutive OCT studies, which provides more accurate results than any standalone analysis of a single OCT study or a comparison between standalone analysis of two or more OCT studies. The reason is that the accuracy (precision and recall) of the atrophy column classification—and thus of the subsequent computations—is improved when the information of the two registered OCT scans is simultaneously taken into account. The present technique may be equally effective in detecting and qualifying multiple dry AMD atrophy categories (e.g., CRORA, iRORA, CORA, iORA), by training machine learning models on training datasets comprising ground truth samples of the relevant atrophy category. The present technique is it is fully automatic, and relies on easy-to-generate training data comprising OCT atrophy columns.

Experiments conducted by the present inventors indicate that the simultaneous column-based machine learning model segmentation of atrophy segments and atrophy lesions in pairs of first and subsequent OCT scans of a patient achieves results that are comparable to those of manual analysis by an expert. The present technique is unique in that it classifies retinal atrophy and its changes based on the light scattering pattern of matched pairs of OCT columns in a first and subsequent OCT scans, that includes all retinal layers, instead of relying on the presence or absence and on the thickness of each individual retinal layer in each OCT scan. The present technique requires a relatively small training set of annotated data to achieve expert-level performance. For example, the present machine learning model was trained on 34 pairs of first and subsequent OCT studies from 16 patients.

Figure 15:
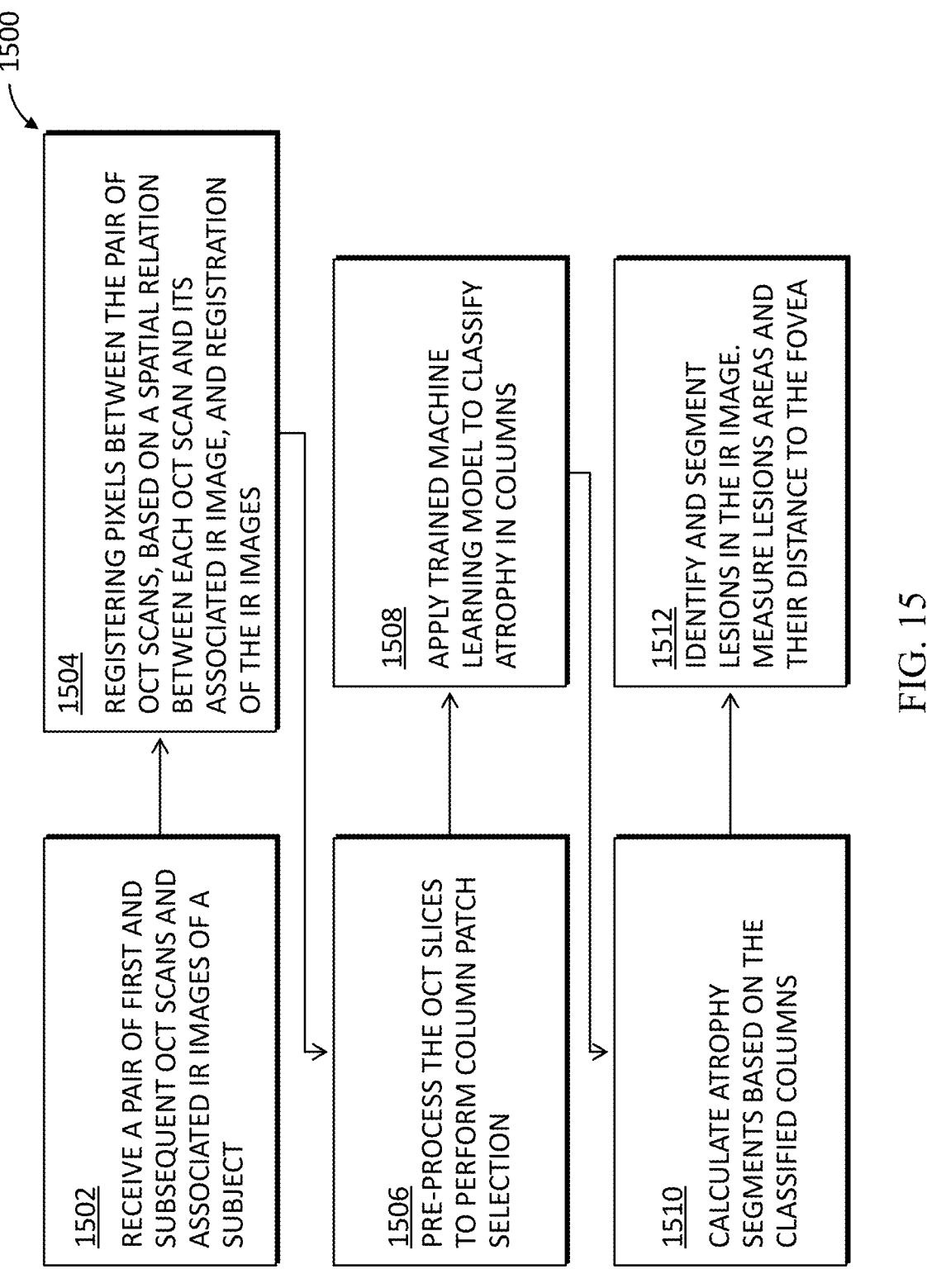
FIG. 15 illustrates the functional steps in a method for automated detection and quantification of atrophy changes in a pair of consecutive OCT studies of a subject, in accordance with some embodiments of the present invention.

FIG. 15 illustrates the functional steps in a method 1500 for automated detection and quantification of atrophy changes in a pair of consecutive OCT studies of a subject, in accordance with some embodiments of the present invention. The various steps of method 1500 will be described with continuous reference to exemplary system 200 shown in FIG. 2. The various steps of method 1500 may either be performed in the order they are presented or in a different order (or even in parallel), as long as the order allows for a necessary input to a certain step to be obtained from an output of an earlier step. In addition, the steps of method 1500 may be performed automatically (e.g., by system 200 of FIG. 2), unless specifically stated otherwise. In addition, the steps of method 1500 are set forth for exemplary purposes, and it is expected that modification to the flow chart is normally required to accommodate various network configurations and network carrier business policies.

By way of overview, method 1500 comprises the following broad steps:

(i) Receiving as input a pair of consecutive OCT studies of a subject, as well as corresponding IR images.

(ii) Image registration of column patches in the pair of OCT studies.

(iii) Pre-processing of the OCT studies to perform column patch selection.

(iv) Detection of atrophy columns in the OCT slices by applying a trained machine learning model of the present technique.

(v) Delineation of atrophy segments based on the detection of atrophy columns.

(vi) Segmentation of lesions in the corresponding IR image.

(vii) Measurement of atrophy lesions areas and their distances from the fovea, as well as changes in atrophy segments between the pair of OCT studies.

Method 1500 begins in step 1502, wherein system 200 may receive as input, with respect to an eye of a subject:

a pair of consecutive OCT scans 220, each comprising one or more B-scan slices, and a corresponding pair of input IR images, each associated with one of the pair of OCT scans.

In step 1504, the present technique provides for establishing a common reference frame between the pair of input OCT scans 220 scans. Specifically, the purpose of step 1504 is to ensure that OCT columns in the pair of OCT scans 220 are matched.

In some embodiments, the instructions of image processing module 206a may cause system 200 to perform image registration between the input pair of OCT scans, wherein image data from the pair of OCT scans in transformed into a single coordinate system. In some embodiments, registration of the pair of OCT scans is based, at least in part, on a known spatial relation between the each of the pair of OCT scans and its corresponding IR image, which is provided by the OCT scanner.

Accordingly, the instructions of image processing module 206a may cause system 200 to perform the following sub-steps:

(i) A transformation between a first one of the OCT scans and its associated IR image, (ii) a transformation between the IR image associated with the first one of the OCT scans and the IR image associated with the second one of the OCT scans, and (iii) a transformation between the IR image associated with the second one of the OCT scans and the second one of the OCT scans.

In some embodiments, the transformation between the first and second associated IR images is a 2D rigid registration performed using any suitable registration method. For example, the registration may be based on landmarks in the IR images, such as retina blood vessels. Retinal blood vessels are known to be accurately identifiable and stable over time, so they may be used as reliable registration features. In some embodiments, the registration process accounts for any possible resolution and field of view (FOV) differences in the OCT scans and IR image.

Figure 16B:
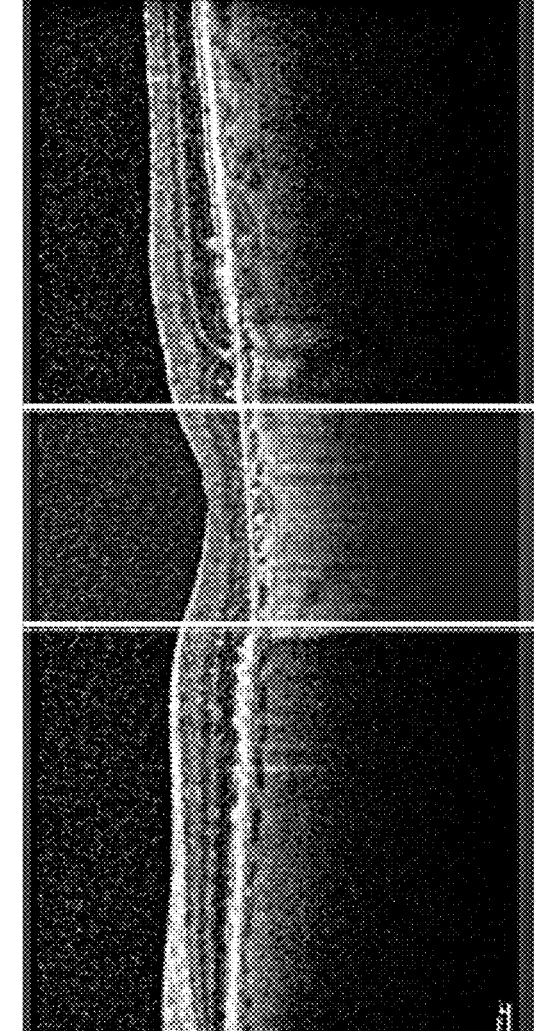

FIGS. 16A-16B show an example of registered first (panels A) and subsequent (panels B) pair of OCT studies of a patient with dry AMD taken 26 months apart. Each OCT study consists of an IR images (shown in FIG. 16A) and an OCT scan (of which one OCT slice is shown in FIG. 16B). Overlaid on the IR images are the OCT scan field of view (marked as a rectangle) and the location of OCT slice on display in the stack (horizontal arrow). Overlaid on the OCT in FIG. 16B slices are the cRORA atrophy segments whose boundaries are their leftmost and rightmost columns (marked by two vertical lines). As can be seen in panel B in FIG. 16B, there is increased degeneration of the RPE layer inside the atrophy segments which manifests by the light scattering pattern. The increase in the atrophy segment width from panel A to panel B indicates cRORA progression With reference back to FIG. 15, in some embodiments, the registration process of the present technique may be formally denoted as follows: let (x, y, z) be a coordinate system in which the xy plane is the IR image plane and the yz plane is an OCT slice. The x coordinate is the OCT slice number, the y coordinate is the OCT column location on the OCT slice, and the z coordinate is the location on the OCT column in the depth dimension.

Let $$(x, y)_{OCT}^{P} = \left(x_{OCT}^{P}, y_{OCT}^{P}\right)$$

and $$(x, y)_{OCT}^{C} = \left(x_{OCT}^{C}, y_{OCT}^{C}\right)$$

be the coordinates of an OCT column in a pair of OCT scans consisting of a first (P) and subsequent (C) OCT scans in the IR image plane. Let $$T_{OCT\ to\ IR}^{P} : (x, y)_{OCT}^{P} \rightarrow (x, y)_{IR}^{P}$$

and $$T_{OCT\ to\ IR}^{C} : (x, y)_{OCT}^{C} \rightarrow (x, y)_{IR}^{C}$$

be the transformations that map the P and C OCT scans, respectively, to their associated IR images, and let $$T_{OCT}^{P\ to\ C} : (x, y)_{OCT}^{P} \rightarrow (x, y)_{OCT}^{C}$$

be the 2D rigid transformation between the first and the subsequent IR images:

$$T_{OCT}^{P\ to\ C} = T_{OCT\ to\ IR}^{C}{}^{-1} \circ T_{IR}^{P\ to\ C} \circ T_{OCT\ to\ IR}^{P}$$

The transformations are invertible, i.e., the OCT scan columns of the P and C OCT scans can interchangeably be defined as the registration basis.

The transformation $$T_{OCT\ to\ IR}^{P}$$

is computed from the location of the OCT column to the scans' resolutions in both modalities. Let $$\hat{x}_{OCT}^{P} = \frac{x_{OCT}^{P}}{n^{P}} \quad \text{and} \quad \hat{y}_{OCT}^{P} = \frac{y_{OCT}^{P}}{w_{OCT}^{P}}$$

be the normalized OCT column slice number and the column location on the OCT slice, where $n^{P}$ is the number of slices and $$w_{OCT}^{P}$$

is the OCT slice width in the first OCT scan. Then, $$T_{OCT\ to\ IR}^{P}\left((x, y_{OCT}^{P}\right) = \left(h_0 + h_{IR}^{P} \cdot \hat{x}_{OCT}^{P}, w_0 + w_{IR}^{P} \cdot \hat{y}_{OCT}^{P}\right)$$

where $$h_{IR}^{P} \quad \text{and} \quad w_{IR}^{P}$$

are the height and width of the first IR image and $(h_0, w_0)$ is the location of the bottom left corner of the OCT scan FOV in the IR image.

$$T_{OCT\ to\ IR}^{C}$$

defined and computed similarly.

The transformation $$T_{OCT}^{P\ to\ C}$$

is computed by landmark-based 2D rigid registration between the first and the subsequent IR images in three steps: (i) detection of retinal blood vessels based on the gradient of the IR image and Frangi filtering for continuous edges detection (see, Frangi, A, et al. 1998. Multiscale vessel enhancement filtering. Lecture Notes in Computer Science, LNCS Vol 1496,130-137, Springer-Verlag. Germany), (ii) automatic identification of landmark points in the retinal blood vessels image by ORB feature detection (see, e.g., Rublee, E., et al. 2011. ORB: an efficient alternative to SIFT or SURF. Proc. IEEE Int. Conf. on Computer Vision, pp. 2564-2571.), and (iii) matching landmark points in both IR images using RANSAC with a 2D rigid transformation that minimizes the sum of the squared pairwise distances between the paired landmark points. Points whose nearest neighbor in the first IR image are at a pre-defined distance $\leq d_{reg}$ are discarded as outliers.

The 2D rigid registration between the IR images includes the following steps: (i) candidate landmark points are located in the first and subsequent IR images; (ii) pairing between the first and subsequent landmark points after outlier elimination; and (iii) subsequent IR image is overlaid on the first IR image after applying $$T_{OCT}^{P \text{ to } C^{-1}}.$$

The registration accuracy is evaluated by comparing the difference of the blood vessels segmentation before and after the transformation. If needed, a new transformation is computed from three landmark points manually selected in each IR image.

Figure 17:
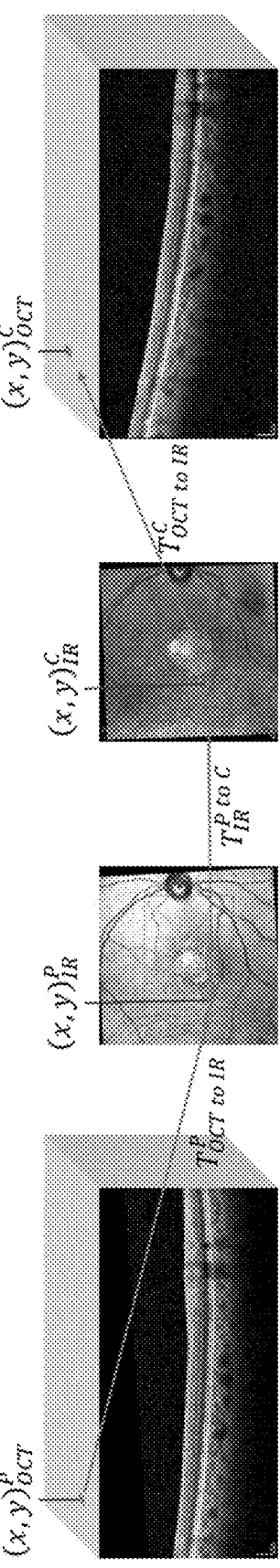
FIG. 17 illustrates OCT column registration transformations, in accordance with some embodiments of the present invention.

FIG. 17 illustrates OCT column registration transformations: an OCT column in a first OCT scan (left side) with coordinates $$(x, y)_{OCT}^P$$

is associated with a pixel $$(x, y)_{IR}^P$$

in its corresponding IR image by transformation $$T_{OCT \text{ to } IR}^P.$$

An OUT column in a subsequent OCT scan (right side) with coordinates $$(x, y)_{OCT}^C$$

is associated with a pixel $$(x, y)_{IR}^C$$

in its corresponding IR image by transformation $$T_{OCT \text{ to } IR}^C.$$

Transformation $$T_{IR}^{P \text{ to } C}$$

matches the pixel locations in the first and subsequent images.

With reference back to FIG. 15, in step 1506, the instructions of image processing module 206a may cause system 200 to perform a pre-processing step, wherein each OCT B-scan slice undergoes a denoising and column patch preparation.

Denoising may be necessary because the OCT scanning process produces both vertical and lateral light scattering that affects neighboring pixels. Accordingly, image denoising may be performed by local average smoothing by convolution with a normalized 5×5 box filter.

Then, for each OCT slice of height $h_{OCT}$ and width $w_{OCT}$, the present technique provides for creating m column patches of size $h_{OCT} \times w_{column}$, where the number of column patches in the m slice is equal to $$\left\lfloor \frac{w_{OCT}}{s} \right\rfloor,$$

and where $s < w_{column}$, and denotes the overlap stride between the column patches. In some embodiments, columns at the right and left edges of the OCT scan that do not fit into a column patch are ignored.

In some embodiments, column patches of the present technique may have a width dimension of 1 or more pixels. In some embodiments, column patches of the present technique are configured to include at least a cross-section of all retinal layers as well as the light scattering pattern below the RPE in the height dimension. In some embodiments, column patches of the present technique may include a single pixel-wide vertical pixel column taken from an A-scan or a B-scan. In some embodiments, column patches of the present technique may be two-dimensional (2D), that is, include two or more vertical pixel-wide columns from a single slice (B-scan). In some embodiments, column patches of the present technique may be three-dimensional (3D), that is, include one or more vertical pixel-wide columns from two or more slices (C-scan).

Reference is made back to FIGS. 4A-4C which shows exemplary column patch construction according to the present technique. FIG. 4A illustrates an exemplary pixel-wide column of the present technique. OCT B-scan 400 comprises a slice 402, which has a height $h_{OCT}$ dimension of 496 pixels and a width $w_{OCT}$ dimension of 1200 pixels. Slice 402 may be partitioned into multiple pixel-wide vertical column patches, such as exemplary column 404 (marked by a vertical line) having a height $h_{column}$ dimension of 496 pixels and a width $w_{column}$ of 1 pixel, for a total size of 496×1 pixels. The vertical dimension of column patch 404 includes at least a cross-section of all retinal layers as well as the light scattering pattern below the RPE.

FIG. 4B illustrates an exemplary 2D column patch of the present technique. OCT B-scan 410 comprises a slice 412, which has a height $h_{OCT}$ dimension of 496 pixels and a width $w_{OCT}$ dimension of 1200 pixels. Slice 412 may be partitioned into multiple vertical column patches, such as exemplary column patch 414 (marked by two vertical boundary lines) having a height $h_{column}$ dimension of 496 pixels and a width $w_{column}$ of at least 2 pixels, for example as shown, 7 pixels, for a total size of 496×7 pixels. The vertical dimension of column patch 406 includes at least a cross-section of all retinal layers as well as the light scattering pattern below the RPE.

FIG. 4C shows an exemplary 3D column patch of the present technique, where the column patch size is $h_{OCT} \times w_{column} \times s_{neighbors}$, and where $w_{column}$ is the predefined column width, centered at the column of interest, and $s_{neighbors}$ is the number of OCT slices including the current one. In the example of FIG. 4C, Oct C-scan 420 comprises 3 slices 422a, 422b, 422c, each having a height $h_{OCT}$ dimension of 496 pixels and a width $w_{OCT}$ dimension of 1200 pixels. 3D column patch 424 (marked by a rectangular box) has a height $h_{column}$ dimension of 496 pixels, a width $w_{column}$ of, for example, 7 pixels, and a depth $s_{neighbors}$ of 3 pixels, for a total size of 496×7×3 pixels, consistent with the number of slices 42a, 42b, 42c in OCT scan 402. The vertical dimension of column patch 424 includes at least a cross-section of all retinal layers as well as the light scattering pattern below the RPE.

With reference back to FIG. 15, in some embodiments, in step 1508, the instructions of machine learning module 206*b* may cause system 200 to apply a trained machine learning model of the present technique to the OCT column patches created in step 1506, to classify each column patch created in step 1506 based on the presence or absence of atrophy in the classified column patch. In some embodiments, the output of the machine learning model of the present technique is a bit (e.g., a binary output of [0,1]) indicating the presence or absence of AMD atrophy in the classified column patch.

Figure 18A:
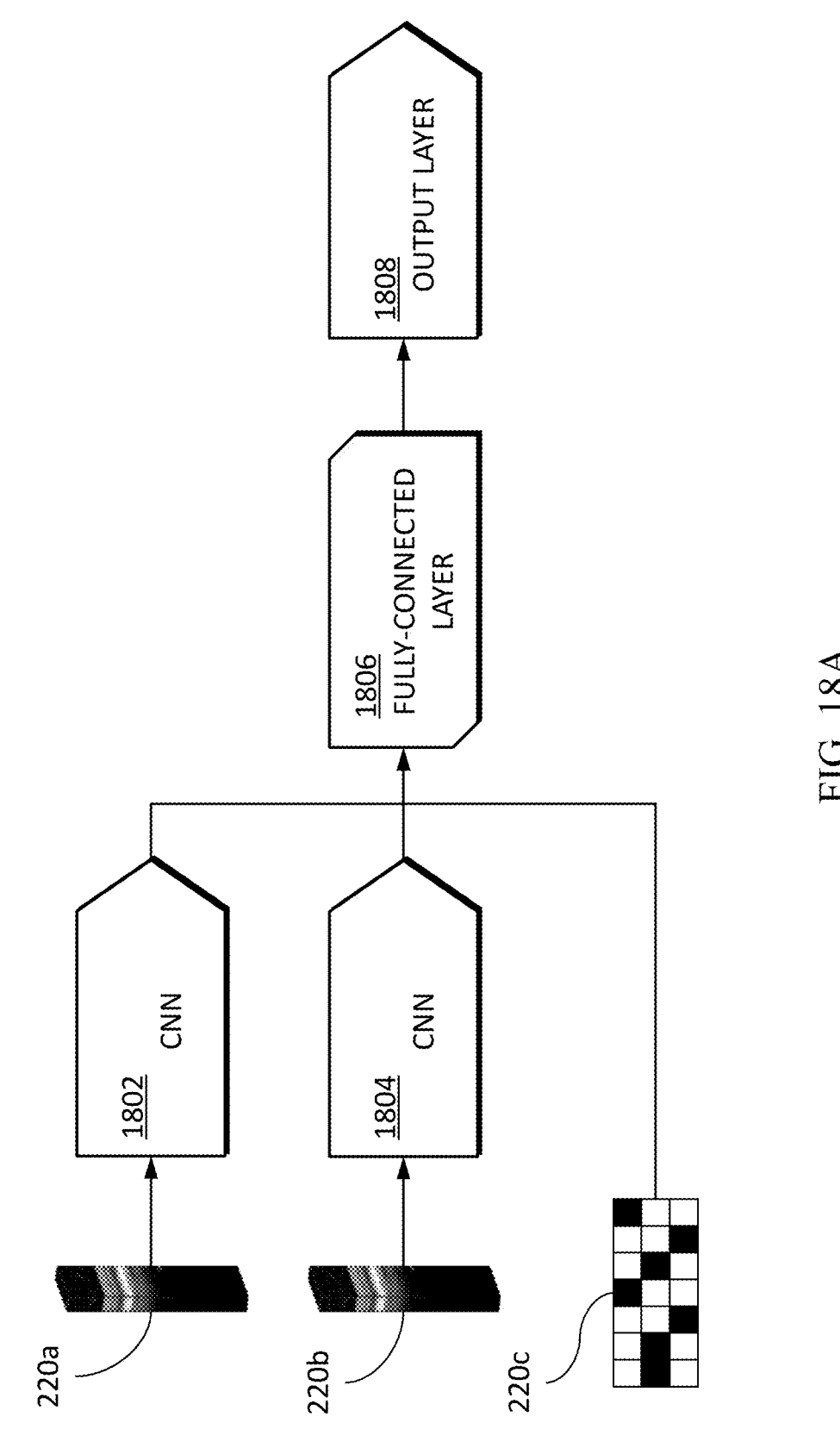
FIGS. 18A-18C illustrate exemplary architectures of machine learning models trained to perform classification of OCT columns patches, in accordance with some embodiments of the present invention.
Figure 18B:
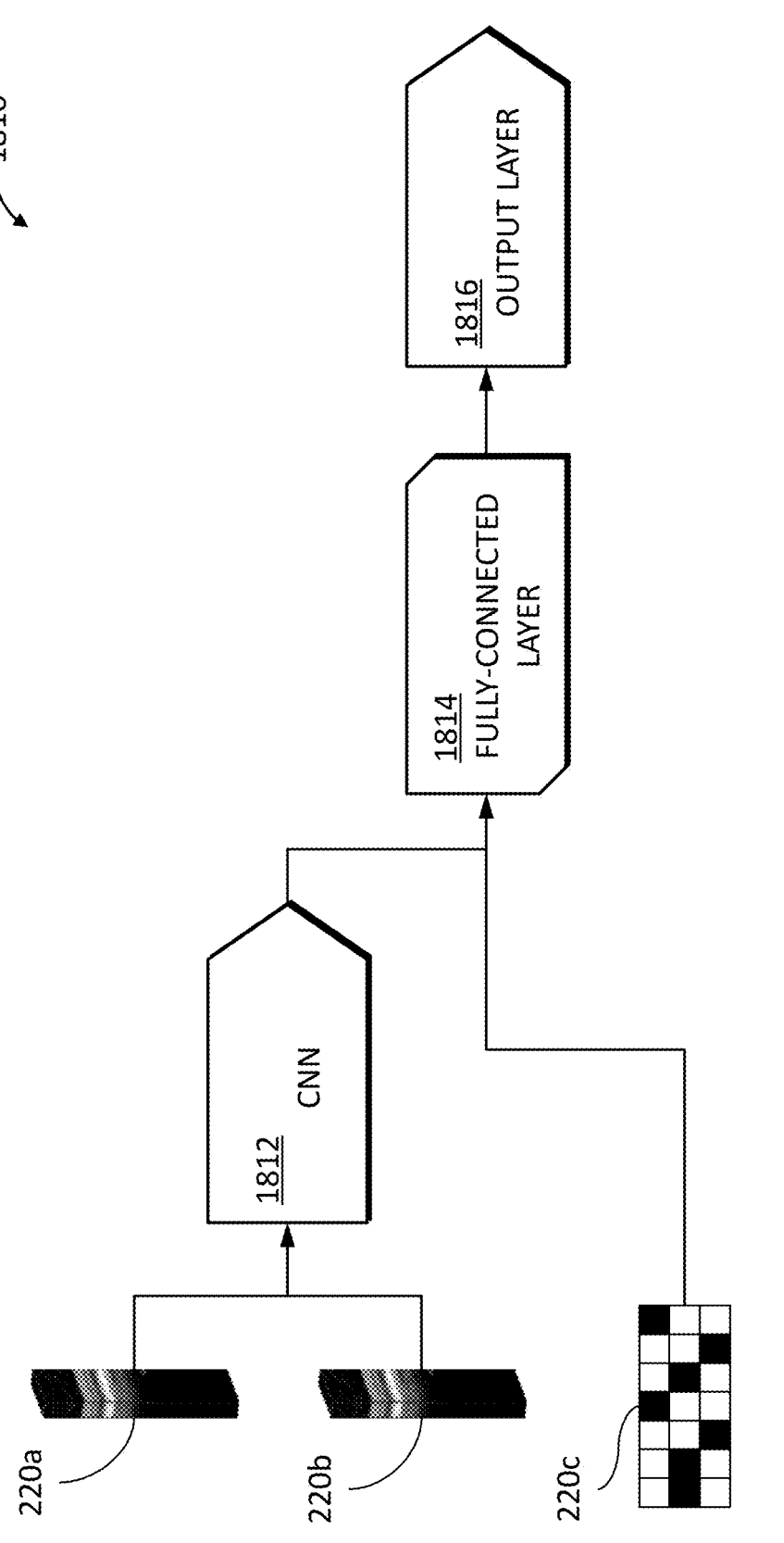
Figure 18C:
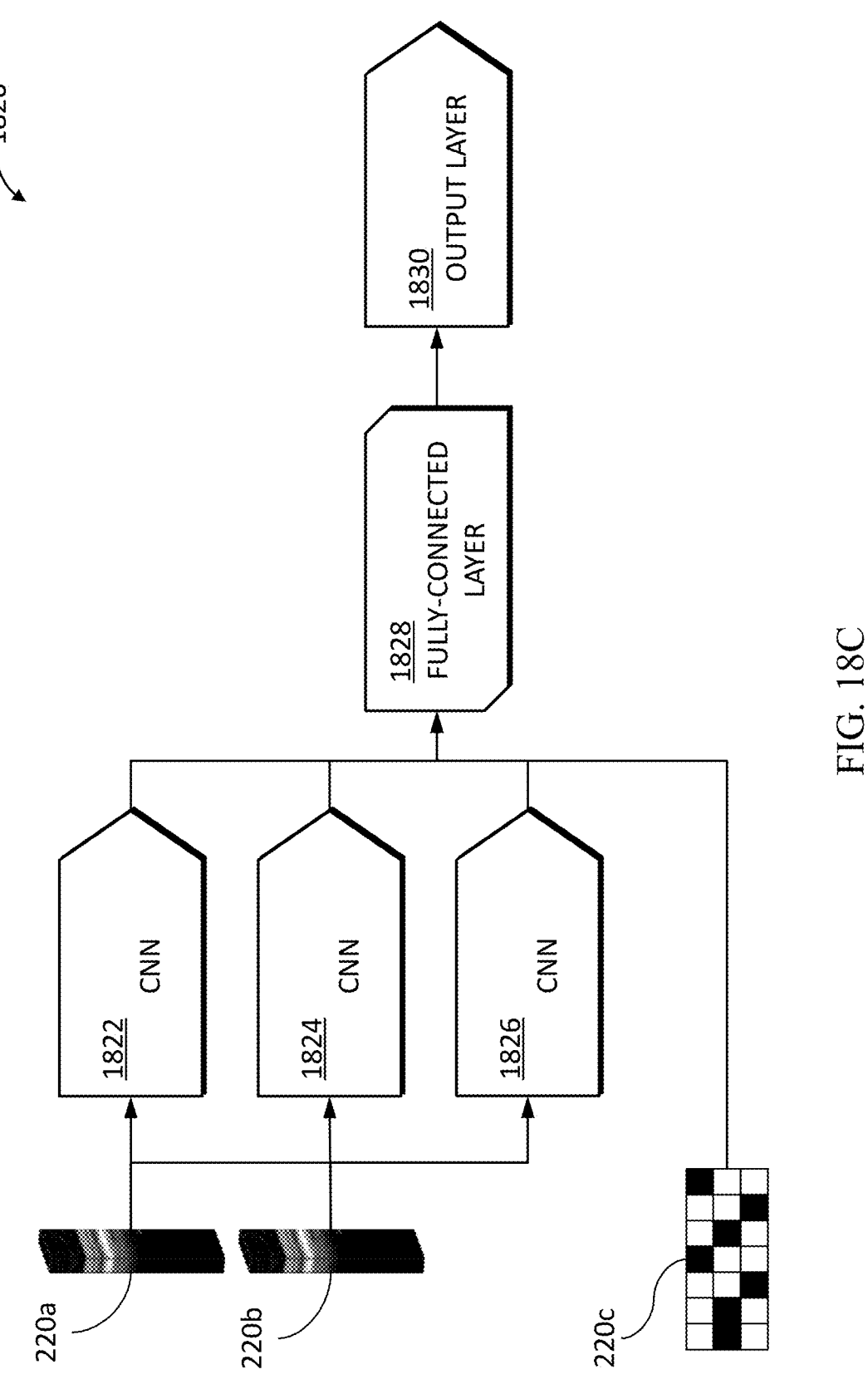

FIGS. 18A-18C illustrate exemplary architectures of machine learning models of the present technique, trained to perform classification of OCT columns patches.

FIG. 18A shows an exemplary architecture of a machine learning model 1800 of the present technique. The inputs to machine learning model 1800 are two matched OCT column patches 220*a*, 220*b* from, respectively, a first and subsequent OCT scans 220 received in step 1502. The input column patches 220*a*, 220*b* may be of size 496×7×3. Machine learning model 1800 applies standalone pre-trained CNNs 1802, 1804 separately respectively to each of column patches 220*a*, 220*b*. Each CNN 1802, 1804 processes the convolution computing for its respective input column patch and extracts features on its plane. Each convolutional layer may be followed by a max pooling layer, which performs feature selection and filtering on the result of convolutional layer.

Optionally, an atrophy segments matrix 220*c* may also be an input into machine learning model 1800. Atrophy segments matrix 220*c* indicates the presence or absence of atrophy in each of the individual columns in column patch 220*a* (associated with the first one of OCT scans 220), and may have a size 7×3.

The outputs of the CNNs 1802, 1804, and optional matrix segments 220*c*, may be merged into a single feature representation at a merge layer, and then fed into a fully connected (FC) layer 1806. Machine learning model 1800 outputs, at output layer 1808, a bit (e.g., a binary output of [0,1]) indicating the presence or absence of AMD atrophy in the classified column patch.

FIG. 18B shows another exemplary architectures of a machine learning model 1810 of the present technique. The inputs to machine learning model 1800 are two matched OCT column patches 220*a*, 220*b* from, respectively, a first and subsequent OCT scans 220 received in step 1502. The input column patches 220*a*, 220*b* may be of size 496×7×3.

Machine learning model 1810 applies a single simultaneous pre-trained CNN 1812 to column patches 220*a*, 220*b*. CNN 1812 processes the convolution computing for the input column patches 220*a*, 220*b* and extracts features on its plane. Each convolutional layer may be followed by a max pooling layer, which performs feature selection and filtering on the result of convolutional layer.

Optionally, an atrophy segments matrix 220*c* may also be an input into machine learning model 1810. Atrophy segments matrix 220*c* indicates the presence or absence of atrophy in each of the individual columns in column patch 220*a* (associated with the first one of OCT scans 220), and may have a size 7×3.

The output of the CNN 1812, and optional matrix segments 220*c*, may be merged into a single feature representation at a merge layer, and then fed into a fully connected (FC) layer 1814. Machine learning model 1810 outputs, at output layer 1816, a bit (e.g., a binary output of [0,1]) indicating the presence or absence of AMD atrophy in the classified column patch FIG. 18C shows yet another exemplary architecture of a machine learning model 1820 of the present technique. The inputs to machine learning model 1820 are two matched OCT column patches 220*a*, 220*b* from, respectively, a first and subsequent OCT scans 220 received in step 1502. The input column patches 220*a*, 220*b* may be of size 496×7×3. Machine learning model 1820 applies two standalone pre-trained CNNs 1822, 1824 separately respectively to each of column patches 220*a*, 220*b*. In addition, machine learning model 1820 applies a single simultaneous pre-trained CNN 1826 to both of column patches 220*a*, 220*b*.

Each CNN 1822, 1824, 1826 processes the convolution computing for its respective input column patch and extracts features on its plane. Each convolutional layer may be followed by a max pooling layer, which performs feature selection and filtering on the result of convolutional layer.

Optionally, an atrophy segments matrix 220*c* may also be an input into machine learning model 1820. Atrophy segments matrix 220*c* indicates the presence or absence of atrophy in each of the individual columns in column patch 220*a* (associated with the first one of OCT scans 220), and may have a size 7×3.

The outputs of the CNNs 1822, 1824, 1826, and optional matrix segments 220*c*, may be merged into a single feature representation at a merge layer, and then fed into a fully connected (FC) layer 1828. Machine learning model 1820 outputs, at output layer 1830, a bit (e.g., a binary output of [0,1]) indicating the presence or absence of AMD atrophy in the classified column patch.

In some embodiments, machine learning models 1800, 1810, 1820 of the present technique may be trained on training datasets generated by machine learning module 206*b*.

In some embodiments, the instructions of machine learning module 206*b* may cause system 200 to receive a plurality of OCT studies, each comprising one or more consecutive 2D scan slices, obtained from a cohort of healthy subjects as well as subjects having various types and/or stages of retinal atrophy. In some embodiments, the cohort includes subjects having retinal atrophy associated with only one type or category of atrophy. In some embodiments, the cohort includes subjects having retinal atrophy associated with two or more specified types or categories of atrophy. For example, the cohort may include subjects having retinal atrophy associated with only one, or with two or more, of the following atrophy categories:

complete RPE and outer retinal atrophy (cRORA), incomplete RPE and outer retinal atrophy (iRORA), complete outer retinal atrophy (cORA), and incomplete outer retinal atrophy (iORA).

In some embodiments, the instructions of machine learning module 206*b* may cause system 200 to construct one or more specific datasets comprising OCT scans from subjects having retinal atrophy associated two or more of the above-listed categories In some embodiments, each of the OCT slices in the received scans is annotated to identify regions representing atrophy. In some embodiments, annotation comprises outlining left and right edges of atrophy segments as atrophy regions or segments, wherein all pixel columns inside an atrophy region or segment are labeled as atrophied, and those outside to the left and right are labeled as healthy. An example of such left/right boundaries can be seen in FIG. 1A. In some embodiments, the present technique provides for a binary labeling scheme wherein a column may be annotated or labeled as 0/1, yes/no, etc. In some embodiments, atrophy regions include all the vertical columns between the left/right boundary columns, where each of the atrophy columns may be annotated as atrophy columns ((e.g., receive an annotation or label of [1]). All vertical columns outside the outermost columns are labeled as healthy (e.g., receive an annotation or label of [0]).

In some embodiments, at a preprocessing step, each OCT slice may undergo, e.g., denoising and data augmentation. In some embodiments, denoising is necessary because the OCT scanning process produces both vertical and lateral light scattering that affects neighboring pixels. Accordingly, image denoising may be performed by local average smoothing by convolution with, e.g., a normalized 5×5 box filter.

In some embodiments, an optional data augmentation step may provide for enlarging the training dataset, e.g., to correct imbalances in the healthy columns and atrophy columns. In some embodiments, data augmentations may be performed using, e.g., horizontal mirroring and small rotations, i.e., ±2° in-plane rotation. However, any suitable data augmentations method known in the art may be implemented.

In some embodiments, column patch formation and selection procedure is executed on each OCT slice. In some embodiments, columns patches are formed by adjoining adjacent neighboring columns to the left and right of a central column. In some embodiments, for each OCT slice of height $h_{OCT}$ and width $w_{OCT}$, the present technique provides for creating m column patches of size $h_{OCT} \times w_{column}$, where the number of column patches in the m slice is equal to $$\left\lfloor \frac{w_{OCT}}{s} \right\rfloor,$$

and where $s < w_{column}$, and denotes the overlap stride between the column patches. In some embodiments, columns at the right and left edges of the OCT scan that do not fit into a column patch are ignored.

In some embodiments, column patches prepared according to step 810 may include single pixel-wide vertical pixel columns (A-scan). In other cases, column patches prepared according to step 810 may include two-dimensional (2D) column patches which include two or more vertical pixel-wide columns from a single slice (B-scan). In yet other cases, column patches prepared according to step 810 may include three-dimensional (3D) column patches which include one or more vertical pixel-wide columns from two or more slices (C-scan).

In some embodiments, the instructions of machine learning module 206b may cause system 200 to construct two or more training datasets of the present technique, comprising the annotated OCT slices comprising atrophy-labeled column patches and healthy regions, and labels associated with the presence or absence of atrophy in each slice region or segment. In some embodiments, the instructions of machine learning module 206b may cause system 200 to construct two or more training datasets of the present technique, comprising sets of features representing light scattering patterns the annotated OCT slices comprising atrophy-labeled column patches and healthy regions, and labels associated with the presence or absence of atrophy in each slice region or segment.

In some embodiments, the instructions of machine learning module 206b may cause system 200 to construct one or more specific datasets, each comprising OCT scans from subjects having retinal atrophy associated with only one type or category of atrophy. In some embodiments, the instructions of machine learning module 206b may cause system 200 to construct one or more specific datasets, each comprising OCT scans from subjects having retinal atrophy associated two or more specified types or categories of atrophy.

For example, the instructions of machine learning module 206b may cause system 200 to construct one or more specific training datasets, each comprising OCT scans from subjects having retinal atrophy associated with only one of the following atrophy categories:

complete RPE and outer retinal atrophy (cRORA),
incomplete RPE and outer retinal atrophy (iRORA),
complete outer retinal atrophy (cORA), and
incomplete outer retinal atrophy (iORA).

In some embodiments, the instructions of machine learning module 206b may cause system 200 to construct one or more specific datasets comprising OCT scans from subjects having retinal atrophy associated two or more of the above-listed categories.

In some embodiments, the instructions of machine learning module 206b may cause system 200 to train a machine learning model, such as constructed machine learning models 1800, 1810, 1820, on the constructed training datasets.

In some embodiments, a machine learning model of the present technique may be trained using the Adam optimizer with a learning rate of 0.001, a batch size of 100 column patches, and $F_1$ loss function. In some embodiments, training may be performed using k-fold cross validation with k=4 for 1,000 epochs. In each fold, the weights are adjusted with those of the epoch with the minimal mean $F_1$ score loss on its validation dataset. The final weights were selected from the fold which yields the $F_1$ score closest to the mean $F_1$ on the validation score for all folds excluding outliers—folds that yield $F_1$ scores that deviate from the mean $F_1$ score by more than one standard deviation.

In some embodiments, in step 1510, the instructions of atrophy segmentation module 206c may cause system 200 to calculate atrophy segments in each of the first and subsequent input OCT scans 220, as overlaid on the corresponding input IR images. The measurements are then computed on the overlaid atrophy lesion segmentation on the IR image. In some embodiments, atrophy segmentation may be calculated by applying morphological operations to the output of the machine learning model classification in step 1508. Initially, the center column of each column patch may be assigned a bit value of [0,1], according to the binary prediction of the machine learning model for that column patch, wherein, for each column patch, [0] indicates the absence of atrophy, and [1] indicate the presence of atrophy. Because a stride of s>1 was taken between neighboring column patches, there is a gap of s−1 pixels between neighboring center columns. These gaps are filled by applying morphological dilation with a horizontal structure element of size $$\left\lceil \frac{s}{2} \right\rceil.$$

Next, an atrophy segments matrix of size $n \times w_{OCT}$ (where n is the number of OCT slices) is computed by projecting each atrophy segment of each slice onto the corresponding row and column of the matrix. Finally, to avoid segments fragmentation, i.e., many small segments with narrow gaps between them, two additional morphological operations are applied to the atrophy segments matrix. The first is morphological closing with a horizontal structure element of size $$w_{frag}^{1D};$$

the second is a 2D morphological closing operation with a structure element of connectivity 1 in diameter $$w_{frag}^{2D}.$$

The values of both constants are determined experimentally. The output of this step is a 2D binary atrophy segments matrix of size $n \times w_{OCT}$. In some embodiments, atrophy lesion segmentations are then computed by projecting the OCT segments matrix onto the IR image using the known transformations $$T_{OCT \ to \ IR}^{P}$$

and $$T_{OCT \ to \ IR}^{C}.$$

Figure 19A:
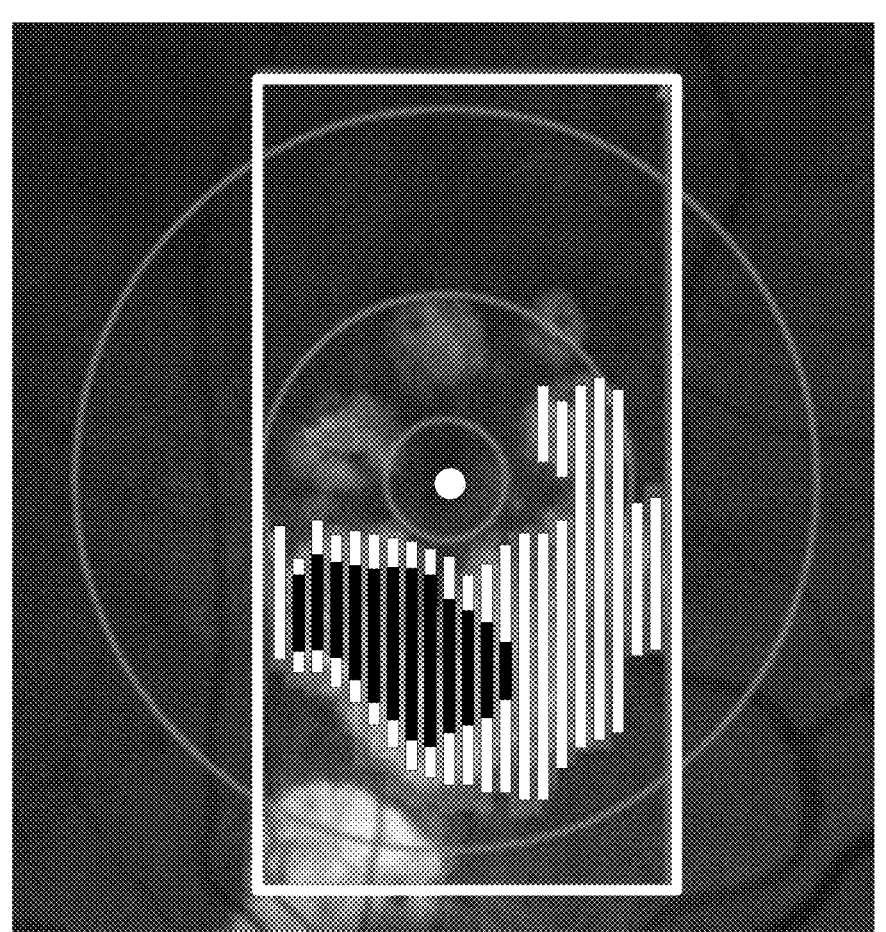
Figure 20A:
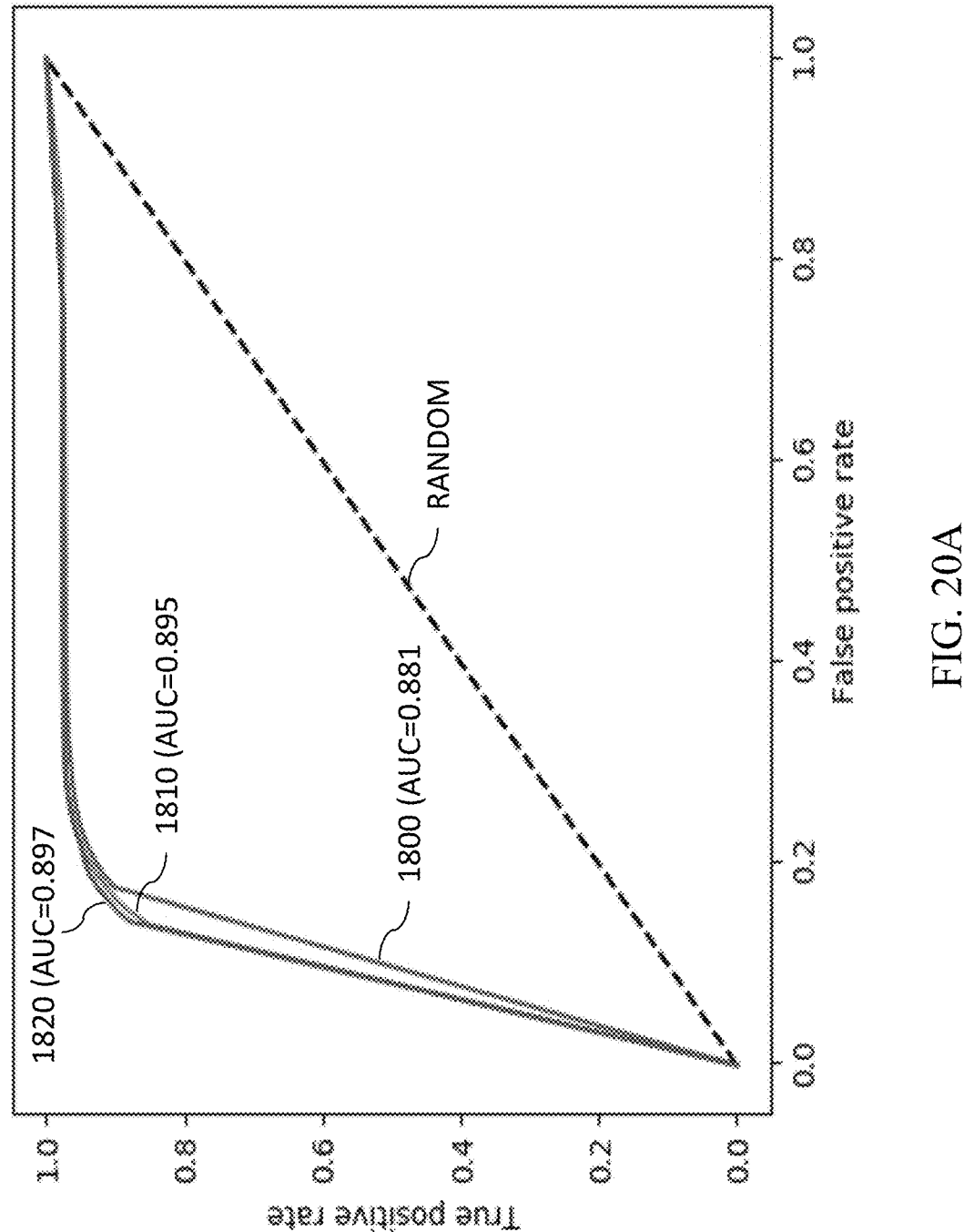
FIGS. 20A-20D show the ROC and precision-recall curves of three exemplary machine learning models, in accordance with some embodiments of the present invention.
Figure 20B:
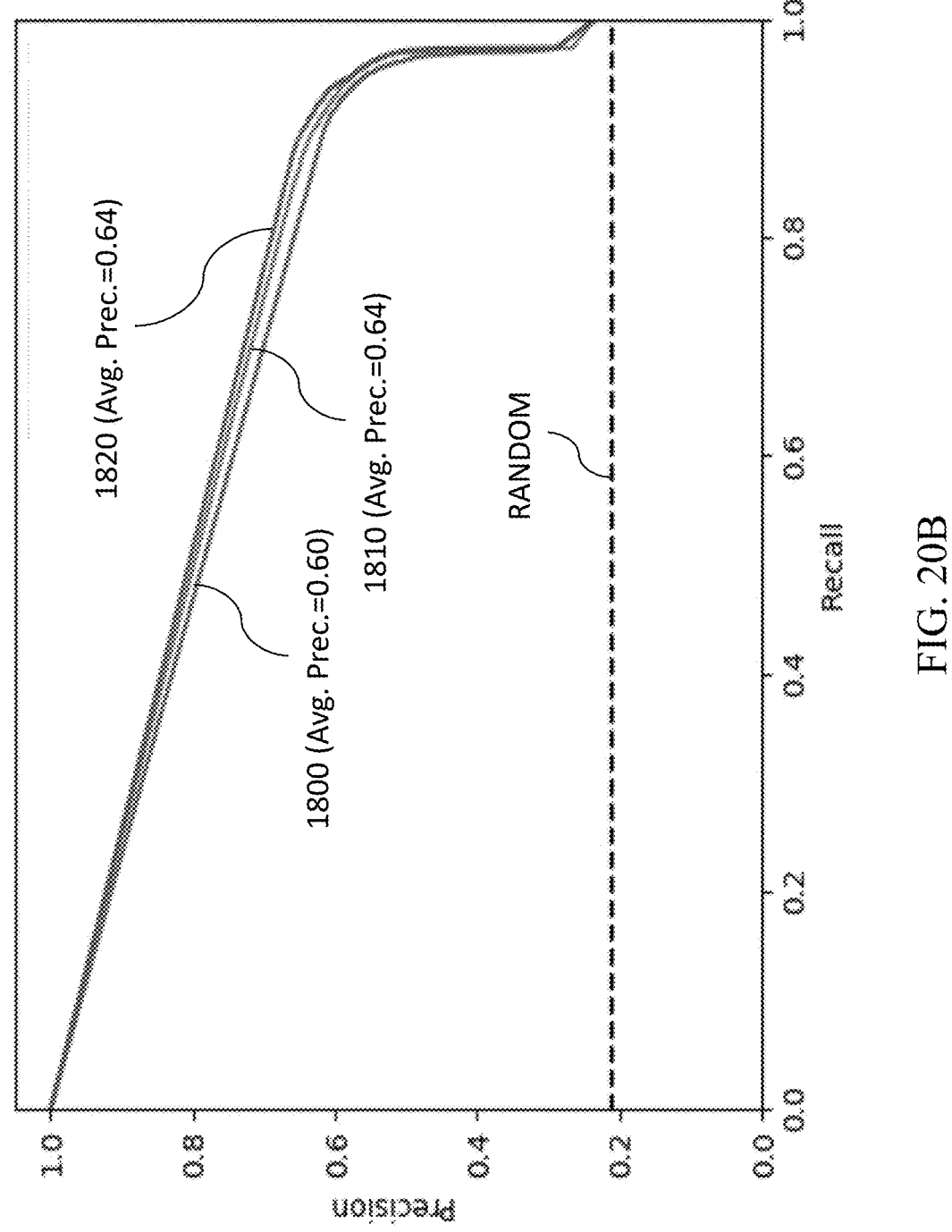
Figure 20C:
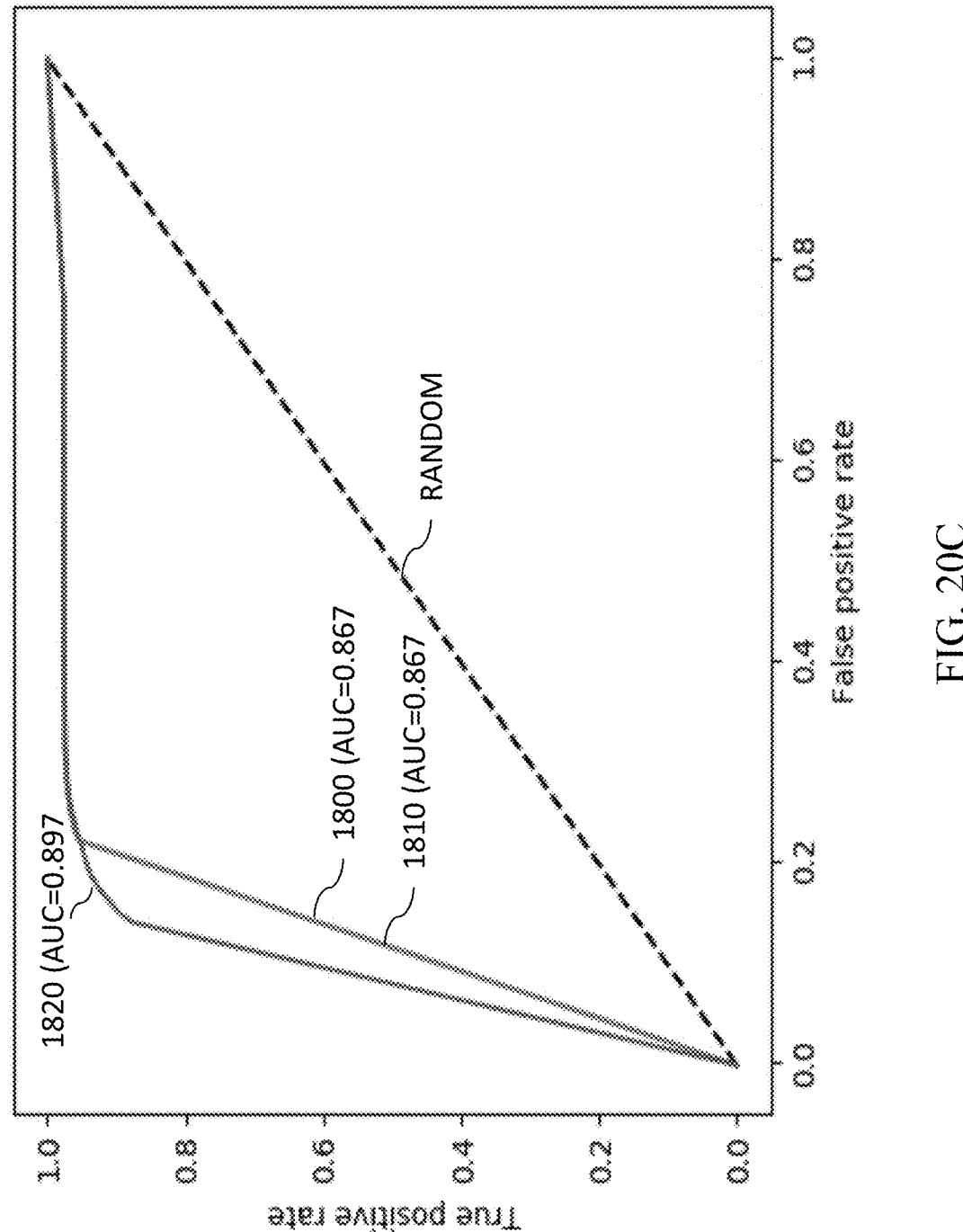
Figure 20D:
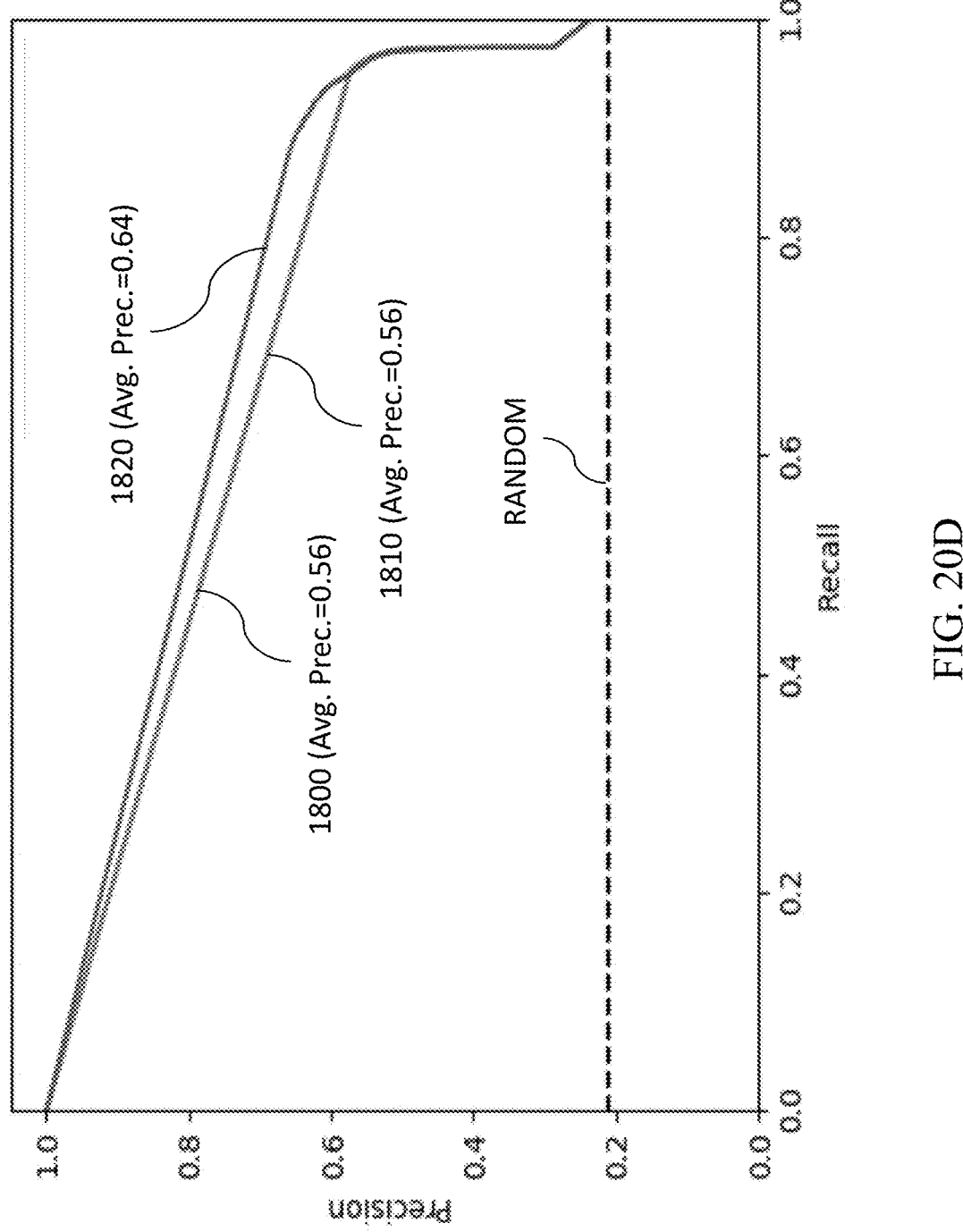

In some embodiments, in step 1512, the instructions of atrophy segmentation module 206c may cause system 200 to perform atrophy lesion identification and segmentation for each of the first and subsequent input OCT scans 220, as overlaid on the corresponding input IR images. As can be seen in FIG. 19A, the atrophy lesions are identified and segmented in the IR image based on the atrophy segments computed in each OCT slice in step 1510. The lesions segments are shown as horizontal bars in white (first OCT scan) overlaid with subsequent OCT scan (in black).

In some embodiments, system 200 may output a report comprising the clinically relevant measurements of the lesion atrophy extent in both the first and subsequent input OCT scans 220. In some embodiments, such report includes one or more of:

The total lesions area A for all lesions whose area is >0.05 mm² and the lesion area in concentric disks centered at the fovea;

lesion cumulative perimeter P defined as the length of the cumulative circumference of each lesion;

lesion cumulative circularity, $$C = \frac{4\pi A}{P^2};$$

focality index, defined as the number of lesion atrophy connectivity components whose area is >0.05 mm²;

Feret-max and Feret-min caliper defined by the maximal/minimal perpendicular distance between parallel tangents on opposite sides of the lesion; and minimal lesion distance from the fovea.

As shown in FIGS. 19B-19C, in some embodiments, such report may include disease progression, quantified with two types of atrophy progression rates: area-based and directional. Area-based progression rates [mm²/year](FIG. 19B) are computed for the entire retina and for concentric disks centered at the fovea of diameters of 1, 3, 6 mm divided into quarters, and are reported for the first OCT scan (top line number), subsequent OCT scan (middle line number), and the change from the first to the subsequent OCT scans (bottom line number). Directional progression rates [mm/year] (FIG. 19C) are computed for nine directions: superior, inferior, nasal, temporal directions, intermediate directions, and the inner-radial direction i.e. towards the fovea.

Tables 3A-3B below show the measurements results:

TABLE 3A

| | Lesion Area [mm²] | | | | Perim-eter [mm] | Circu-larity |
|---|---|---|---|---|---|---|
| | | Diameter from fovea (% of Total) | | | | |
| | Total | 1 mm | 3 mm | 6 mm | | |
| First | 2.98 | 0 (0) | 1.08 (16) | 2.98 (11) | 13.52 | 0.2 |
| Subsequent | 5.71 | 0 (0) | 2.13 (31) | 5.71 (21) | 18.78 | 0.2 |
| Diff. | 2.73 | 0 (0) | 1.05 (15) | 2.73 (10) | 5.26 | 0 |

TABLE 3B

| | Focality Index | Feret-max diameter [mm] | Feret-min diameter [mm] | Min. distance from fovea [mm] |
|---|---|---|---|---|
| First | 2 | 3.18 | 2.88 | 0.78 |
| Subsequent | 3 | 3.6 | 3.36 | 0.56 |
| Diff. | 1 | 0.42 | 0.48 | −0.22 |

Experimental Results

The present inventors conducted experiments of the present technique as further detailed herein below. Datasets for the experiments were acquired by ophthalmologists at the Hadassah University Medical Center (Ein Kerem, Jerusalem, Israel) during routine clinical examination of patients, using a Spectralis OCT scanner (Heidelberg Engineering, Germany). The studies were selected from patients that were diagnosed as having at least some degree of macular atrophy, and consist of a video file (.avi format) that includes an IR image and a series of OCT slices.

The dataset for cRORA atrophy consists of 40 pairs of first and subsequent OCT studies from 18 patients with macular degeneration. The mean time elapsed between first and subsequent OCT studies of the same patient is 24.13 (std=14.0) months in the range of 3-59 months. The IR image and the OCT slices were extracted from the video file (.png format). The IR image sizes are 496×496, with resolution of 20×20 μm². The OCT scans consist of 40-80 slices of sizes 496×1024 and 496×1536 pixels per slice, and resolution of 4×6 μm². The IR images and the OCT scan slices are co-registered.

The ophthalmic studies were annotated with ground-truth cRORA and macular atrophy annotations as follows. The annotators were instructed to annotate atrophy, including lesions whose size is <250 μm in the lateral dimension according to the criteria defined in Sadda et. al., 2018. The annotation of cRORA in all 40 first/subsequent OCT pairs was performed manually on the OCT slices by viewing first and subsequent OCT slices simultaneously. In total, 450,430 out of 5,284,864 (8.5%) cRORA columns corresponding to 3,732 atrophy segments and 735 atrophy lesions were identified in all the 4,040 OCT slices of 80 OCT scans. Atrophy appeared in 1,998 slices. On average, there were 46.6 (std=27.3) in the range 0-106 atrophy segments each with 120.7 (std=124.7) in the range 3-783 atrophy columns and 9.2 (std=8.1) in the range 0-29 atrophy lesions per OCT scan. The mean (std) area-based change factor between first and subsequent is 2.1 (1.5) in the range 1.1-9.1.

Seven evaluation measures were used in the experiments to quantitatively compare atrophy segmentations between annotators and to quantify the performance of our methods with respect to the manual ground-truth annotations.

The first measure is the standard binary classification $F_1$ score used to compare two atrophy lesions segmentations. The $F_1$ score is defined as $$F_1 = 2 \cdot \frac{\text{precision} \cdot \text{recall}}{\text{precision} + \text{recall}} = \frac{tp}{tp + \frac{1}{2} \cdot (fp + fn)}$$

where tp, fp, fn stand for true positives, false positives and false negatives, respectively. This measure is equivalent to the commonly used Dice coefficient—a similarity measure between two sets A and B is defined as $$\text{Dice}(A, B) = \frac{2 \cdot |A \cap B|}{|A| + |B|},$$

where $|\cdot|$ denotes the size of the segmentation set. In both cases, the score ranges from 0 to 1—no similarity to full similarity.

To quantify and compare the results of the column-based machine learning models, a ROC curve (receiver operating characteristic curve) and the AUC (area under the ROC curve) measures were used. In addition, Precision-Recall curves and Confusion Matrices were used for imbalanced datasets since the number of non-atrophy columns is 3-10 times larger than the atrophy ones.

In the results reported below, the various references to tested machine learning models refer to exemplary models 1800, 1810, 1820 described above with reference to FIGS. 18A-18C.

In addition, two boundary distance measures were used. The Average Symmetric Surface Distance (ASSD) is the average distance between points on the boundaries of two sets A and B defined as $$ASSD(\partial A, \partial B) = \frac{\sum_{a \in \partial A} d(a, \partial B) + \sum_{b \in \partial B} d(b, \partial A)}{|\partial A| + |\partial B|},$$

where $\partial A$ and $\partial B$ are the boundaries of A and B and $d(x, \partial)$ is the minimum Euclidean distance between a point x from all the points on $\partial$. The Symmetric Hausdorff Distance (SHD) is the maximum between the two directional distances between two sets of points, where the directional distance is the maximal distance between a point in the first set to a nearest point in the other set, e.g., $$SHD(\partial A, \partial B) = \max\left\{\max_{a \in \partial A} d(a, \partial B), \max_{b \in \partial B} d(b, \partial A)\right\}.$$

A first study quantifies the observer variability of manual cRORA atrophy segmentation in OCT slices. Study 2 quantifies the performance of the three simultaneous column-based machine learning models for cRORA segmentation. Study 3 quantifies the accuracy of the measurements.

Study 1—Manual cRORA segmentation in OCT slices: The inter-observer annotation variability were quantified by independently obtaining from two annotators manual annotation of 834 OCT slices from 9 out of 40 first and subsequent OCT studies pairs following the protocol described above. The mean (std) difference between the two ophthalmologists annotations was +1,628 columns (1,876) in the range −1,442+4,994, which yields a mean (std) difference in atrophy burden of +4.3% (4.9%) and with mean (std) $F_1$ score of 0.71 (0.1) in the range 0.46-0.80. When taking the senior ophthalmologist as the reference, the mean (std) ASSD was 0.23 (0.41) mm and the mean (std) SHD was 1.79 (2.19) mm. The mean (std) precision and recall of atrophy segments detection were 0.76 (0.18) and 0.88 (0.14) respectively, and the mean (std) precision and recall of atrophy lesion detection were 0.68 (0.30) and 0.89 (0.13). The relatively low $F_1$ score and precision can be attributed to the fuzzy cRORA boundaries, which yield differences in their interpretation and annotation.

Inter-observer variability of the measurements was quantified as described above. These measurements were automatically computed from the manual cRORA annotations independently performed by both ophthalmologists on the same 9 pairs of first and subsequent OCT studies. Of the total of 28 measurements, the five most significant ones that quantify the atrophy change are reported. For each measurement, the measurement difference RSME (root mean squared error) and standard deviation (std) are computed.

Study 2—Automatic simultaneous cRORA segmentation in OCT slice pairs: cRORA atrophy segments on OCT slices are computed with the three simultaneous column-based classification machine learning models (i.e., exemplary model 1800, 1810, 1820 described above with reference to FIGS. 18A-18C), with and without a prior mask input (input 220c in FIGS. 18A-18C). The models were trained and cross-validated on 34 first and subsequent OCT studies pairs from 16 patients (a total of 2,618 slices and 2,131,048 columns) and tested on 6 pairs from 4 different patients (total of 420 slices and 342,016 columns). The patients in the test set were chosen so that their mean area-based change factor (from first to subsequent) is closest to the mean area-based change factor for all pairs. Tables 4A-4C below summarizes the results.

Results of the standalone and three simultaneous column-based machine learning models (i.e., exemplary model 1800, 1810, 1820 described above with reference to FIGS. 18A-18C) for cRORA atrophy are reported in tables 4A-4C below, including the number of columns (total, mean, std) in the ground truth and in the computed segmentation, their difference in terms of atrophy columns and atrophy burden percentage (the ration between the total atrophy area and the total FOV area), and their mean (std) similarity in terms of F1 score, ASSD, and SD in mm; and the atrophy detection precision and recall for atrophy segments and atrophy lesions.

TABLE 4A

| Machine Learning Model | Measure | Ground truth columns | Computed columns | Diff columns | Burden Diff % mean (std) |
|---|---|---|---|---|---|
| Standalone | Total | 40587 | 56254 | +15667 | +10.0 |
| | Mean | 6764 | 9375 | +2611 | (10.7) |
| | (std) | (2371) | (2968) | (2,296) | |
| 1800 (FIG. 18A) with prior mask | Total | 40587 | 53919 | +13332 | +8.3 |
| | Mean | 6764 | 8986 | +2222 | (6.5) |
| | (std) | (2371) | (2648) | (1618) | |
| 1800 (FIG. 18A) without prior mask | Total | 40587 | 52265 | +11678 | +7.3 |
| | Mean | 6764 | 8710 | +1946 | (7.2) |
| | (std) | (2371) | (2503) | (1855) | |
| 1810 (FIG. 18B) without prior mask | Total | 40587 | 57877 | +17290 | +10.5 |
| | Mean | 6764 | 9646 | +2881 | (6.6) |
| | (std) | (2371) | (2371) | (1599) | |
| 1810 (FIG. 18B) without prior mask | Total | 40587 | 65107 | +24520 | +14.5 |
| | Mean | 6764 | 10851 | +4086 | (8.8) |
| | (std) | (2371) | (4262) | (2426) | |
| 1820 (FIG. 18C) with prior mask | Total | 40587 | 172,077 | +13437 | +8.2 |
| | Mean | 6764 | 14,340 | +2239 | (7.8) |
| | (std) | (2371) | (6,574) | (1906) | |
| 1820 (FIG. 18C) without BL mask | Total | 40587 | 62249 | +21662 | +13.0 |
| | Mean | 6764 | 10374 | +3610 | (6.7) |
| | (std) | (2371) | (3734) | (1810) | |

TABLE 4B

| Machine Learning Model | $F_1$ score mean (std) | ASSD mean (std) | SHD mean (std) |
|---|---|---|---|
| Standalone | 0.72 (0.07) | 15.4 (20.1) | 84.9 (97.1) |
| 1800 (FIG. 18A) with prior mask | 0.75 (0.06) | 4.5 (3.7) | 46.6 (28.5) |
| 1800 (FIG. 18A) without prior mask | 0.74 (0.06) | 4.6 (4.2) | 44.1 (32.1) |
| 1810 (FIG. 18B) without prior mask | 0.75 (0.06) | 4.7 (3.8) | 41.4 (30.5) |
| 1810 (FIG. 18B) without prior mask | 0.74 (0.08) | 10.7 (12.6) | 64.7 (67.9) |
| 1820 (FIG. 18C) with prior mask | 0.77 (0.07) | 4.5 (4.1) | 45.7 (25.7) |
| 1820 (FIG. 18C) without BL mask | 0.74 (0.08) | 4.5 (3.5) | 33.9 (31.1) |

TABLE 4C

| Machine Learning Model | With/ Without prior mask | ATROPHY DETECTION SEGMENT Precision mean (std) | SEGMENT Recall mean (std) | ATROPHY DETECTION LESION Precision mean (std) | LESION Recall mean (std) |
|---|---|---|---|---|---|
| Standalone | | 0.70 (0.16) | 0.94 (0.06) | 0.66 (0.17) | 0.89 (0.25) |
| 1800 (FIG. 18A) with prior mask | | 0.90 (0.06) | 0.89 (0.07) | 0.84 (0.17) | 0.89 (0.16) |
| 1800 (FIG. 18A) without prior mask | | 0.88 (0.08) | 0.89 (0.06) | 0.57 (0.25) | 0.78 (0.31) |
| 1810 (FIG. 18B) without | | 0.90 (0.06) | 0.92 (0.06) | 0.77 (0.17) | 0.94 (0.12) |

TABLE 4C-continued

| Machine Learning Model | With/ Without prior mask | ATROPHY DETECTION SEGMENT Precision mean (std) | SEGMENT Recall mean (std) | ATROPHY DETECTION LESION Precision mean (std) | LESION Recall mean (std) |
|---|---|---|---|---|---|
| prior mask 1810 (FIG. 18B) without prior mask | | 0.85 (0.12) | 0.96 (0.03) | 0.63 (0.20) | 0.94 (0.12) |
| 1820 (FIG. 18C) with prior mask | | 0.91 (0.06) | 0.89 (0.06) | 0.84 (0.17) | 0.83 (0.25) |
| 1820 (FIG. 18C) without BL mask | | 0.90 (0.09) | 0.95 (0.05) | 0.74 (0.18) | 0.94 (0.12) |

As can be seen, machine learning model 1820 (FIG. 18C) yields the best results. For the atrophy extent, the mean (std) difference between the manually reference ground-truth cRORA atrophy burden and the automatically derived was +8.2% (7.8%) in the range +0.7% to +21.4% with the prior mask, and +13.0% (6.7%) in the range +4.0% to +22.6% without the prior mask. The mean (std) $F_1$ score is 0.77 (0.07) in the range 0.66-0.83 with the prior mask and 0.74 (0.08) in the range 0.62-0.83 without the prior mask. The atrophy detection mean (std) precision and recall for atrophy segments are 0.91 (0.06) and 0.89 (0.06) with the prior mask and 0.90 (0.09) and 0.95 (0.05) without the prior mask, and for atrophy lesions 0.84 (0.17) and 0.83 (0.25) with the prior mask and 0.74 (0.18) and 0.94 (0.12) without the prior mask. These results show that the automatic simultaneous column-based machine learning model is as accurate and reliable as the manual segmentation, e.g., within the observer variability reported in Study 1.

FIGS. 20A-20D show the ROC and Precision-Recall curves of the three machine learning models (i.e., exemplary model 1800, 1810, 1820 described above with reference to FIGS. 18A-18C). The simultaneous column-based models, and particularly machine learning model 1820, clearly outperform the standalone column-based machine learning model: model 1820 has an AUC of 0.897 and a mean precision of 0.64 with and without the prior mask—it outperforms the other classifiers, so it is the best choice.

Figure 21A:
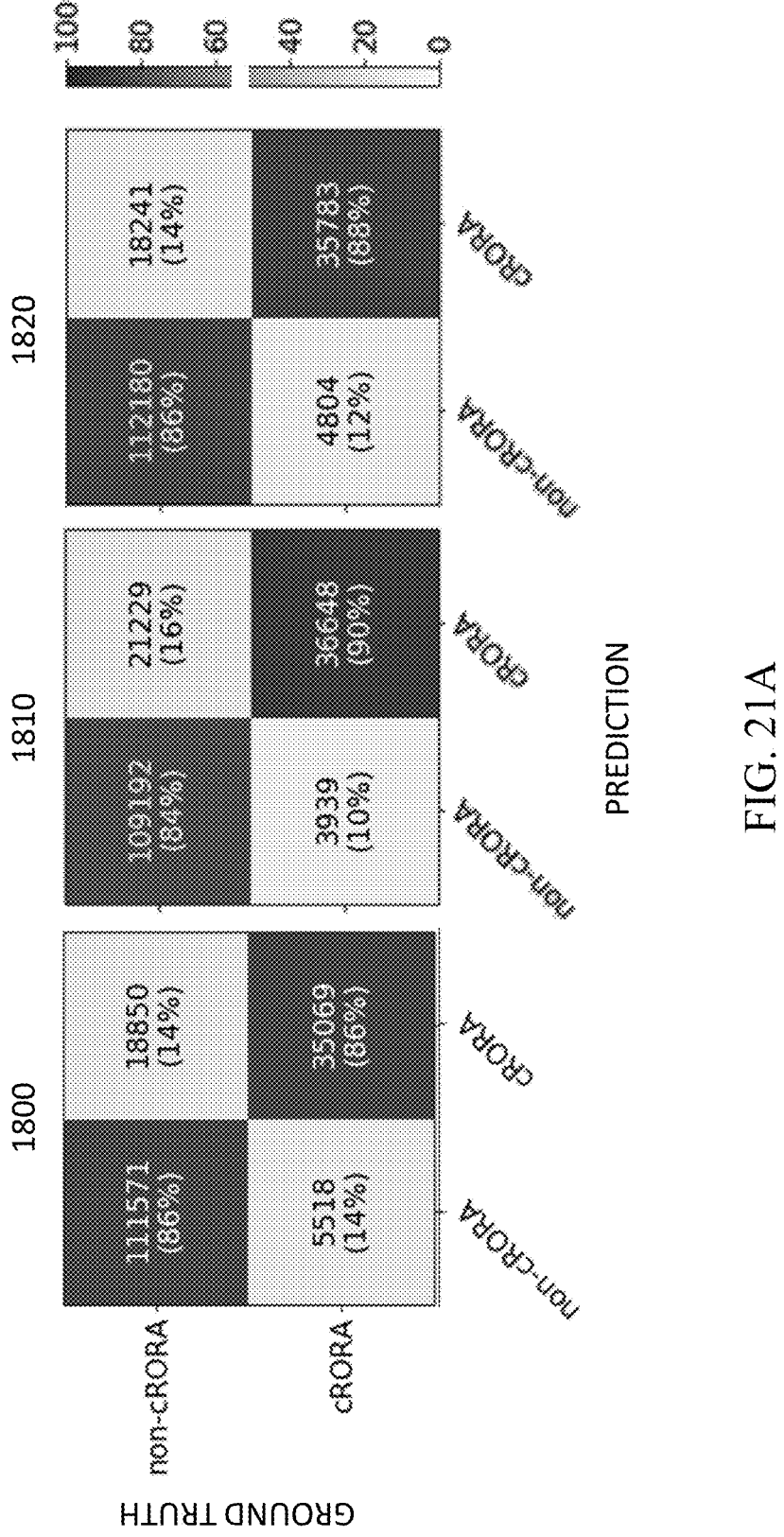
FIGS. 21A-21B show the precision-recall curves and the confusion matrix, according to some embodiments of the present invention.
Figure 21B:
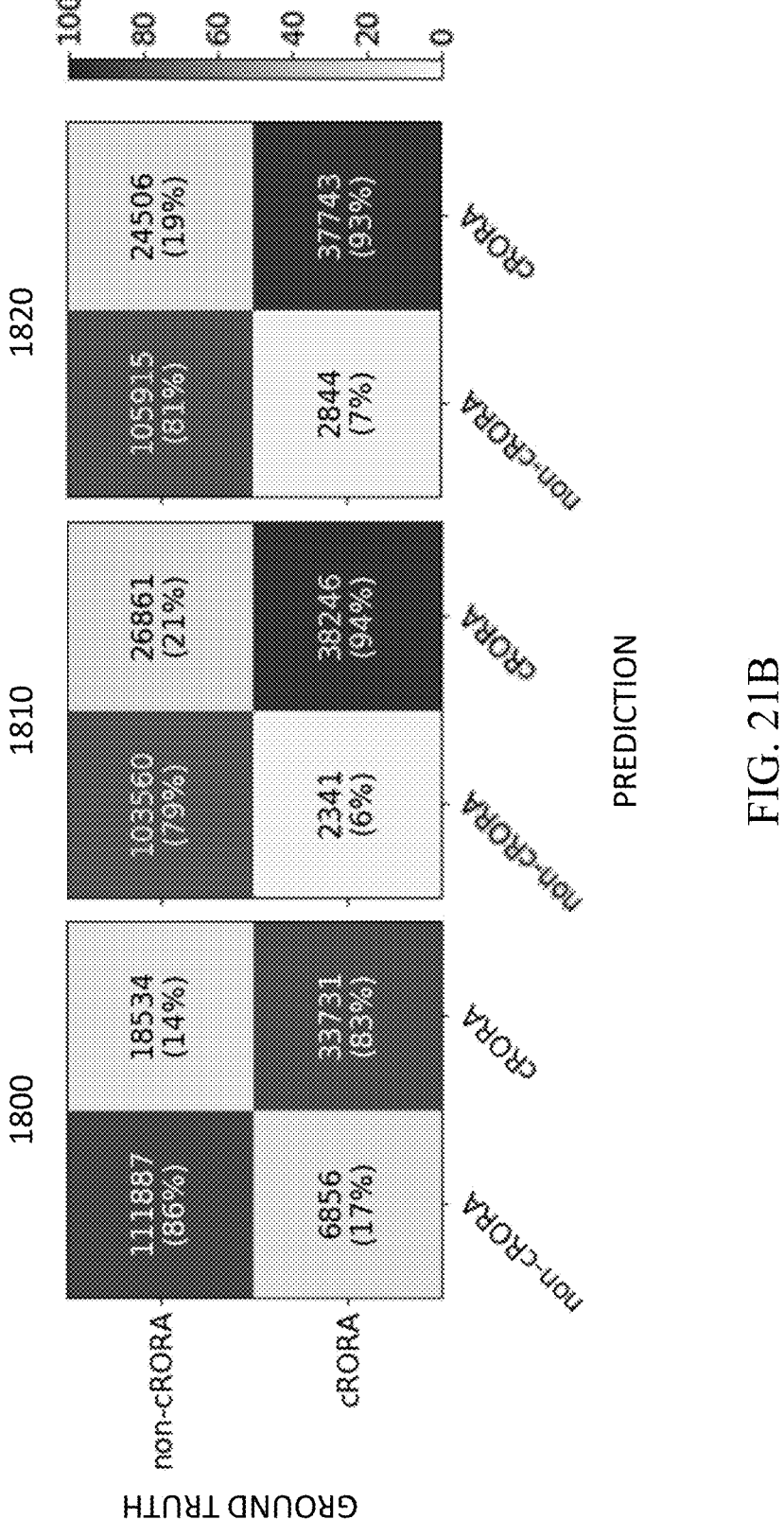

FIGS. 21A-21B show the confusion matrices for the three classifiers with and without the prior mask. Model 1820 reaches the most balanced results. The results of models 1800 and 1820 are comparable, with model 1800 achieving a slightly higher true negative rate (TNR) of 83% vs. the 81% achieved by model 1820 without the prior mask; its true positive rate (TPR) is 85% which is significantly lower than the 93% of model 1820.

Study 3—Clinical measurements: This study quantifies the accuracy of the clinical measurements automatically computed from the cRORA atrophy lesions segmentations generated by the model 1820 classifier without the prior mask. For each measurement, the RMSE and std of the differences between the measurements are computed from: (i) the manually annotated reference ground-truth cRORA atrophy lesions segmentations of 834 OCT slices from 9 first and subsequent OCT studies pairs (Study 1); and (ii) the atrophy lesions segmentations for 40 first and subsequent OCT studies pairs computed with the model 1820 without the prior mask.

The 5 (out of 28) most clinically relevant measurements were selected for the quantification of the atrophy progression between the subsequent and the first OCT studies: (i) change in focality index; (ii) atrophy area progression; (iii-iv) mean inward (towards the fovea) and outward (away from the fovea) directional progression rates computed from the nine directional progression rates in the nasal/temporal/superior/inferior direction; and (v) mean Feret diameters progression rates.

Tables 5A-5B below summarize the results the differences for the five most significant clinical measurements. Listed for each measurements are the RSME, standard deviation, and minimum and maximum differences computed from the atrophy lesion segmentations. The measurement differences are computed for the two manual annotations (inter-observer differences) and for those computed with the model without a prior mask vs. those computed from the ground truth annotations. The measurements computed from the atrophy lesion segmentations generated by the model without prior mask classifier have RMSE and std values that are smaller than the inter-observer variability, with the only exception of the RMSE for area progression rate (0.90 vs. 0.74), whose value is acceptable. This demonstrates that the results are accurate and reliable.

TABLE 5A

| MEASUREMENT DIFFERENCES | | Change in focality index | Area progression rate [mm²/year] | Mean outward directional progression rate [mm/year] |
|---|---|---|---|---|
| Inter-observer | RMSE | 1.76 | 0.74 | 0.44 |
| | std | 1.75 | 0.73 | 0.41 |
| | min | −2.00 | −0.94 | −0.37 |
| | max | 4.00 | 1.74 | 1.00 |
| model 1820 | RMSE | 1.29 | 0.90 | 0.18 |
| without | std | 0.82 | 0.64 | 0.16 |
| prior mask | min | 0.00 | −1.25 | −0.11 |
| | max | 2.00 | 0.61 | 0.36 |

TABLE 5B

| MEASUREMENT DIFFERENCES | | Mean inward directional progression rate [mm/year] | Mean Feret diameters progression rate [mm/year] |
|---|---|---|---|
| Inter-observer | RMSE | 0.11 | 0.64 |
| | std | 0.10 | 0.57 |
| | min | 0.00 | −0.50 |
| | max | 0.32 | 1.54 |
| model 1820 | RMSE | 0.06 | 0.29 |
| without | std | 0.06 | 0.27 |
| prior mask | min | −0.13 | −0.16 |
| | max | 0.06 | 0.63 |

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range −10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A system comprising:

at least one hardware processor; and a non-transitory computer-readable storage medium having stored thereon program instruction, the program instructions executable by the at least one hardware processor to:

receive (i) a first OCT scan, and (ii) a second OCT scan taken subsequent to said first OCT scan, each comprising one or more two-dimensional (2D) scan images of an eye of a subject, receive a first retinal image of said eye of said subject associated with said first OCT scan, and a second retinal image of said eye of said subject associated with said second OCT scan, match corresponding first and second pixel column patches, each comprising one or more pixel columns, associated respectively with said scan images of said first and second OCT scans, based, at least in part, on performing image registration of said scan images between said first and second OCT scans, and use said matched corresponding first and second pixel column patches as input for a trained machine learning model, wherein an output of said trained machine learning model classifies said second pixel column patches as representing retinal atrophy or not representing retinal atrophy in said eye of said subject.

2. The system of claim 1, wherein said program instructions are further executable to:

(i) project said classified second pixel column patch onto said second retinal image, based, at least in part, on identifying a field-of-view of said second OCT scan within said second retinal image, to indicate segments in said second retinal image that are corresponding to said classified second pixel column patch representing retinal atrophy; and (ii) calculate at least one atrophy parameter, based, at least in part, on said indicated segments in said retinal image.

3. The system of claim 2, wherein said at least one atrophy parameter is selected from the group consisting of: a number of detected atrophy lesions, an area of each of said detected atrophy lesions, a total area of all of said detected atrophy lesions, and a distance from the fovea of each of said detected atrophy lesions.

4. The system of claim 1, wherein said machine learning model is trained on a training dataset comprising:
  (i) a plurality of matched pairs of pixel column patches associated with scan images from a plurality of pairs of first and second OCT scans obtained from each subject in a cohort of subjects; and
  (ii) labels associated with the presence of retinal atrophy lesions in each of said matched pairs of pixel column patches.

5. The system of claim 1, wherein said image registration is based, at least in part, on a known spatial relation between said first OCT scan and said first retinal image, and said second OCT scan and said second retinal image.

6. The system of claim 1, wherein said classifying by said trained machine learning model is based on features representing light scattering patterns in each of said pixel column patches.

7. The system of claim 6, wherein said features represent said light scattering patterns across all retinal layers and below the RPE layer of said eye of the subject.

8. A computer-implemented method comprising:
  receiving (i) a first OCT scan, and (ii) a second OCT scan taken subsequent to said first OCT scan, each comprising one or more two-dimensional (2D) scan images of an eye of a subject;
  receiving a first retinal image of said eye of said subject associated with said first OCT scan, and a second retinal image of said eye of said subject associated with said second OCT scan;
  matching corresponding first and second pixel column patches, each comprising one or more pixel columns, associated respectively with said scan images of said first and second OCT scans, based, at least in part, on performing image registration of said scan images between said first and second OCT scans; and
  using said matched corresponding first and second pixel column patches as input for a trained machine learning model, wherein an output of said trained machine learning model classifies said second pixel column patches as representing retinal atrophy or not representing retinal atrophy in said eye of said subject.

9. The computer-implemented method of claim 8, further comprising:
  (i) projecting said classified second pixel column patch onto said second retinal image, based, at least in part, on identifying a field-of-view of said second OCT scan within said second retinal image, to indicate segments in said second retinal image that are corresponding to said classified second pixel column patch representing retinal atrophy; and
  (ii) calculating at least one atrophy parameter, based, at least in part, on said indicated segments in said retinal image.

10. The computer-implemented method of claim 9, wherein said at least one atrophy parameter is selected from the group consisting of: a number of detected atrophy lesions, an area of each of said detected atrophy lesions, a total area of all of said detected atrophy lesions, and a distance from the fovea of each of said detected atrophy lesions.

11. The computer-implemented method of claim 8, wherein said machine learning model is trained on a training dataset comprising:
  (i) a plurality of matched pairs of pixel column patches associated with scan images from a plurality of pairs of first and second OCT scans obtained from each subject in a cohort of subjects; and
  (ii) labels associated with the presence of retinal atrophy lesions in each of said matched pairs of pixel column patches.

12. The computer-implemented method of claim 8, wherein said image registration is based, at least in part, on a known spatial relation between said first OCT scan and said first retinal image, and said second OCT scan and said second retinal image.

13. The computer-implemented method of claim 8, wherein said classifying by said trained machine learning model is based on features representing light scattering patterns in each of said pixel column patches.

14. The computer-implemented method of claim 13, wherein said features represent said light scattering patterns across all retinal layers and below the RPE layer of said eye of the subject.

15. A computer-implemented method comprising:
  receiving a series of consecutive OCT scans, each comprising one or more two-dimensional (2D) scan images of an eye of a subject;
  receiving a series of consecutive retinal images, each corresponding to one of said series of consecutive OCT scans;
  with respect to each consecutive pair comprising a first and second OCT scans in said series of consecutive OCT scan, matching corresponding first and second pixel column patches, each comprising one or more pixel columns, associated respectively with said scan images of said first and second OCT scans, based, at least in part, on performing image registration of said scan images between said first and second OCT scans; and
  using said matched corresponding first and second pixel column patches as input for a trained machine learning model, wherein an output of said trained machine learning model classifies said second pixel column patch as representing retinal atrophy or not representing retinal atrophy in said eye of said subject.

16. The computer-implemented method of claim 15, further comprising:
  (i) projecting, with respect to each of said consecutive pairs comprising a first and second OCT scans, said classified second pixel column patch onto said retinal image corresponding to said second OCT scan in said pair, to indicate segments in said retinal image corresponding to said second OCT scan in said pair that are corresponding to said classified second pixel column patch representing retinal atrophy; and
  (ii) calculating at least one atrophy parameter, based, at least in part, on said indicated segments in said retinal image.

17. The computer-implemented method of claim 16, further comprising
  calculating at least one atrophy parameter, based, at least in part, on all of said indicated segments with respect to all of said consecutive pairs of OCT scans.

* * * * *